United States Patent
Eppolito et al.

(10) Patent No.: US 10,692,537 B2
(45) Date of Patent: Jun. 23, 2020

(54) SYNCHRONIZING AUDIO AND VIDEO COMPONENTS OF AN AUTOMATICALLY GENERATED AUDIO/VIDEO PRESENTATION

(71) Applicant: Apple Inc., Cupertino, CA (US)

(72) Inventors: Aaron M. Eppolito, Los Gatos, CA (US); Conner Stuart Richardson, Pacifica, CA (US); Wendy L. DeVore, Truckee, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/003,637

(22) Filed: Jun. 8, 2018

(65) Prior Publication Data
US 2018/0294013 A1    Oct. 11, 2018

Related U.S. Application Data

(63) Continuation of application No. 15/283,054, filed on Sep. 30, 2016, now Pat. No. 10,062,415.
(Continued)

(51) Int. Cl.
| | |
|---|---|
| *G11B 27/00* | (2006.01) |
| *H04N 5/93* | (2006.01) |
| *G11B 27/10* | (2006.01) |
| *G11B 27/031* | (2006.01) |
| *H04N 21/43* | (2011.01) |
| *H04N 21/472* | (2011.01) |
| *H04N 21/485* | (2011.01) |
| *H04N 21/81* | (2011.01) |
| *H04N 21/854* | (2011.01) |
| *H04N 5/765* | (2006.01) |

(Continued)

(52) U.S. Cl.
CPC ............ *G11B 27/10* (2013.01); *G11B 27/031* (2013.01); *H04N 21/4302* (2013.01); *H04N 21/47205* (2013.01); *H04N 21/4854* (2013.01); *H04N 21/8106* (2013.01); *H04N 21/854* (2013.01)

(58) Field of Classification Search
USPC ........ 386/278, 280, 282, 285, 200, 201, 207
See application file for complete search history.

(56) References Cited

U.S. PATENT DOCUMENTS

| | | | |
|---|---|---|---|
| 6,757,027 B1 | 6/2004 | Edwards et al. | |
| 6,807,361 B1 | 10/2004 | Girgensohn et al. | |
| (Continued) | | | |

FOREIGN PATENT DOCUMENTS

| | | |
|---|---|---|
| CN | 100525459 C | 8/2009 |
| CN | 103077734 A | 5/2013 |
| (Continued) | | |

*Primary Examiner* — Daquan Zhao
(74) *Attorney, Agent, or Firm* — Invoke

(57) ABSTRACT

A method to author music. The method includes generating, based on a collection of media clips stored on a device, an audio component for an audio/video (A/V) presentation, determining a plurality of locations within the audio component where a beat, onset, segment boundary, or stinger occurs within the audio component, selecting a particular location in the plurality of locations as a transition location, generating, based the collection of media clips and the transition location within the audio component, a video component for the A/V presentation, and generating the A/V presentation based on the audio component and the video component.

20 Claims, 32 Drawing Sheets

Related U.S. Application Data

(60) Provisional application No. 62/235,548, filed on Sep. 30, 2015.

(51) Int. Cl.
*H04N 5/932* (2006.01)
*H04N 5/935* (2006.01)

(56) References Cited

U.S. PATENT DOCUMENTS

| | | | |
|---|---|---|---|
| 7,301,092 | B1 | 11/2007 | McNally et al. |
| 7,424,204 | B2 * | 9/2008 | Nakamura .......... G06F 16/7834 386/248 |
| 7,483,618 | B1 | 1/2009 | Edwards et al. |
| 8,238,718 | B2 | 8/2012 | Toyama et al. |
| 8,606,083 | B2 | 12/2013 | Girgensohn et al. |
| 2003/0107592 | A1 | 6/2003 | Li et al. |
| 2003/0160944 | A1 * | 8/2003 | Foote .................... G03B 31/00 352/1 |
| 2004/0054542 | A1 * | 3/2004 | Foote ........................ G09B 5/00 704/500 |
| 2004/0085341 | A1 | 5/2004 | Hua et al. |
| 2004/0255150 | A1 | 12/2004 | Sezan et al. |
| 2005/0141859 | A1 | 6/2005 | Cheatle |
| 2005/0281255 | A1 * | 12/2005 | Davies ............... H04N 21/4307 370/389 |
| 2009/0070346 | A1 | 3/2009 | Savona et al. |
| 2011/0007797 | A1 | 1/2011 | Palmer et al. |
| 2011/0131496 | A1 | 6/2011 | Abram et al. |
| 2011/0283210 | A1 | 11/2011 | Berger et al. |
| 2012/0020648 | A1 | 1/2012 | Yamaji |
| 2012/0108293 | A1 | 5/2012 | Law et al. |
| 2012/0189284 | A1 | 7/2012 | Morrison et al. |
| 2012/0210200 | A1 | 8/2012 | Berger et al. |
| 2013/0060641 | A1 | 3/2013 | Al Gharabally |
| 2013/0077805 | A1 | 3/2013 | Kirsch |
| 2013/0132844 | A1 | 5/2013 | Oakley et al. |
| 2013/0330062 | A1 | 12/2013 | Meikle et al. |
| 2013/0336590 | A1 | 12/2013 | Sentinelli et al. |
| 2013/0343727 | A1 | 12/2013 | Rav-Acha et al. |
| 2013/0343729 | A1 | 12/2013 | Rav-Acha et al. |
| 2014/0076124 | A1 | 3/2014 | Kellett et al. |
| 2014/0267395 | A1 * | 9/2014 | Ross ........................ G06F 3/14 345/633 |
| 2014/0301653 | A1 | 10/2014 | Murphy-Chutorian et al. |
| 2014/0376887 | A1 | 12/2014 | Tijssen et al. |
| 2015/0046842 | A1 | 2/2015 | Barr et al. |
| 2015/0078680 | A1 | 3/2015 | Shakib et al. |
| 2015/0160916 | A1 | 6/2015 | Lothian |
| 2015/0194185 | A1 | 7/2015 | Eronen et al. |
| 2015/0234833 | A1 | 8/2015 | Cremer et al. |
| 2015/0243326 | A1 | 8/2015 | Pacurariu et al. |
| 2015/0318020 | A1 | 11/2015 | Pribula |
| 2016/0286072 | A1 | 9/2016 | Hino et al. |

FOREIGN PATENT DOCUMENTS

| | | |
|---|---|---|
| CN | 103842936 A | 6/2014 |
| EP | 1587111 A1 | 10/2005 |
| EP | 2159797 A1 | 3/2010 |

* cited by examiner

Figure 19

| | 1A | 1B | 1C | 2A | 2B | 3A | 3B | 3C | O1 | O2 | Priority | Bar # | Divisible? |
|---|---|---|---|---|---|---|---|---|---|---|---|---|---|
| 1A | Y | Y | Y | N | N | N | N | N | Y | Y | 100 | 4 | Y |
| 1B | T1 | Y | N | Y | Y | Y | Y | Y | N | Y | 70 | 3 | N |
| 1C | T | N | Y | Y | Y | Y | Y | Y | Y | Y | 80 | 4 | Y |
| 2A | N | N | N | T3 | T2 | Y | Y | Y | Y | Y | 75 | 4 | Y |
| 2B | N | N | N | N | N | N | N | N | Y | N | 85 | 1 | N |
| 3A | N | N | N | N | N | Y | Y | Y | Y | Y | 82 | 2 | Y |
| 3B | N | N | N | N | N | N | Y | Y | Y | Y | 75 | 2 | N |
| 3C | N | N | N | N | N | Y | Y | Y | Y | Y | 65 | 2 | N |
| I | Y | Y | Y | Y | Y | N | Y | N | N | N | N/A | N/A | N/A |

Fig. 25

SYNCHRONIZING AUDIO AND VIDEO COMPONENTS OF AN AUTOMATICALLY GENERATED AUDIO/VIDEO PRESENTATION

INCORPORATION BY REFERENCE; DISCLAIMER

Each of the following applications are hereby incorporated by reference: application Ser. No. 15/283,054 filed on Sep. 30, 2016; application No. 62/235,548 filed on Sep. 30, 2015. The Applicant hereby rescinds any disclaimer of claim scope in the parent application(s) or the prosecution history thereof and advises the USPTO that the claims in this application may be broader than any claim in the parent application(s).

BACKGROUND

With the proliferation of digital cameras and mobile devices with digital cameras, people today have more digital content than ever before. As such, the need for tools for presenting and viewing this digital content has never been greater. Unfortunately, many of the tools today require users to manually organize their content. Also, many of these editing tools require users to manually select their content for editing and to manually edit their content. Because of this manual approach, most digital content simply resides in vast digital media libraries waiting for the rare occasion that they can be manually discovered, and in even rarer occasions, painstakingly edited to be part of composite presentations.

SUMMARY

Some embodiments provide a media compositing method with several novel features. In some embodiments, this method is performed by an application that executes on a computing device that stores media content pieces (e.g., videos, still images, etc.), and/or that has access through a network to media content pieces (MCPs) stored on other computing devices. The method of some embodiments performs an automated process that (1) analyzes the MCPs (e.g., analyzes the content and/or metadata of the MCPs) to define one or more MCP groups, and (2) produces a user interface (UI) layout that identifies the defined MCP groups as groups for which the method can display composite presentations (e.g., video presentations).

To define the MCP groups, the method of some embodiments uses one or more media grouping templates (templates). A template in some embodiment is defined by reference to a set of media matching attributes. The method compares a template's attribute set with the content and/or metadata of the MCPs in order to identify MCPs that match the template attributes. When a sufficient number of MCPs match the attribute set of a template, the method of some embodiments defines a template instance by reference to the matching MCPs.

In some embodiments, the method can define multiple template instances for a template. For instance, in some embodiments, the templates include (1) location-bounded templates (e.g., videos and/or photos captured within a region with a particular radius), (2) time-bounded templates (e.g., videos and/or photos captured within a particular time range and/or date range), (3) time-bounded and location-bounded templates (e.g., mornings at a beach), (4) content-defined templates (e.g., videos and/or photos containing smiles), and (5) user-metadata based templates (e.g., MCPs from albums created by the user, MCPs shared by a user with others, MCPs having particular user-defined metadata tags, etc.).

In these embodiments, one or more of these templates might result in multiple template instances. For example, a time and location-bounded template might be defined in terms of (1) a time range tuple specifying 12 pm to 4 pm, (2) a day range tuple specifying Sunday, and (3) a location tuple specifying a region that is not associated with the home or work location of a user of the device executing the application. For this template, the method might identify multiple template instances that include different sets of MCPs that are captured at different locations on Sunday afternoons, with different template instances corresponding to different regions. In some embodiments, the time-bounded attributes require the MCPs to be captured within a certain temporal range of each other MCPs captured from 12 pm-4 pm on Saturdays).

After defining multiple template instances, the method in some embodiments generates a UI layout that includes an arrangement of a set of summary panes for some or all of the template instances. In some embodiments, the UI layout concurrently displays the summary panes of only a subset of the defined template instances. For example, in some embodiments, the method computes a score for each defined template instance, ranks the defined template instances based on the generated scores, and then generates the UI layout based on the rankings. In some embodiments, the UI layout concurrently shows summary panes for only a certain number of the highest-ranking template instances. In other embodiments, the UI layout concurrently show summary panes for only template instance with generated scores that exceed a certain minimum threshold. The method in some of these embodiments provide controls for allowing a user to view summary panes for other defined template instances that the method does not initially display with other summary panes in the generated UI layout.

In different embodiments, the method generates the scores for the template instances differently. In some embodiments, a template instance's score is based on (1) contextual attributes that relate to the time at which the UI layout is being generated and/or displayed, and (2) quality and/or quantity attributes that relate to quality and/or quantity of the MCPs of the template instance. Different contextual attributes can be used in different embodiments. Examples of contextual attributes include (1) time, (2) location of the device, (3) location of future calendared events stored on, or accessible by, the device, (4) locations derived from electronic tickets stored on the device, etc.

In some embodiments, the contextual attributes are used to derive template-instance scores in order to identify template instances that would be relevant (interesting) to a user (e.g., at the time that the generated UI layout will be displayed). For instance, in some embodiments, the method can identify a future location of the device's user from the time and location of an event scheduled in a calendar application, or specified by an electronic ticket application, executing on the device. As the time approaches to the time of the calendared or ticketed event, the method increases the score of a template instance that is associated with the location of the event based on an assumption that the user would want to see MCPs previously captured at that location.

As mentioned above, each template instance's score in some embodiments also depends on the quality and/or quantity attributes of the MCPs of the instance. Some embodiments account for quantity of MCPs in an instance based on an assumption that a larger quantity signifies a higher level of interest in template instance. For example, a template instance that has a lot of photographs in one location on one particular day would typically signify that at an interesting event took place at that location on that particular day and the user would hence be more interested in seeing the photos form that event.

However, in some embodiments, the method discards duplicative or nearly duplicative MCPs (e.g., keeps only one photo when multiple identical or nearly identical photos exist) from a template instance or before their inclusion in the template instance because often having multiple such photos does not lead to an interesting composite presentation. On the other hand, the method in some cases maintains multiple photos from a burst-mode sequence so that the composite presentation can provide interesting burst-mode photo treatments. In some embodiments, the method also discards certain MCPs that are deemed not to be interesting (e.g., pictures of receipts, screenshot photos, etc.) or not to be useful (e.g., very blurry photos, etc.). These MCPs are filtered out in some embodiments before the template instances are created. In other words, these MCPs are never associated with template instances in some embodiments.

In some embodiments, each template instance's score accounts for the quality of the instance's MCPs based on an assumption that template instances with better content will result in better-generated composite presentations and thereby in composite presentations that are more interesting to the viewer. Different embodiments score the MCPs based on different criteria. For instance, some embodiments generate an intrinsic score for an MCP based on one or more of the following MCP attributes and/or metadata: focus, blur, exposure, camera motion, voice content, face content, user input and/or behavior (e.g., user tags, user's inclusion in albums, user sharing with others, etc.). Some embodiments also score specialty MCP types (e.g., burst-mode photos, slow-motion videos, time-lapsed videos, etc.) higher than other MCP types (e.g., still photographs). Some embodiments also score MCPs that are captured at locations that are not associated with the device user's home or work higher than MCPs captured at home or work.

In some embodiments, the method also computes an extrinsic score for each MCP in a template instance that quantify the temporal and visual distances between two successive MCPs in a presentation order, which define how the MCPs are to be presented in the composite presentation of the template instance. The method then uses this score to define an order for selecting a subset of the MCPs for the composite presentation. For instance, some embodiments use the computed extrinsic scores along with the computed MCP intrinsic scores to select highest scoring MCPs (i.e., best quality MCPs) that provide the most visually unique combination of MCPs. The extrinsic score in some embodiments is a time-and-difference distance between neighboring MCPs in the presentation order. In some embodiments, the time-and-difference distance is a weighted aggregation (e.g., sum) of a time distance and a difference distance between the two MCPs.

As mentioned above, the method in some embodiments generates the arrangement of the summary panes for some of the generated template instances based on the scores computed for the template instances. The summary panes display information about the template instances. In some embodiments, a template instance's summary pane includes one or more thumbnails of one or more MCPs of the instance, and a title. Some embodiments generate the thumbnails from the highest scoring MCPs of the instances. Some embodiments also derive the title for an instance's pane from MCP attributes (e.g., MCP metadata such as location, or MCP content such as smiles, etc.) that associates the MCPs into one template instance.

After a user selects the summary pane for a template instance, the method in some embodiments generates the definition of the composite presentation, and then renders the composite presentation from this definition. In some embodiments, the presentation definition includes the identity of the instance's MCPs that are included in the presentation, the presentation order for the included MCPs, and the list of edit operations (e.g., transition operations, special effects, etc.) that are to be performed to generate the composite presentations from the MCPs.

In some embodiments, the method generates some or all of the MCPs that are included in a template instance's composite presentation from the MCPs of the template instance. For instance, multiple MCPs of the template instance can be still photos. For some or all of these still photos, the method generates a video clip in the composite generation by specifying a Ken Burns effect for each of these photos. Also, from a video clip MCP of a template instance, the method can extract one or more video clips to include in the composite presentation. Similarly, from an MCP that is a burst-mode sequence, the method can extract one or more still photos of the sequence and/or one or more Ken-Burns type video clips for one or more of the still photos of the sequence. Many other examples of deriving the composite-presentation MCPs from a template instance's MCPs exist.

Instead of defining the composite presentation for a template instance after a user selects the summary pane for the template instance in the UI layout, the method of some embodiments defines the composite presentation before the UI layout is generated. In some of these embodiments, the method generates a score for each defined composite presentation, and then uses the generated scores for all of the defined composite presentations to define and arrange the UI layout. For instance, in some embodiments, the method uses the generated composite-presentation scores to identify the subset of composite presentations that should initially be concurrently represented on the UI layout, and to identify the order of summary panes for these composite presentations on the UI layout.

In some of these embodiments, the composite presentations are rendered after the user selects their respective summary panes on the UI layout. Other embodiments render the composite presentations before generating the UI layout. One of ordinary skill will realize that other embodiments perform these operations in different sequences. For instance, some embodiments define a portion of a composite presentation before the UI layout is generated, and then generate the rest of the definition of the composite presentation after the UI layout is generated.

The composite presentation generation of some embodiments has several novel features. For instance, the method of some embodiments generates composite presentations by selecting a blueprint for the composite presentation. In some embodiments, the blueprint describes the desired transitions, effects, edit styles (including pace of the edits), etc. Blueprint can also specify the desired type of presentation, which can then influence the type of MCPs included or emphasized in the composite presentation. For example, one blueprint might specify highlights as the desired type of presentation, while another blueprint might specify retrospective as the desired type. For highlights, the method's composite generation would select the best MCPs that are representative of the MCPs of the template instance. For retrospectives, the method's composite generation would might select the MCPs that are not necessarily of the whole set of MCPs of the template instance.

For a template instance, the blueprint in some embodiments is associated with the template of the template instance. Alternatively, or conjunctively, the blueprint in some embodiments is associated with a mood that the method automatically picks for the composite presentation. In some embodiments, the mood is an adjective that describes the type of composite presentation. Examples of mood include extreme, club, epic, uplifting, happy, gentle, chill, sentimental, dreamy, etc. In some embodiments, the method automatically picks the mood for a composite presentation based on the type and/or duration of media in the template instance, content analysis on this media (e.g., detection of high motion video), and detected user-mood preferences. Also, in some embodiments, the method allows the mood to be modified for a composite presentation. In some of these embodiments, the method re-generates the composite presentation for a template instance after the user modifies the mood for a generated composite presentation. Some embodiments allow the user to view the mood for a template instance represented by a summary pane on the generated UI layout. If the user modifies the mood for the represented template instance, the method generates the composite presentation for this template instance based on the user change.

The composite presentation generation of some embodiments automatically specifies the duration for the composite presentation. In some of these embodiments, the method specifies the duration based on the amount of high-quality, unique content in the template instance and the blueprint. For instance, after defining the above-described selection order based on the time-and-difference distance values, the method selects the MCPs in the template instance up to the position in the selection order where two successive MCPs are within a certain distance of each other (e.g., within 0.25 unit time-and-difference distance of each other). The blueprint's specified parameters (e.g., parameters specifying ideal duration for the MCPs) along with the selected MCPs determine the desired duration of the composite presentation. In some embodiments, the blueprint might also specify how the MCPs should be selected, e.g., by specifying selection criteria (such as degree of difference), specifying the manner for computing the time-and-difference distance values are calculated, etc.

The method of some embodiments allows the user to modify a presentation duration that the method initially computes. For instance, in some embodiments, the user can modify the presentation duration after being presented with a rendered composited presentation. Alternatively, or conjunctively, the method allows the user to view and modify the presentation duration in the generated UI layout (e.g., as part of the information provided by a template instance's summary pane), without having to first view the rendered composite presentation with this duration.

In some embodiments, the composite presentation generation has novel media compositing operations, novel song compositing operations, and novel interplay between the media and song compositing operations. The method of some embodiments uses a constrained solver that generates the composite presentation definition by exploring different manners for combining the MCPs of a template instance based on (1) a set of constraints that limit the exploration of the solution space, and (2) metadata tags that specify content characteristics (e.g., for a photo, or for ranges of frames of a video). Examples of constraints include duration constraints (e.g., ideal, minimum and maximum durations for each MCP type) and positional constraints (e.g., one MCP type cannot be placed next to another MCP type).

In exploring the solution space to find an optimal solution that satisfies the constraint and meets one or more optimization criteria, the constrained solver in some embodiments preferentially costs solutions that use MCPs that are highly ranked in the selection order. Also, in finding the optimal solution, constrained solver in some embodiments (1) identifies different portions of the template instance MCPs (e.g., different segments of the video clips, etc.) based on the metadata tag ranges, and (2) explores solutions based on these identified portions.

In some embodiments, the solver discards MCP segments from an identified solution that are smaller than a certain size. The solver in some embodiments also explores whether an MCP segment in an identified solution should be split into smaller segments in order to delete one or more ranges in the middle of the segment. In some of these embodiments, the solver restarts its search for a solution after deleting smaller resulting segments and/or splitting MCPs into smaller segments.

In some embodiments, the media compositor also specifies Ken-Burns effects for still photos in order to define video presentations for the still photos. The media compositor in some embodiments specifies special treatments for other types of image content (such as burst-mode sequences, slow-motion sequences, time-lapse sequences, etc.) that result in the generation of a video sequence for this type of content. By only using extracted segments of MCPs and by specifying special treatment effects for photos and other type of content, the media compositor generates MCPs for the composite presentation from the MCPs of the template instance.

As mentioned above, the media compositor in some embodiments computes the ideal duration for the composite presentation based on the selection order that it defines using the time-and-difference distance values. In some of these embodiments, the media compositor provides the ideal duration to the song compositor. The song compositor then generates a composite song presentation (to accompany the composite media presentation) that has the ideal duration.

In some embodiments, the song compositor generates the composite song presentation by identifying a sequence of audio segments and defining edits and transitions between each pair of audio segments in the sequence. The audio segments are part of one song in some embodiments. In other embodiments, they can be part of two or more songs. These audio segments are referred to as body segments to signify that they are parts of another song. In some embodiments, body segments are assigned a priority value and a section, and within each of their respective sections, are assigned an order. These values are then used to insert the body segments in a dynamically composited song as further described below.

In some embodiments, the song compositor also selects an ending segment from several candidate ending segments for the composite song presentation. The song compositor in some of these embodiments can also select a starting segment from several starting segments for the composite song presentation. An editor defines the body, starting and ending segments from one or more songs by using the audio authoring tools of some embodiments.

To ensure that the segments are properly arranged in the composite song presentation, the song compositor of some embodiments uses (1) insertion rules that specify how audio segments can be inserted in an audio sequence, and (2) sequence rules that ensure that the inserted audio segments can neighbor other segments in the sequence. In some embodiments, the song compositor iteratively inserts body segments into a candidate audio sequence by stepping through the body segments based on their assigned priority values, and inserting the body segments into the candidate audio sequence based on their duration and the insertion rules. In some embodiments, the insertion rules specify (1) that a body segment that belongs to a subsequent second section cannot be inserted before a body segment that belong to an earlier first section, and (2) that body segments that belong to the same section be placed next to each other based on their order in their respective section.

The song compositor of some embodiments then uses the sequence rules to validate the body segment arrangement in the audio sequence. This validation entails ensuring that the placement of no two neighboring segments in the audio sequence violates a sequence rule. When a neighboring segment pair violates a sequence rule, the compositor removes the segment with the lower priority to cure the violation in some embodiments.

In some embodiments, these sequence rules are embedded in a jump table that has multiple rows and columns, and each audio segment is associated with one row and one column. In some embodiments, each starting or ending segment is also associated with at least one row or one column. Each jump table cell then specifies whether the two segments that are assigned to that cell's row and column are allowed to follow each other in an order specified by the row and column assignment. An editor uses the authoring tool of some embodiments to specify the jump table and its attributes for the body, starting and ending segments that the editor defines. At runtime, the song compositor then uses this jump table to automatically define a song for a duration specified by the media compositor.

In some embodiments, each jump table cell also specifies whether a transition is required at the transition between the two segments. The jump table also specifies (1) a priority value for each body segment and (2) an identifier for indicating whether the body segment can be sliced during the song compositing. In some embodiments, the song compositor inserts body segments in a presentation order based on the segment priority values and based on a set of insertion rules, until a particular duration is reached. This duration in some embodiments is the ideal duration provided by the media compositor minus the duration of the longest ending segment. After arranging the body segments, the song compositor adds an ending segment, and when the audio sequence is still shorter than the desired duration, a starting segment if one segment is available that would not make the sequence duration exceed the desired duration.

In some embodiments, the media compositor and song compositor have several novel interactions. The first is the media compositor automatically generates a desired presentation duration, and the song compositor dynamically generates a definition of a composite song presentation based on this duration, as described above. Another novel interaction is that in some embodiments the song compositor provides the location of the ending segment, and/or location of a stinger in the ending segment, to the media compositor so that the media compositor can align the start of the last video or image segment with the ending segment or stinger in this segment. In some embodiments, the video and song compositors also synchronize fade-out effects that they apply to their respective presentations with each other.

Also, in some embodiments, the media compositor performs post-processing to align edit points in the composite media to certain audibly discernable transition locations in the composite song. These locations in some embodiments include location of beats, locations of onsets, locations of segment boundaries, and location of ending-segment stinger in the composite definition. An audio onset corresponds to the beginning of a musical note at which the amplitude rises from zero to a peak. A beat is the rhythmic movement at which the song is played.

In some embodiments, the media compositor directs the song compositor to identify one or more audibly discernable transition locations in the composite song near a particular time in the presentation. In some of these embodiments, the song compositor returns (1) a list of such location that are near the particular time, and (2) a priority for each of these locations. The media compositor then uses this list of transitions to align an edit point in the composite media's definition to a transition location based the specified priority value(s) and the degree to which the media edit has to be moved to reach the transition location.

In some embodiments, the compositing application that implements the above-described method executes on a mobile device. This application only requires a user of a mobile device to capture photos and videos at different events. Once the user has captured photos and videos, the application can automatically group the content that was captured together, associate the group content with a location or event, present each defined group to the user, and to display a composite presentation for the group upon the user's selection of the group. For instance, when a user goes to an event (e.g., baseball game) and takes pictures and videos at the stadium, the mobile device can automatically group these pictures and videos, create a composite presentation from them, and provide the composite presentation to the user after the user leaves the game. Similarly, photos and videos from vacations (e.g., trips to Hawaii) can be grouped together, put in a composite presentation, and provided to users after their vacations ends.

BRIEF DESCRIPTION OF DRAWINGS

The novel features of the invention are set forth in the appended claims. However, for purposes of explanation, several embodiments of the invention are set forth in the following figures.

FIGS. 19-21 present several examples that explain the process of FIG. 18.

FIG. 25 illustrates an example of a jump table of FIG. 24 in more detail.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a media-compositing application that automatically organizes media content pieces (MCPs) that are stored on, and/or accessible by, a device into different groups, and produces a user interface (UI) layout that identifies the defined MCP groups as groups for which the application can display composite presentations (e.g., video presentations). In some embodiments, the application groups the MCPs by performing an automated process that is not triggered by a user request to group the MCPs. To group the MCPs, the application's automated process uses multiple grouping templates (templates), with each specifying a set of media attributes that are to be compared with the MCP content and/or attributes to group the MCPs.

In some embodiments, the generated UI layout includes summary panes for some, but not all, of the defined MCP groups. For instance, in some embodiments, the UI layout at any given time includes summary panes for the MCP groups that would be contextually most relevant to a user of the device at that time. However, in some embodiments, the application provides controls for allowing a user to view summary panes for other defined MCP groups that the application does not initially display with other summary panes in the generated UI layout. When a user selects a summary pane for an MCP group, the application displays a composite presentation that it generates from the group's MCPs without receiving any other user input.

Figure 1:
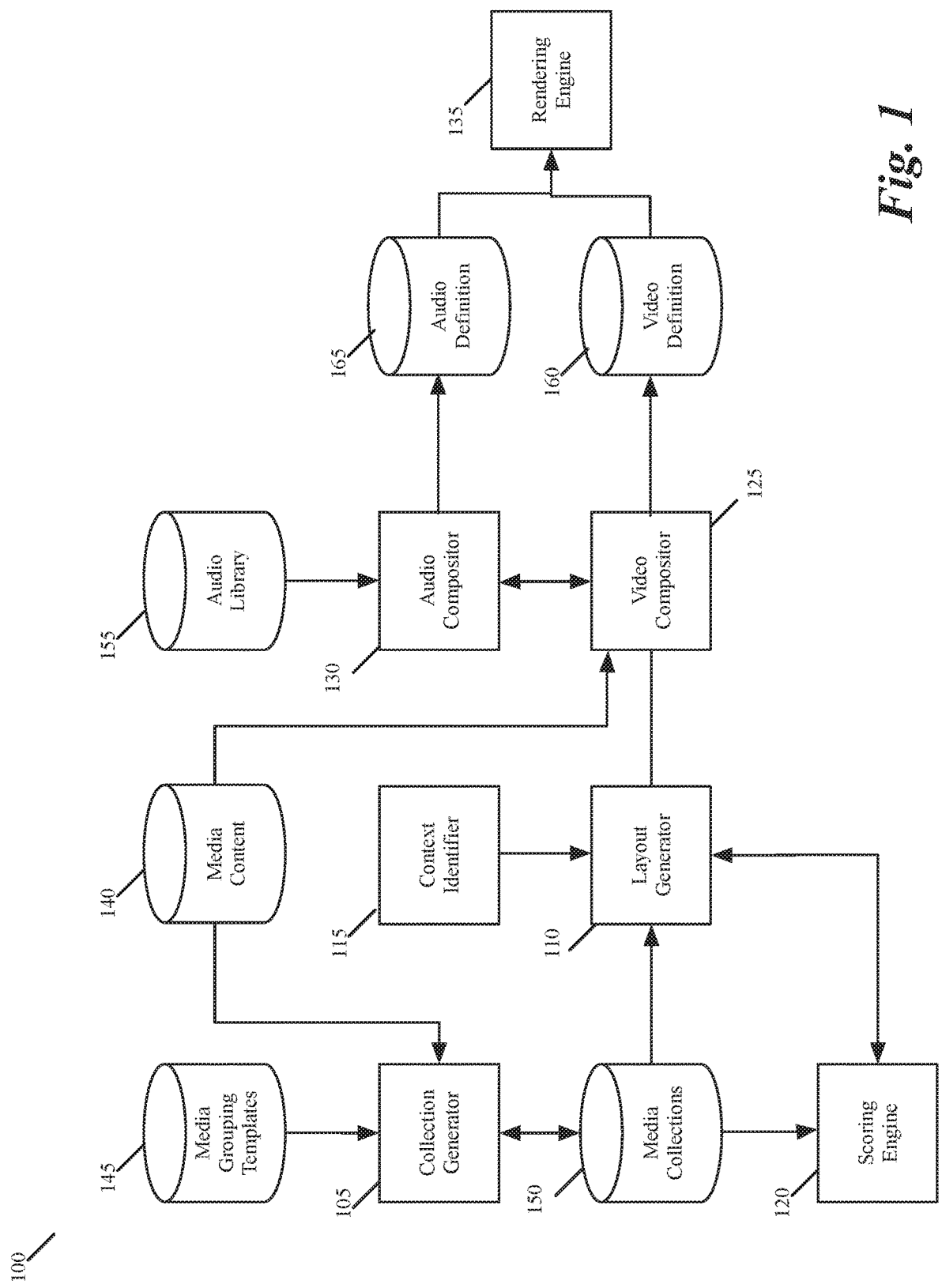
FIG. 1 conceptually illustrates a media-compositing application of some embodiments.

FIG. 1 illustrates one such media-compositing application 100. This application executes on a device that stores MCPs (e.g., videos, still images, etc.), and/or has access through a network to MCPs stored on other computing devices. This device is a computer (e.g., server, desktop or laptop), or a mobile device (such as a smartphone or tablet). As shown, this application includes a collection generator 105, a layout generator 110, a context identifier 115, a scoring engine 120, a media compositor 125, a song compositor 130, and a rendering engine 135. To perform their operations, these modules of the application access media content storage 140, template storage 145, media collection storage 150, audio storage 155, composite-video storage 160, composite-audio storage 165.

In some embodiments, the collection generator 105 and layout generator 110 perform an automated process that (1) analyzes the MCPs (e.g., analyzes the content and/or metadata of the MCPs) to define one or more MCP groups, and (2) produces a user interface (UI) layout that identifies the defined MCP groups as groups for which the application can display composite presentations (e.g., video presentations). In performing their operations, these modules in some embodiments use the scoring engine 120 and the context identifier 115.

More specifically, to define the MCP groups, the collection generator 105 in some embodiments uses one or more media grouping templates (templates) in the template storage 145 to try to associate each MCP stored in the media content storage 140 with one or more template instances. In some embodiments, the media content storage 140 is a data storage (e.g., a database) of the device that executes the application. In other embodiments, some or all of this storage 140 resides on a separate device (e.g., another computer, server, mobile device, etc.).

In some embodiments, a template in the template storage 145 is defined by reference to a set of media matching attributes. The collection generator 105 compares a template's attribute set with the content and/or metadata of the MCPs in order to identify MCPs that match the template attributes. When a sufficient number of MCPs match the attribute set of a template, the application of some embodiments defines a template instance by reference to the matching MCPs, and stores this template instance in the media collection storage 150. In some embodiments, a template instance includes a list of MCP identifiers that identify the MCP's that matched the instance's template attribute set.

In some embodiments, the collection generator 105 can define multiple template instances for a template. For instance, in some embodiments, the templates include (1) location-bounded templates (e.g., videos and/or photos captured within a region with a particular radius), (2) time-bounded templates (e.g., videos and/or photos captured within a particular time range and/or date range), (3) time-bounded and location-bounded templates (e.g., mornings at a beach), (4) content-defined templates (e.g., videos and/or photos containing smiles), and (5) user-metadata based templates (e.g., MCPs from albums created by the user, MCPs shared by a user with others, MCPs having particular user-defined metadata tags, etc.).

The collection generator 105 stores the definition of the template instances that, it generates in the media collection storage 150. In some embodiments, the generator repeats its grouping operation in order to update the template instance definitions in the media collection storage 150. For instance, in some embodiments, the generator repeats its grouping operation periodically, e.g., every hour, six hours, twelve hours, twenty four hours, etc. Conjunctively, or alternatively, the generator 150 in some embodiments performs its grouping operation whenever the application opens and/or based on user request.

Also, in some embodiments, the collection generator 105 performs its grouping operation each time a new MCP is stored, or a certain number of MCPS are stored, in the media content storage 140. For example, in some embodiments, the application 100 executes on a mobile device that captures a variety of image content data (e.g., still photos, burst-mode photos, video clips, etc.). Each time the mobile device captures an MCP (e.g., a photo, a video clip, etc.), the collection generator 105 in some embodiments tries to associate the captured MCP with one or more template instances, provided that the application is running in the foreground or background at that time.

Based on template definition, layout generator 110 in some embodiments generates UI layouts that identify the defined template instances as MCP groups for which the application can display composite presentations (e.g., video presentations). At any given time, the layout generator 110 of some embodiments generates a III layout that identifies a subset of the defined template instance that would be contextually relevant to a user of the device at that time. As further described below, this is based on the contextual attributes provided by the context identifier 115 and template instance scores computed by the scoring engine 120.

Figure 2:
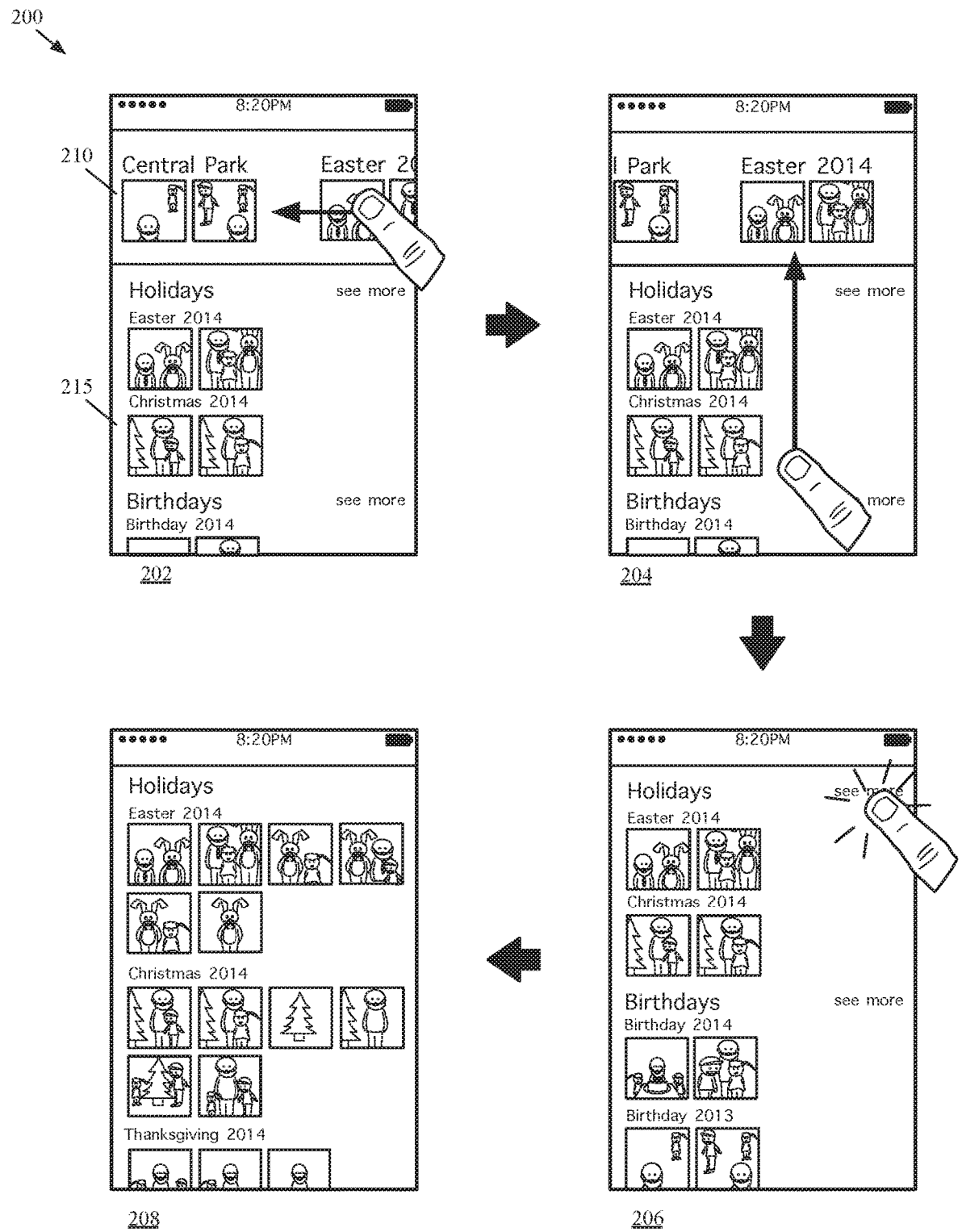
FIG. 2 illustrates an example of a layout generated by a layout generator.

FIG. 2 illustrates an example of a. UI layout 200 generated by the layout generator 110. In this example, the UI layout is displayed on a display screen of a mobile device 100 that executes the application of some embodiments. Also, this example is illustrated in terms of four stages 202-208 that show different aspects of this UI layout presentation.

As shown, the UI layout concurrently displays several summary panes 205 for a subset of template instances that are defined at a particular time. Each summary pane 205 displays information about its associated template instance. In this example, a template instance's summary pane includes a title plus one or more thumbnails of one or more MCPs of the instance. The layout generator 110 in some embodiments derives a summary pane's (1) title from the attribute set (e.g., MCP metadata such as location, or MCP content such as smiles, etc.) of the pane's instance, and (2) thumbnails from one or more of the better quality MCPs of the pane's instance. In some embodiments, the scoring engine 120 generates a score for each MCP to quantify its quality. This scoring will be further described below.

As further shown, the UI layout 200 has two different display sections 210 and 215. The first display section 210 displays summary panes for template instances that are deemed to be contextually relevant to a user of the device at that time, while the second display section 215 displays summary panes for different categories of template instances. In this example, two or more template instances belong to one category when they are derived from one media grouping template. Also, in this example, each category is identified by a category heading at the top of the summary panes for the template instances of that category. In this example, the categories are Holidays, Birthdays, Vacations, and Parks.

The first and second stages 202 and 204 of FIG. 2 illustrate that the user can scroll through the summary panes in the first section 210 by performing horizontal drag (left or right) operations, which are enabled by a touch-sensitive display screen of the mobile device 100. The second and third stages 204 and 206 illustrates that the user can scroll through the summary panes in the second section 215 by performing vertical touch drag (up or down) operations.

The third and fourth stages 206 and 208 illustrate that the second display section 215 initially displays summary panes only for the better quality template instances in each category. Specifically, the third stage 206 shows that the user can view all template instances created for a category by selecting a "See More" control 230 that appears above the summary panes for the Holidays category. The fourth stage 208 shows that this selection causes the III layout to expand the space for the Holidays category to reveal additional summary panes for additional Holidays template instances.

Accordingly, in the example illustrated in FIG. 2, the UI layout not only provides a first section that displays summary panes for template instances that are deemed to be contextually more relevant than template instances at a given time, but also limits the summary panes displayed in the second section to those that are the best ones in their respective categories. One of ordinary skill will realize that the UI layout of FIG. 2 is just one exemplary UI layout design. Other embodiments display, arrange, and/or nest the summary panes differently. Also, other embodiments provide different kinds of information for each summary pane.

To assess whether one template instance is contextually more relevant than, and/or better than, another one template instance at a particular time, the layout generator has the scoring engine 120 generates a score for each template instance, ranks the template instances based on the generated scores, and then generates the UI layout based on the rankings. In some embodiments, the UI layout concurrently shows summary panes for only a certain number of the highest-ranking template instances. In other embodiments, the UI layout concurrently show summary panes for only template instance with generated scores that exceed a certain minimum threshold.

In different embodiments, the scoring engine 120 generates the scores for the template instances differently. In some embodiments, a template instance's score is based on (1) contextual attributes that relate to the time at which the UI layout is being generated and/or displayed, and (2) quality and/or quantity attributes that relate to quality and/or quantity of the MCPs of the template instance. Different contextual attributes can be used in different embodiments. Examples of contextual attributes include (1) time, (2) location of the device, (3) location of future calendared events stored on, or accessible by, the device, (4) locations derived from electronic tickets stored on the device, etc.

In some embodiments, the context identifier 115 periodically collects such contextual attributes from one or more services modules executing on the device. Examples of these service modules include location service modules, such as GPS modules, or other location modules (e.g., frameworks) that generate the location data from multiple location determining services. The service modules also include in some embodiments one or more location prediction engines that formulate predictions about future locations of the device (1) based on events scheduled in a calendar application, or specified by an electronic ticket application, executing on the device, and/or (2) based on past locations of the device (e.g., locations associated with regions in which the device previously stayed more than a threshold amount of time). These services in some embodiments are framework level services.

In addition to, or instead of, periodically collecting such contextual attributes periodically, the context identifier 115 in some embodiments collects these attributes on-demand based on requests from the layout generator 110. The layout generator 110 passes the contextual attributes that it receives to the scoring engine 120, which then uses these attributes to derive template-instance scores in order to identify template instances that would be relevant (interesting) to a user (e.g., at the time that the generated UI layout will be displayed).

For instance, in some embodiments, the application can identify a future location of the device's user from the time and location of an event scheduled in a calendar application, or specified by an electronic ticket application, executing on the device. As the time approaches to the time of the calendared or ticketed event, the application increases the score of a template instance that is associated with the location of the event based on an assumption that the user would want to see MCPs previously captured at that location.

Figure 3:
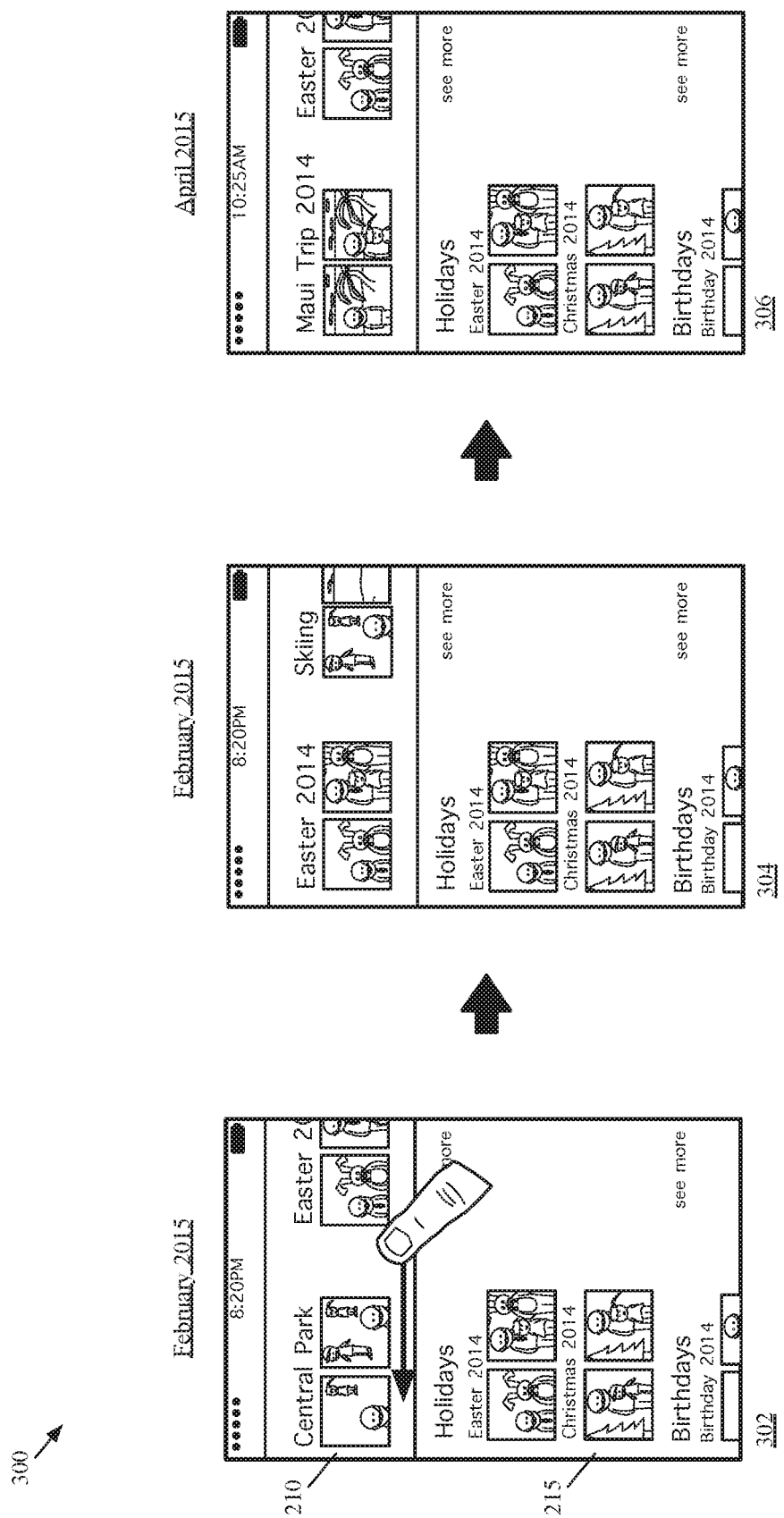
FIG. 3 illustrates an example of arranging template instance summary panes in some embodiments.

FIG. 3 illustrates an example that illustrates how the layout generator in some embodiments arranges the template instance summary panes based on their contextual relevance. This example is illustrated in three operational stages 302-306 of the mobile device 100. The first and second stages 302 and 304 illustrate the user scrolling through the UI layout 200 that has multiple summary panes in the first and second display sections 210 and 15. The second stage 304 illustrates that one of summary pane categories towards the bottom of the second display section 210 is a category for vacation, and that one vacation summary pane relates to Maui Spring 2014. The first and second stages 302 and 304 also show that the user is scrolling through the UI layout 200 during these stages in the February of 2015.

The third stage 306 illustrates a UI layout 300 that the layout generator generates in April 2015. In this UI layout 300, the layout generator has moved the Maui Spring 2014 template instance to the first display section 210, in order to present this collection as one of the featured collections for which it can automatically generate a composite presentation. The layout generator 110 does this in some embodiments because it detects that an electronic ticketing application executing on the device has an electronic ticket to Hawaii in the near future, and then determines that it has previously defined a template instance that includes the media content from the last Maui trip.

In this example, the contextual attributes that the layout generator passes to the scoring engine, and that the scoring engine uses in its scoring calculation to generate a high score for the Maui collection, include the destination location of the ticket and the date of the trip. In some embodiments, only the destination location or only the date from the ticket might be enough to move the Maui collection up the generated UI layout.

Also, in the example of FIG. 3, the Maui collection moves from the second display section to the first display section. In some embodiments, the layout generator emphasizes a summary pane by just moving it up in the second display section, or by relocating it to a different position in the first display section. In addition, the layout generator can redefine the UI layout at a much greater frequency than that illustrated in FIG. 3. For example, in some embodiments, the layout generator refreshes the UI layout based on a predicted destination of the device as the device is traveling to a new destination (e.g., in a car). Alternatively, or conjunctively, the layout generator in some embodiments refreshes the UI layout when a user leaves a region, in which the user captured a number of MCPs with the camera of the mobile device that executes the application of some embodiments.

In some embodiments, each template instance's score can depend on the quality and/or quantity attributes of the MCPs of the instance. In some embodiments, the scoring engine 120 generates a score for a template instance that accounts for quantity of MCPs in the instance based on an assumption that a larger quantity signifies a higher level of interest in the template instance. For example, a template instance that has a lot of photographs in one location on one particular day would typically signify that at an interesting event took place at that location on that particular day and the user would hence be more interested in seeing the photos form that event.

However, in some embodiments, the collection generator 105 discards duplicative or nearly duplicative MCPs (e.g., keeps only one photo when multiple identical or nearly identical photos exist) from a template instance or before their inclusion in the template instance because often having multiple such photos does not lead to an interesting composite presentation. On the other hand, the collection generator 105 in some cases maintains multiple photos from a burst-mode sequence so that the composite presentation can provide interesting burst-mode photo treatments. In some embodiments, the collection generator 105 also discards certain MCPs that are deemed not to be interesting (e.g., pictures of receipts, screenshot photos, etc.) or not to be useful (e.g., very blurry photos, etc.). These MCPs are filtered out in some embodiments before the template instances are created. In other words, these MCPs are never associated with template instances in some embodiments.

In some embodiments, each template instance's score accounts for the quality of the instance's MCPs based on an assumption that template instances with better content will result in better-generated composite presentations and thereby in composite presentations that are more interesting to the viewer. In different embodiments, the scoring engine 120 scores the MCPs based on different criteria. For instance, in some embodiments, the scoring engine generates an intrinsic score for an MCP based on one or more of the following MCP attributes and/or metadata: focus, blur, exposure, camera motion, voice content, face content, user input and/or behavior (e.g., user tags, user's inclusion in albums, user sharing with others, etc.). Some embodiments also score specialty MCP types (e.g., burst-mode photos, slow-motion videos, time-lapsed videos, etc.) higher than other MCP types (e.g., still photographs). Some embodiments also score MCPs that are captured at locations that are not associated with the device user's home or work higher than MCPs captured at home or work.

In some embodiments, the collection generator 105 uses the MCP intrinsic scores to filter out some of the MCPs before or after their inclusion in a template instance. In these embodiments, the collection generator 105 uses the scoring engine 120 to compute these scores. The scoring engine in some embodiments includes different scoring modules for computing different types of scores, e.g., MCP scores, context-based instance scores, quality-based instance scores, quantity-based instance scores, etc. In some embodiments, one or more of these scores (e.g., MCP scores) are provided by one or more framework services of the device. Alternatively, or conjunctively, the framework services in some embodiments provide metadata tags that characterized different characteristics of the MCPs, and these metadata tags are used to compute some or all of the scores.

In addition to the intrinsic scores, the scoring engine 120 computes extrinsic scores in some embodiments that express a quality of one MCP by reference to one or more other MCPs. For instance, in some embodiments, the scoring engine 120 computes extrinsic scores in order to define a selection order for the MCPs in a template instance. In some of these embodiments, the computed extrinsic scores quantify the temporal and visual distances between two successive MCPs in the selection order, as further described below.

When a user selects the summary pane for a template instance, the layout generator in some embodiments directs the media compositor 125 and the song compositor 130 to generate, for the selected template instance, the definitions of media and song presentations, which the rendering engine 135 renders to produce a composite presentation for display. The media compositor 125 in some embodiments generates the definition of the composite media presentation from the MCPs of the template instance.

In generating this definition, the media compositor uses the selection order that was computed by using the extrinsic scores, to select only a subset of the MCPs of the template instance. For instance, after the selection order is defined based on the time-and-difference distance values, the video-compositor of some embodiments selects the MCPs in the template instance up to the position in the selection order where two successive MCPs are within a certain distance of each other (e.g., within 0.25 unit time-and-difference distance of each other).

In some embodiments, this selection then allows the media compositor to automatically define the duration of the composite presentation without any user input. For instance, some embodiments compute the duration as the sum of the ideal duration of each MCP in the subset of selected MCPs. In some embodiments, each MCP has an MCP type, and the MCP's ideal duration is the ideal duration that is defined by its type. The computation of the ideal presentation duration will be further described below.

In other embodiments, the media compositor selects a duration for the composite presentation, and then uses the selection order to select the N highest ranking MCPs according to the selection order. Thus, these embodiments use the duration is used to identify the MCPs to select according to the selection order, while other embodiments use the selection order to define the presentation duration. However, given that both of these approaches in some embodiments rely on a selection that is based on computed time-and-difference distance scores, they ensure that the MCPs that remain in the template instance are the best quality MCPs that provide a visually unique combination of MCPs.

In some embodiments, the definition of the composite media presentation includes the identity of the instance's MCPs that are included in the presentation, the presentation order for the included MCPs, and the list of edit operations (e.g., transition operations, special effects, etc.) that are to be performed to generate the composite presentations from the MCPs. In some embodiments, the MCPs of the composite media presentation can be identical to the MCPs of the template instance, or they can be MCPs that the media compositor derives from the instance's MCPs.

For instance, multiple MCPs of the template instance can be still photos. For some or all of these still photos, the media compositor 125 generates a video clip in the composite generation by specifying a Ken Burns effect for each of these photos. Also, from a video clip MCP of a template instance, the application can extract one or more video clips to include in the composite presentation. Similarly, from an MCP that is a burst-mode sequence, the media compositor 125 can extract one or more still photos of the sequence and/or one or more Ken-Burns type video clips for one or more of the still photos of the sequence. Many other examples of deriving the composite-presentation MCPs from a template instance's MCPs exist.

In some embodiments, the media compositor generates composite media definition by selecting a blueprint for the composite presentation. In some embodiments, the blueprint describes the desired transitions, effects, edit styles (including pace of the edits), etc. Blueprint can also specify the desired type of presentation, which can then influence the type of MCPs included or emphasized in the composite presentation. For example, one blueprint might specify highlights as the desired type of presentation, while another blueprint might specify retrospective as the desired type. For highlights, the collection generator 105 or media compositor 125 in some embodiments selects the best MCPs that are representative of the MCPs of the template instance. For retrospectives, the collection generator 105 or media compositor 125 selects in some embodiments the MCPs that are not necessarily of the whole set of MCPs of the template instance.

In some embodiments, the blueprint also determines the duration of the composite presentation that the media compositor 125 automatically generates. In some of these embodiments, the application specifies the duration based on the amount of high-quality, unique content in the template instance and the blueprint. For instance, in some embodiments, the blueprint's specified parameters (e.g., parameters specifying ideal duration for the MCPs) along with the MCPs that are selected based on the selection order, determine the desired duration of the composite presentation. In some embodiments, the blueprint might also specify other parameter, such as the way the extrinsic scores are computed, etc.

For a template instance, the blueprint in some embodiments is associated with the template of the template instance. Alternatively, or conjunctively, the blueprint in some embodiments is associated with a mood that the application (e.g., the collection generator 105 or media compositor 125) automatically picks for the composite presentation. In some embodiments, the mood is an adjective that describes the type of composite presentation. Examples of mood include extreme, club, epic, uplifting, happy, gentle, chill, sentimental, dreamy, etc.

In some embodiments, the application 100 (e.g., the collection generator 105 or media compositor 125) automatically picks the mood for a composite presentation based on the type and/or duration of media in the template instance, content analysis on this media (e.g., detection of high motion video), and detected user-mood preferences. Also, in some embodiments, the application allows the mood to be modified for a composite presentation. In some of these embodiments, the video and song compositors 125 and 130 re-generate the composite presentation for a template instance after the user modifies the mood for a generated composite presentation. Some embodiments allow the user to view the mood for a template instance represented by a summary pane on the generated UI layout. If the user modifies the mood for the represented template instance, the video and song compositors 125 and 130 generate the composite presentation for this template instance based on the user change.

The application of some embodiments also allows the user to modify a presentation duration that the application initially computes. For instance, in some embodiments, the user can modify the presentation duration after being presented with a rendered composited presentation. Alternatively, or conjunctively, the application allows the user to view and modify the presentation duration in the generated UI layout (e.g., as part of the information provided by an instance's summary pane), without having to first view the rendered composite presentation with this duration. Some embodiments also allow the user to modify the MCPs that the collection generator 105 automatically selects for a template instance. In some embodiments, the user can modify the MCPs before and/or after viewing a composite presentation that the video and song compositors 125 and 1350 generate for a template instance that the collection generator 105 generates.

In some embodiments, the media compositor 125 includes a novel constrained solver that generates a composite media definition by exploring different manners for combining the MCPs of a template instance based on (1) a set of constraints that limit the exploration of the solution space, and (2) metadata tags that specify content characteristics (e.g., for a photo, or for ranges of frames of a video). Examples of constraints include duration constraints (e.g., ideal, minimum and maximum durations for each MCP type) and positional constraints (e.g., one MCP type cannot be placed next to another MCP type).

In exploring the solution space to find an optimal solution that satisfies the constraint and meets one or more optimization criteria, the constrained solver in some embodiments preferentially costs solutions that use MCPs that are highly ranked in the selection order. Also, in finding the optimal solution, constrained solver in some embodiments (1) identifies different portions of the template instance MCPs (e.g., different segments of the video clips, etc.) based on the metadata tag ranges, and (2) explores solutions based on these identified portions.

In some embodiments, the solver discards MCP segments from an identified solution that are smaller than a certain size. The solver in some embodiments also explores whether an MCP segment in an identified solution should be split into smaller segments in order to delete one or more ranges in the middle of the segment (e.g., ranges that undesirable content, such as ranges with excessive camera motion, etc., and/or ranges that do not have desirable content, such as ranges that do contain any faces). In some of these embodiments, the solver restarts its search for a solution after deleting smaller resulting segments and/or splitting MCPs into smaller segments.

In some embodiments, the media compositor also specifies Ken-Burns effects for still photos in order to define video presentations for the still photos. The media compositor in some embodiments specifies special treatments for other types of image content (such as burst-mode sequences, slow-motion sequences, time-lapse sequences, etc.) that result in the generation of a video sequence for this type of content. By only using extracted segments of MCPs and by specifying special treatment effects for photos and other type of content, the media compositor generates MCPs for the composite presentation from the MCPs of the template instance.

In some embodiments, the media compositor provides the desired duration of the composite presentation to the song compositor, after this duration from the selection order and/or blueprint. Based on the received desired duration, the song compositor then dynamically defines a composite song presentation to accompany the composite media presentation of the media compositor. This song compositor dynamically defines the song presentation to include several audio segments in a particular sequence, and a set of edits and transitions between the audio segments in the sequence. In some embodiments, the audio segments are part of one song, while in other embodiments, they can be part of two or more songs.

These audio segments are referred to as body segments to signify that they are parts of another song. In some embodiments, the song compositor also selects an ending segment from several candidate ending segments for the composite song presentation. The song compositor in some of these embodiments can also select a starting segment from several starting segments for the composite song presentation. An editor defines the body, starting and ending segments from one or more songs by using the audio authoring tools of some embodiments.

To ensure that the segments are properly arranged in the composite song presentation, the song compositor of some embodiments uses (1) insertion rules that specify how audio segments can be inserted in an audio sequence, and (2) sequence rules for ensuring that the inserted audio segments can neighbor other segments in the sequence. In some embodiments, the insertion rules are defined by reference to audio sections to which each body segments belong. Specifically, in some embodiments, the audio segment editor associates each body segment to one section in a set of sequentially specified sections, and specifies a particular sequential ordering of the body segments in each section. The insertion rules of some embodiments specify that a body segment that belongs to a subsequent second section cannot be inserted before a body segment that belong to an earlier first section. The insertion rules also require that body segments that belong to the same section be placed next to each other based on their order in their respective section.

In some embodiments, these sequence rules are embedded in a jump table that has multiple rows and columns, and each body segment is associated with one row and one column. In some embodiments, each starting or ending segment is also associated with at least one row or one column. Each jump table cell then specifies whether the two segments that are assigned to that cell's row and column are allowed to follow each other in an order specified by the row and column assignment. An editor uses the authoring tool of some embodiments to specify the jump table and its attributes for the body, starting and ending segments that the editor defines. At runtime, the song compositor then uses this jump table to automatically define a song for a duration specified by the media compositor.

In some embodiments, each jump table cell also specifies whether a transition is required at the transition between the two segments. The jump table in some embodiments also specifies (1) a priority value for each body segment and (2) an identifier for indicating whether the body segment can be sliced during the song compositing. In some embodiments, the song compositor inserts body segments in a presentation order based on the segment priority values and based on a set of insertion rules, until a particular duration is reached. This duration in some embodiments is the ideal duration provided by the media compositor minus the duration of the longest ending segment. After arranging the body segments, the song compositor adds an ending segment, and when the audio sequence is still shorter than the desired duration, a starting segment if one segment is available that would not make the sequence duration exceed the desired duration.

In some embodiments, the media compositor 125 and song compositor 130 have several novel interactions. The first is the media compositor automatically generates a desired presentation duration, and the song compositor dynamically generates a definition of a composite song presentation based on this duration, as described above. Another novel interaction is that in some embodiments the song compositor provides the location of the ending segment, and/or location of a stinger in the ending segment, to the media compositor so that the media compositor can align the start of the last video or image segment with the ending segment or stinger in this segment. In some embodiments, the video and song compositors also synchronize fade-out effects that they apply to their respective presentations with each other.

Also, in some embodiments, the media compositor performs post-processing to align edit points in the composite media to certain audibly discernable transition locations in the composite song. These locations in some embodiments include location of beats, locations of onsets, locations of segment boundaries, and location of ending-segment stinger in the composite definition. An audio onset corresponds to the beginning of a musical note at which the amplitude rises from zero to a peak. A beat is the rhythmic movement at which the song is played. An ending segment stinger is a short piece of music in the ending segment that signifies the start of the end of the ending segment.

In some embodiments, the media compositor directs the song compositor to identify one or more audibly discernable transition locations in the composite song near a particular time in the presentation. In some of these embodiments, the song compositor returns (1) a list of such location that are near the particular time, and (2) a priority for each of these locations. The media compositor then uses this list of transitions to align an edit point in the composite media's definition to a transition location based the specified priority value(s) and the degree to which the media edit has to be moved to reach the transition location.

After the media compositor generates a definition of the composite media presentation, and the song compositor generates a definition of the composite song presentation, these modules store the generated media and song presentation definitions respectively in the media and song definition storages 160 and 165. Some embodiments use one storage (e.g., one file) to store both of these definitions. From the storages 160 and 165, the rendering engine 135 retrieves the media and song presentation definitions and generates a rendered composite presentation from these definitions. In some embodiments, the rendering engine 135 stores the rendered composite presentation in a file that it stores on the device, or outputs the rendered composite presentation to a frame buffer of the device for display.

One of ordinary skill will realize that the application 100 in other embodiments operates differently than described above. For instance, instead of defining the composite presentation for a template instance after a user selects the summary pane for the template instance in the UI layout, the application of some embodiments defines the composite presentation before the UI layout is generated. In some of these embodiments, the application generates a score for each defined composite presentation, and then uses the generated scores for all of the defined composite presentations to define and arrange the UI layout. For instance, in some embodiments, the application uses the generated composite-presentation scores to identify the subset of composite presentations that should initially be concurrently represented on the UI layout, and to identify the order of summary panes for these composite presentations on the UI layout. Alternatively, some embodiments render the composite presentations before generating the UI layout. Still other embodiments define a portion of a composite presentation before the UI layout is generated, and then generate the rest of the definition of the composite presentation after the UI layout is generated.

Figure 4:
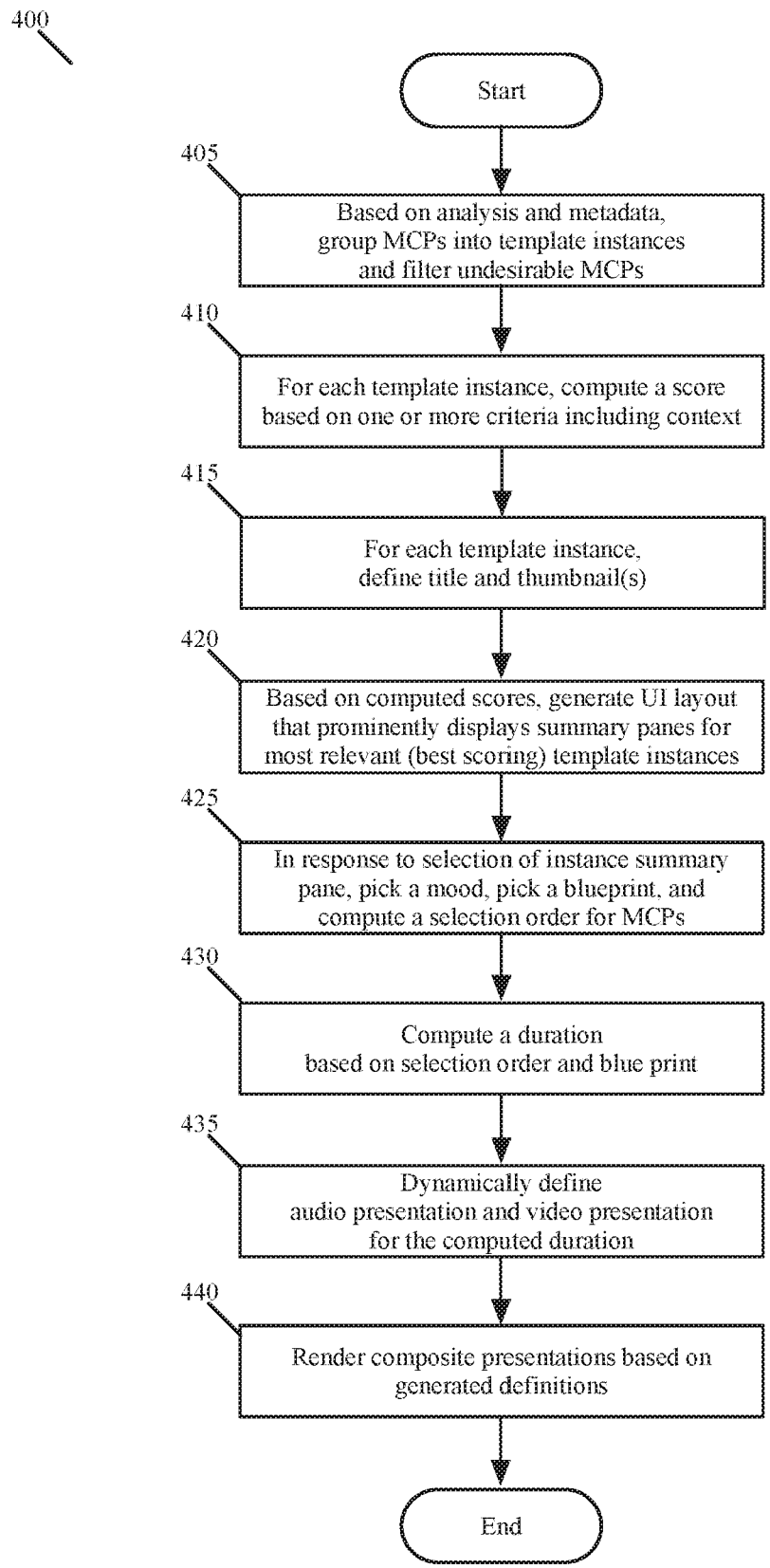
FIG. 4 illustrates a process of operations performed by the media-compositing application of FIG. 1.

The operation of the application 100 will now be described by reference to a process 400 of FIG. 4. The sequence of the operations of the process 400 just presents one manner that the modules of this application operate in some embodiments. One of ordinary skill will realize that, as described above and further below, other embodiments have these modules perform these operations in a different sequence, and/or have some of the operations performed by other modules. As such, the description of process 400 is meant to provide only one exemplary manner for implementing some embodiments of the invention.

The process 400 starts by the collection generator 105 defining and/or updating template instances that group MCPs based on their similar attributes. As mentioned above, the collection generator 105 in some embodiments uses one or more media grouping templates (templates) in the template storage 145 to associate the MCPs stored in the media content storage 140 with one or more template instances. In some embodiments, the generator 105 also tries to associate MCPs stored remotely (e.g., on remote storages of other devices with one or more template instances.

As further described below, the collection generator 105 compares a template's attribute set with the content and/or metadata of the MCPs in order to identify MCPs that match the template attributes. After identifying the MCP collection for a template instance, the collection generator 105 discards undesirable MCPs from a template instance. Undesirable MCPs include poor quality MCPs (e.g., MCPs with too much camera motion, etc.), uninteresting MCPs (e.g., pictures of receipts, screenshot photos, etc.), and duplicative or nearly duplicative MCPs. Duplicative MCPs (e.g., multiple nearly identical or very similar photos) often do not lead to an interesting composite presentation. However, in some cases, duplicative MCPs (e.g., photos from a burst-mode sequence) are not filtered. Also, in some embodiments, some or all of the undesirable MCPs (e.g., the uninteresting MCPs, or the MCPs with poor image characteristics) are filtered out before the collection generator 105 defines the template instances.

Next, at 410, the process 400 has the scoring engine 120 generate a score for each template instance that is defined or updated at 405. In different embodiments, the scoring engine 120 generates the scores for the template instances differently. In some embodiments, a template instance's score is a weighted combination (e.g., weighted sum) of (1) a contextual score that is based on contextual attributes relating to the time at which the UI layout is being generated and/or displayed, (2) a quality score that quantifies the quality of the MCPs of the template instance, and (3) a quantity score that quantifies the quantity of the MCPs of the template instance. The computation of these scores was described above, and is further described below.

At 415, the process 400 defines a title and selects one or more thumbnails for each defined or updated template instance. Some embodiments use the title and thumbnail(s) for the template instance's summary pane in the generated UI layout. In some embodiments, the layout generator 110 derives a template instance's title from the attribute set (e.g., MCP metadata such as location, or MCP content such as smiles, etc.) of the instance. Also, in some embodiments, the layout generator derives the instance's thumbnails from one or more of the better quality MCPs of the instance. Some embodiments compute a score that quantifies the intrinsic quality of an MCP as further described below.

Next, at 420, the layout generator 110 in some embodiments generates UI layouts that identify the defined template instances as MCP groups for which the application can display composite presentations (e.g., video presentations). At any given time, the layout generator 110 of some embodiments generates a UI layout that identifies a subset of the defined template instance that would be contextually relevant to a user of the device at that time.

To arrange the template instance summary panes in the UI layout in a contextually relevant manner, the layout generator 110 in some embodiments uses the template instance scores computed at 410. For instance, in some embodiments, the layout generator 110 uses the computed template instance scores (1) to sort the template instances, (2) to show the contextually most relevant template instances in the featured, first display section 210 of the UI layout, and (3) to identify the template instances that are to be initially displayed in each template category in the second display section 215 of the UI layout.

In some embodiments, the contextually most relevant template instances for the first display section are the template instances that have the highest composite computed score are the template instances with the highest weighted sum score computed from the composite score, quality score, and quantity score). The template instances that are then initially displayed for each template category are the template instances that are highest composite scoring template instances in their category that are not displayed in the first display section.

Other embodiments use the computed scores in a different manner to define the arrangement of the summary panes in the UI layout. For instance, in some embodiments, the contextual and quality scores are used to identify the arrangement of summary panes in the first display section 210, while the quality and quantity scores are used to identify the arrangement of the initially displayed summary panes in the second display section 215. Other embodiments use these or other scores in other manners to define the UI layout.

At 425, a user selects a summary pane for a template instance. In response, the layout generator in some embodiments directs (at 425) the media compositor 125 to generate, for the selected template instance, the definition of the composite presentation. In some embodiments, the media compositor 125 generates the definition of the composite media presentation from the MCPs of the template instance, while directing the song compositor to generate the definition of the associated composite song presentation.

To generate the definition of the media composite presentation, the media compositor 125 automatically picks (at 425) the mood for the composite presentation based on the type and/or duration of media in the template instance, content analysis on this media (e.g., detection of high motion video), and detected user-mood preferences. After picking the mood, the media compositor picks (at 425) a blueprint for the composite presentation based on the selected mood. As described above, the blueprint in some embodiments describes the desired transitions, effects, edit styles (including pace of the edits), the desired type of presentation, etc.

At 425, the media compositor defines the selection order for selecting the MCPs of the selected template instance. As described above and further described below, the media compositor defines the selection order by having the scoring engine compute extrinsic scores that quantify the time-and-difference distance values between the MCPs of the template instance.

Next, at 430, the media compositor computes a desired duration for the composite presentation based on the selection order and the blue print. For instance, the video-compositor of some embodiments selects a subset of the MCPs of the template instance up to the position in the selection order where two successive MCPs are within a certain time-and-difference distance of each other (e.g., within 0.25 unit time-and-difference distance of each other). In conjunction with the blueprint, which specifies the type of desired edits (e.g., fast transition edits, or slow transition edits), the selection of the subset of MCPs based on the selection order, allows the media compositor to automatically define the duration of the composite presentation without any user input.

For instance, some embodiments compute the duration as the sum of the ideal duration of each MCP in the subset of selected MCPs. In some embodiments, each MCP has an MCP type, and the MCP's ideal duration is the ideal duration that is defined by its type. In some of these embodiments, the ideal duration for an MCP type is adjusted based on the blueprint that is selected. Other embodiments automatically define the duration of the composite presentation differently. For instance, in some embodiments, the media compositor does not account for the blueprint in computing the desired duration, and just computes the desired duration of the composite presentation based on the subset of MCPs that it picked by using the selection order.

After computing (at 430) the desired duration of the composite presentation, the media compositor 125 in some embodiments (at 43:3) provides this duration to the song compositor 130 and directs this compositor to dynamically generate the definition of a song presentation that has this duration. As mentioned above, and further described below, the song compositor generates this definition by exploring different combinations of body segments from one or more songs, along with different possible starting and ending segments.

Next, at 435, the media compositor dynamically generates the definition of a media presentation that has the desired duration. As mentioned above and further described below, the media compositor 125 uses a constrained solver that generates a composite media definition by exploring different manners for combining the MCPs of a template instance based on (1) a set of constraints that limit the exploration of the solution space, and (2) metadata tags that specify content characteristics (e.g., for a photo, or for ranges of frames of a video).

In exploring the solution space to find an optimal solution that satisfies the constraint and meets one or more optimization criteria, the constrained solver in some embodiments (1) identifies different portions of the template instance MCPs (e.g., different segments of the video clips, etc.) based on the metadata tag ranges, and (2) explores solutions based on these identified portions. Also, the media compositor specifies Ken-Burns effects and other special treatments for still photos and other MCPs in order to generate aesthetically pleasing media presentations.

At 435, the video and song compositor 125 and 130 have several interactions in order to synchronize the defined media and song presentations. For instance, as mentioned above, the media compositor obtains the location of the ending segment, and/or the stinger in this ending segment, from the song compositor in order to align the start of the last video or image segment with this ending segment or stinger.

Also, in some embodiments, the media compositor obtains from the song compositor the location of any fade-out effect that the song compositor is defining for the end of the song presentation, so that the media compositor can synchronize its video fade-out effect with the audio fade out. In some embodiments, the media compositor can also obtain from the song compositor one or more audibly discernable transition location that are near a particular time in the presentation, so that the media compositor can roll a video edit at this time to coincide with one of obtained locations. This will be further described below.

After the video and song compositors generate the definitions for the media and song presentations, the rendering engine 135 generates (at 440) a rendered composite presentation from these definitions. In some embodiments, the rendering engine 135 outputs the rendered composite presentation to a frame buffer of the device for display. In other embodiments, the rendering engine can store the rendered composite presentation in a file that it stores on the device.

Before or after viewing the composite presentation, the application allows a user to modify the composite presentation. For instance, in some embodiments, the user can modify the duration or mood of the composite presentation. Some embodiments also allow the user to change the song that is used for the composite presentation. Similarly, some embodiments allow the user to change the MCPs (e.g., add or delete MCPs) that are used for the composite presentation.

Figure 5:
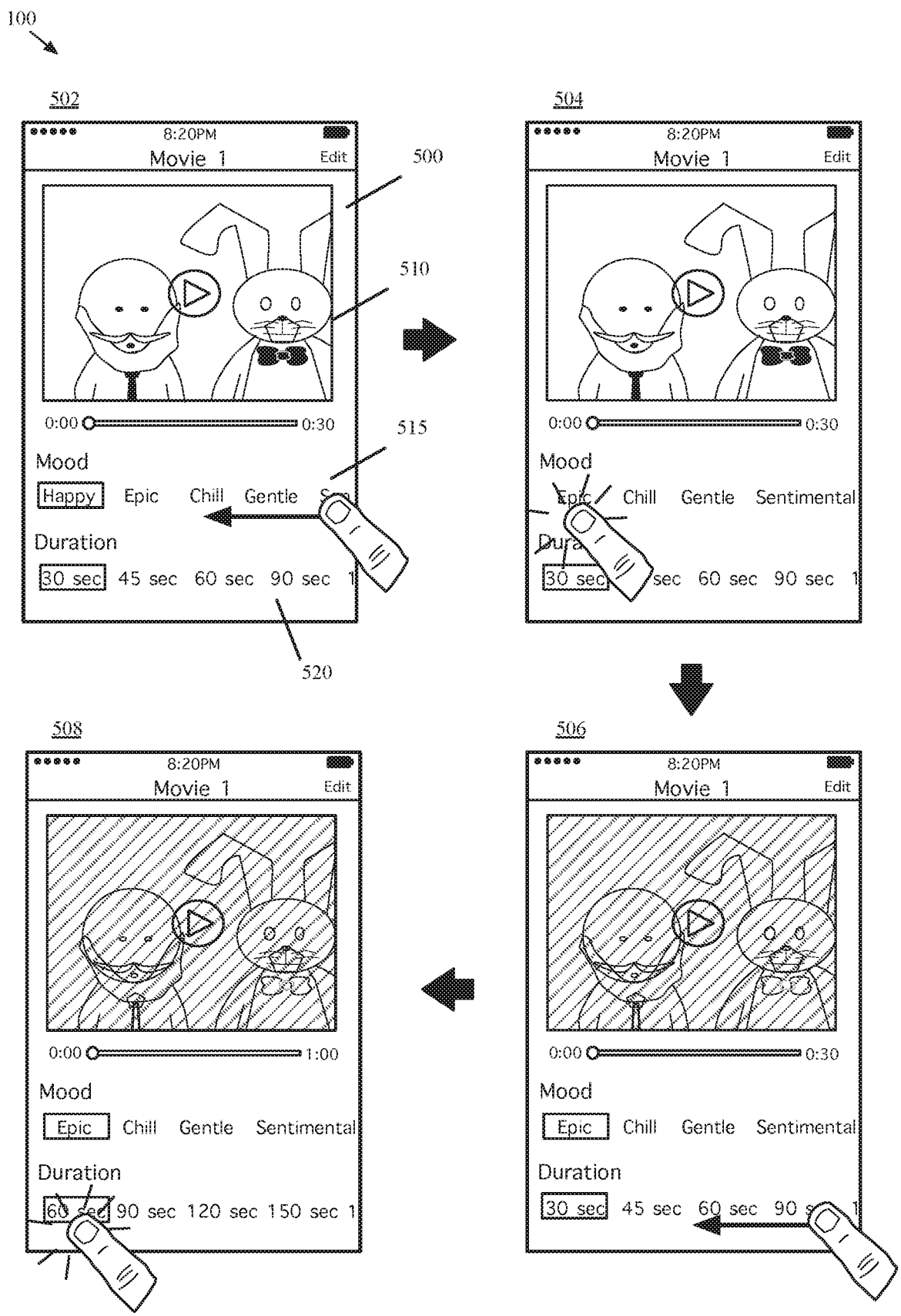
FIG. 5 illustrates an example of the media-compositing application user interface of some embodiments.

FIG. 5 illustrates how the UI of the application of some embodiment represents the machine-selected mood and the machine-generated duration of the composite presentation, and how this UI allows the user to change this presentation and duration. This example is illustrated in four operational stages 502-508 of the mobile device 100. Each of these stages shows a page 500 that displays a viewer 510 in which the composite presentation can be played. This application illustrates this page 500 after finishing a full-screen display of the composite presentation or after the user stops the full-screen composite presentation display. In some embodiments, the user has to select the viewer (e.g., by tapping it) to start a full screen display of the presentation again, or to start a display of this presentation just in the viewer's window.

Each stage also shows a mood slider 515 and a duration slider 520. Each slider lists a number of candidate slider values that can scroll left and right across the screen in a sliding direction when the user performs a drag operation on the slider. The mood slider lists several mood values (e.g., Happy, Epic, Chill, Gentle, Sentimental, etc.), while the duration slider lists several durations (e.g., 30 seconds, 45 seconds, 60 seconds, etc.).

The first stage 502 shows the user performing a drag operation on the mood slider 515. This stage also shows the machine-selected mood for the composite presentation is happy. The second stage 504 shows the user selecting the Epic mood in order to change the mood of the composite presentation from Happy to Epic. The third stage 506 shows that the presentation mood has been changed to Epic.

The third stage 506 also shows the user performing a drag operation on the duration slider 520. This stage also shows the machine-defined duration for the composite presentation is 30 seconds. The fourth stage 508 shows the user selecting a 60 second duration in order to change the duration of the composite presentation from 30 seconds to 60 seconds. The fourth stage 508 also shows that the presentation duration has been changed to 60 seconds.

Figure 6:
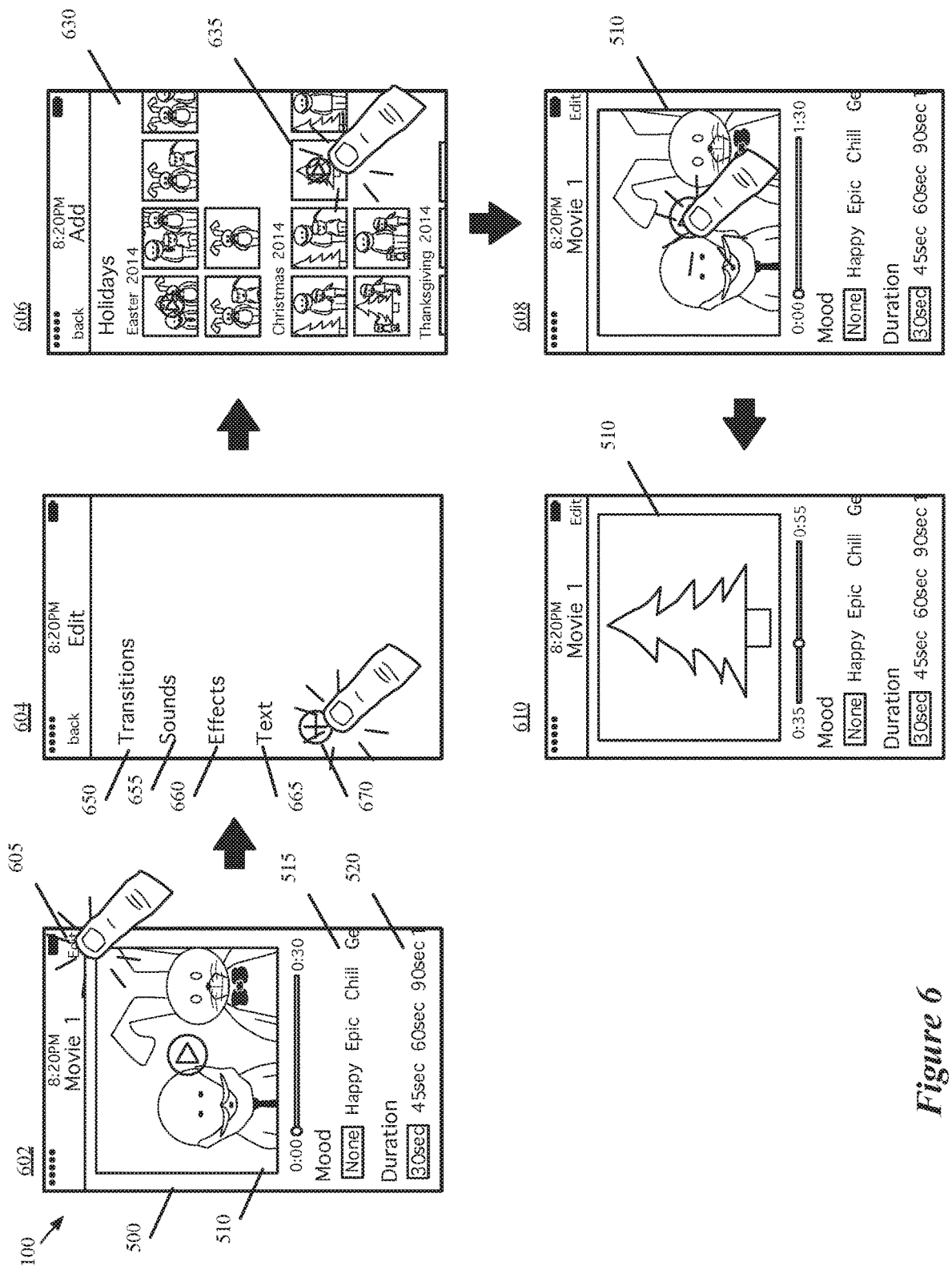
FIG. 6 illustrates an example of allowing a user to change content for the composite presentation.

FIG. 6 illustrates how the UI of the application allows the user to change the content that the application automatically picks for the composite presentation. This example is illustrated in five operational stages 602-610 of the mobile device 100. The first stage 602 is similar to the first stage 502 of FIG. 5 in that it displays page 500 with the viewer 510, the mood slider 515 and the duration slider 520. This page also includes an Edit control 605. The first stage shows the user's selection of this control.

The second stage 604 shows that in response to the selection of the Edit control 605, the application displays several edit controls, such as (1) a transition control 650 for modifying one or more machined selected transitions in the composite presentation, (2) a music control 655 for modifying the song that is used to automatically generate a song for the composite presentation, (3) an effects control 660 for modifying one or more machined specified effects for the composite presentation, (4) a title control 665 for modifying one or more machine-generated titles for the composite presentation, and (5) a content control 670 for adding or removing MCPs automatically selected for the composite presentations.

Selection of any of these controls would direct the application to present one or more additional controls for effectuating the operation associated with the selected control. In the example illustrated in FIG. 6, the selected control is the content control 670, which is selected in the second stage 604.

The third stage 606 shows that the selection of the content control 670 directs the application to present a page 630 that displays a list of MCPs that the user can select to add or remove MCPs from the composite presentation. On this page, some embodiments display the MCPs that are already included in the composite presentation differently (e.g., with a different shade or with a designation on top) than the MCPs that are not already included in the presentation.

The third stage 606 also shows the user selecting a thumbnail of a video clip 635 for addition to the composite presentation. The fourth and fifth stages 608 and 610 then show the composite presentation playing in the viewer 510. As shown in the fifth stage, the composite presentation now includes content from the selected video clip 635.

Figure 7:
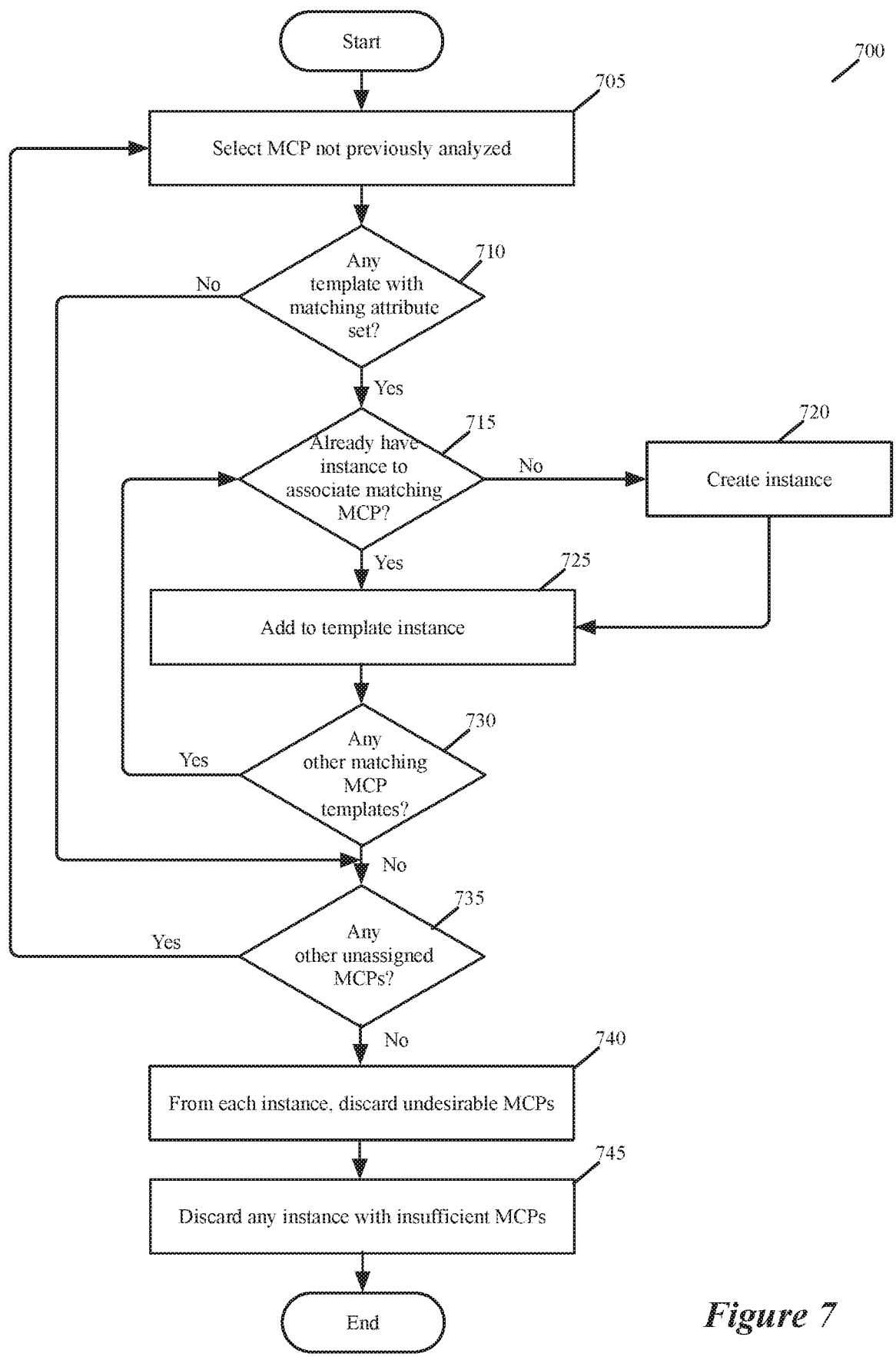
FIG. 7 illustrates a process of associating media content pieces (MCPs) to one or more template instance.
Figure 8:
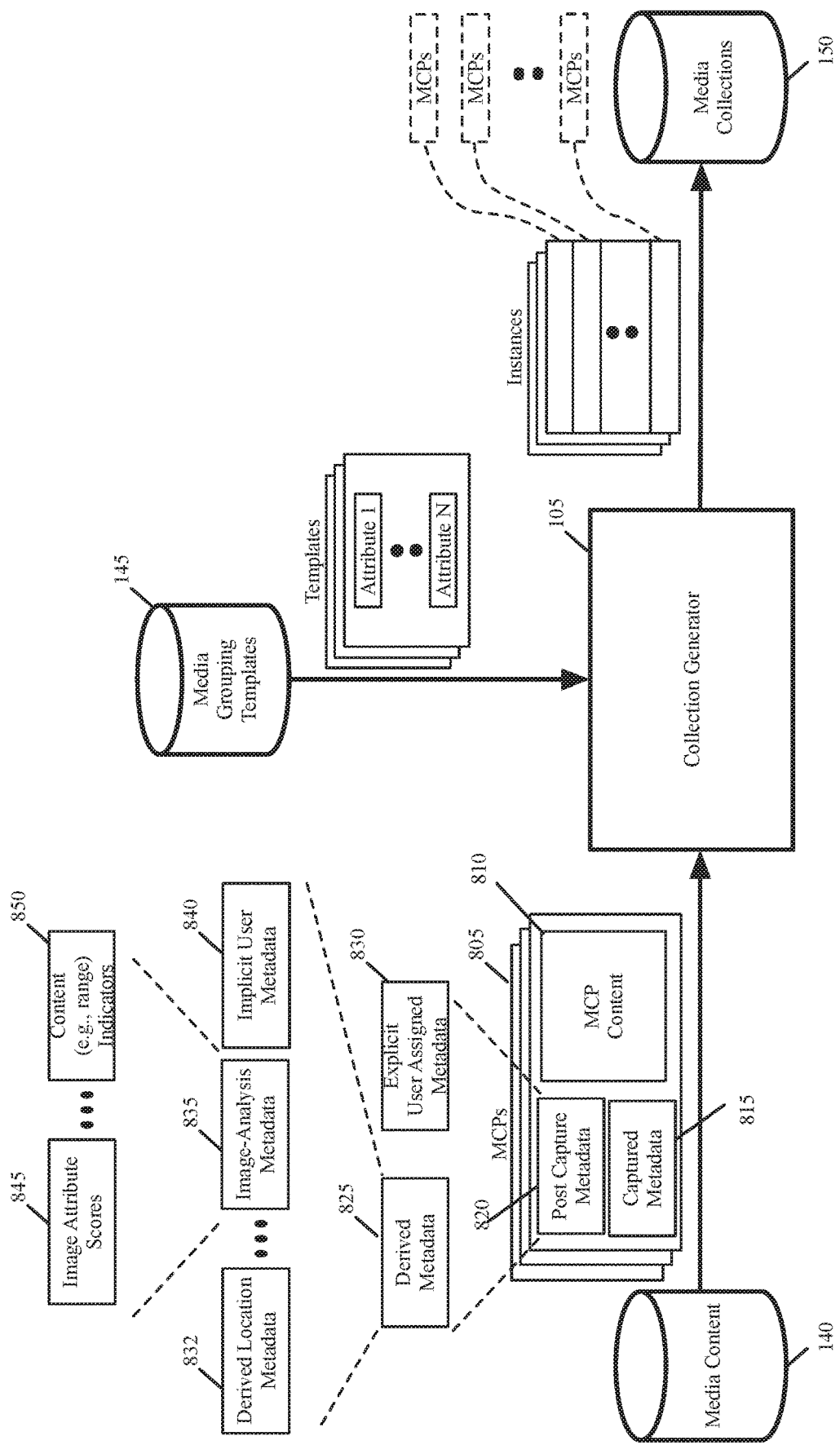
FIG. 8 illustrates associating the MCP to a template instance by adding a reference to the template instance.

FIG. 7 illustrates a process 700 that the collection generator 110 to try to associate MCPs to one or more template instance. This figure will be described by reference to FIG. 8, which illustrates the inputs that the collection generator processes to automatically define the template instances without user input. As shown in FIG. 8, the collection generator 105 receives MCPs along with their associated metadata from the media content storage 140. The collection generator 105 compares each MCP's metadata with the attribute set of each template stored in the template storage 145, in order to determine whether the MCP should be associated with the template. When the MCP match should be associated with a template, the collection generator associates the MCP to a template instance of the matching of template. In the example illustrated in FIG. 8, this association is established by adding a reference (e.g., a pointer or an identifier) to the template instance that refers to the matching MCP. When one such template instance has not been previously defined, the collection generator defines the template instance.

In some embodiments, the process 700 starts each time the application starts. Also, in some embodiments, the process starts each time the application is running and one or more new MCPs are received. For instance, in some embodiments, the application executes on a mobile device that has a camera that captures pictures and videos. In some of these embodiments, the process 700 starts each time the device captures one or more new photos or videos. These or other embodiments can also start the process whenever a new set of MCPs become available on a remote storage.

In some embodiments, the process 700 can also start each time a new template is added to the template storage 145. In such a case, the process 800 analyzes again all previously analyzed MCPs for this new template. Other embodiments start the process 800 different, e.g., perform this process periodically, e.g., every hour, six hours, twelve hours, twenty four hours, etc. Conjunctively, or alternatively, some embodiments start this process whenever the application opens and/or based on user request.

As shown, the process 700 initially selects (at 705) an MCP that it has not previously analyzed to associate with one or more templates. In some embodiments, the selected MCP might be a new MCP, or it might be a previously analyzed MCP that has not been analyzed for one or more new templates that have been recently defined. The selected MCP in some embodiments is one that resides on a data storage (e.g., a database) that resides on the device that executes the collection generator. In some embodiments, the selected MCP can be an MCP that resides on a separate device (e.g., another computer, server, mobile device, etc.) that is accessible by the collection generator's device through a network.

As shown in FIG. 8, an MCP 805 in some embodiments includes MCP content 810, captured metadata 815, and post-capture metadata 820. The MCP content typically includes image content, such as pixel values for one or more photos or video frames. It can also include one or more audio tracks, as in the case where the MCP is a video clip with an audio track. Examples of different types of visual MCP content include a still photo, a video clip, a burst-mode photo sequence, a panoramic photo, a time lapse videos, a slow motion video, etc.

The captured metadata 815 includes metadata generated by the MCP capture device, e.g., the camera, at the time that the MCP is captured. Examples of capture metadata include date and time of MCP capture, location of MCP capture, and one or more camera settings (e.g., exposure, focus rectangle, etc.) for the MCP capture.

Post-capture metadata include metadata that is defined for the MCP after the MCP has been captured. As shown, two examples of post-capture metadata include derived metadata 825 and explicit user-assigned metadata 830. User-assigned metadata 830 includes keywords (e.g., birthday, vacation, anniversary, etc.) or other tags e.g., like, dislike, favorite, etc.) that the user assigns to MCP. It also includes user-specified associations for the MCP, e.g., inclusion in a user-specified album, etc.

The derived metadata 825 includes different types of metadata that are derived by analyzing the MCP content 810, the captured metadata 815, user-assigned metadata 820 and/or user actions with respect to the MCP. One or more framework services of the device analyze the MCPs, their metadata and associated user actions to produce the derived metadata 825. Examples of such derived metadata include derived location metadata 830, image-analysis metadata 835, and implicit user metadata 840. Implicit user metadata 840 is metadata that is generated by monitoring user actions with respect to the MCP, e.g., sharing the MCP with others, repeatedly viewing the MCP, etc.

Derived location metadata 830 include location data that is associated with the MCP by analyzing the metadata associated with the MCP. For instance, in some embodiments, the captured location metadata for an MCP is analyzed in order to associate the MCP with region and/or area designations that allow the MCP to be grouped with other MCPs. In some embodiments, the application or a framework service generates a hierarchical directed acyclic graph (DAG) structure that includes nodes corresponding to regions and sub-regions. In some of these embodiments, the derived location metadata is defined in terms of region node identifiers in DAG structure.

Image analysis metadata 835 includes one or more metadata attributes that are defined by analyzing the MCP image content 810. In some embodiments, this metadata includes image attribute scores 845 and content indicators 850. Examples of image attribute scores 845 include scores for quantifying focus, exposure, blur, sharpness, color attributes, etc. These scores are generated one or more framework services of the device in some embodiments. The content indicators 850 indicate the type of MCP content and characterize this content. In case of an MCP clip with multiple frames or images (e.g., in case of a video clip), the content indicators can be expressed in terms of ranges that define the range of images or frames over which a particular content indicator is valid. Examples of content indicators include face indicators, smile indicators, voice indicators, camera motion indicators, junk content indicators, scene indicators, image quality indicators, etc. These indicators are generated one or more framework services of the device in some embodiments.

After selecting an unassigned MCP, the process 700 determines (at 710) determines whether any template in the template storage 145 has a set of attributes that match the captured or post-captured metadata 810 and 815 of the MCP. As described above, a template in some embodiments is defined by reference to a set of media matching attributes 855. The process 700 compares (at 710) a template's attribute set with the MCP's metadata in order to identify MCPs that match the template attributes.

Examples of templates in some embodiments include (1) location-bounded templates (e.g., videos and/or photos captured within a region with a particular radius), (2) time-bounded templates (e.g., videos and/or photos captured within a particular time range and/or date range), (3) time-bounded and location-bounded templates (e.g., mornings at a beach), (4) content-defined templates (e.g., videos and/or photos containing smiles), (5) user-metadata based templates (e.g., MCPs from albums created by the user, MCPs shared by a user with others, MCPs having particular user-defined metadata tags, etc.), and (6) any combination of these templates.

Each of these types of templates can be expressed in terms of a set of template attributes. For example, a location-bounded, content-defined templates might specify two attributes: (1) the MCP should contain a smile, and (2) the MCP is captured within a machine-derived region that is not the device's home or work location. For this template, a template instance is then defined to include any MCP that has metadata that indicates that its image content includes a smile and that its derived location metadata 830 indicates that it is associated with a machine-specified region that is not the device's home or device.

When the selected MCP matches a template's attribute set, the process determines (at 715) whether it has previously defined a template instance to which the selected MCP should be matched. This is because the process can define multiple template instances for a template, and it can associate different MCP sets with different template instances of the template. Different MCP sets can be grouped into different template instances of a template when at least one particular attribute of the template can have multiple possible values. In this case, different MCP sets have different acceptable matching attribute values for the particular template attribute.

For example, a time and location-bounded template might be defined in terms of (1) a time range tuple specifying 12 pm to 4 pm, (2) a day range tuple specifying Sunday, and (3) a location tuple specifying any region that is not associated with the device's home or work location. For this template, the application might identify multiple template instances that include different sets of MCPs that are captured at different locations on Sunday afternoons, with each template instance associated with a different region that the device identifies by analyzing the captured MCP data or through other analysis.

When the process determines (at 715) that it has not previously defined a template instance to which the selected MCP should be associated, it defines the template instance at 720, and then transition to 725. The process also transitions to 725 when it determines (at 715) that it has previously defined a template instance to which the selected template should be associated.

At 725, the process associates the selected MCP with the template instance. As shown in FIG. 8, this association is established in some embodiments by adding a reference (e.g., a pointer or an identifier) to the template instance that refers to the matching MCP. The process 700 stores the defined template instances in the media collection storage 150, as shown in FIG. 8.

At 730, the process determines whether the selected MCP matches the attribute set of any other template. If so, the process returns to 715 to associate the selected MCP with a template instance of this other template. Otherwise, the process determines (at 735) whether it has processed all the MCPs that it needs to examine. If not, it returns to 705 to select another MCP that it has not previously analyzed to associate with one or more templates.

When the process 700 determines (at 735) that it has processed all the MCPs that it needs to analyze, the process analyzes (at 740) each template instance that it modified (at 725) in order to filter out undesirable MCPs. In some embodiments, the undesirable MCPs that are filtered out (at 740) include MCPs that unnecessarily duplicative of other MCPs in the same template instance. Some embodiments filter out other MCPs, such as poor quality MCPs (e.g., MCPs with too much camera motion, etc.) and uninteresting MCPs (e.g., pictures of receipts, screenshot photos, etc.). However, in some embodiments, such other undesirable MCPs are filtered out at other stages of the MCP processing, such as before the collection generator 105 defines the template instances and while the media compositor defines the composite media presentation.

After 740, the process determines (at 745) whether it should filter out any of the template instances that it has created. In some embodiments, the process 700 eliminates a template instance when the instance does not have a sufficient number of high quality MCPs, because such a template instance would not be suitable for producing interesting composite presentations. In some embodiments, eliminating a template instance simply entails designating (e.g., with a flag) the template instance as one that the layout generator should not consider for presenting in the UI layout. In these embodiments, the collection generator does not discard an eliminated template instance, because it will use this instance in subsequent iterations of the process 700 in order to possibly associate newly analyzed MCPs with this instance. When enough high quality MCPs are subsequently added to the template instance, the template instance is no longer filtered out (e.g., process 700 in a subsequent iteration changed the instance's designation so that it can be considered by the layout generator). After 745, the process 700 ends.

In some embodiments, the collection generator defines time and/or location based template instances by first clustering the MCPs into time and/or location based clusters, and then it analyzes these clusters to identify clusters that match templates and to define template instances for these matching clusters. This approach is used because for some templates, a template instance cannot be defined for just one matching MCP that is associated with a template at 710. In order to create instances for these templates, the MCPs first need to be clustered based on their location and/or time attributes.

Figure 9:
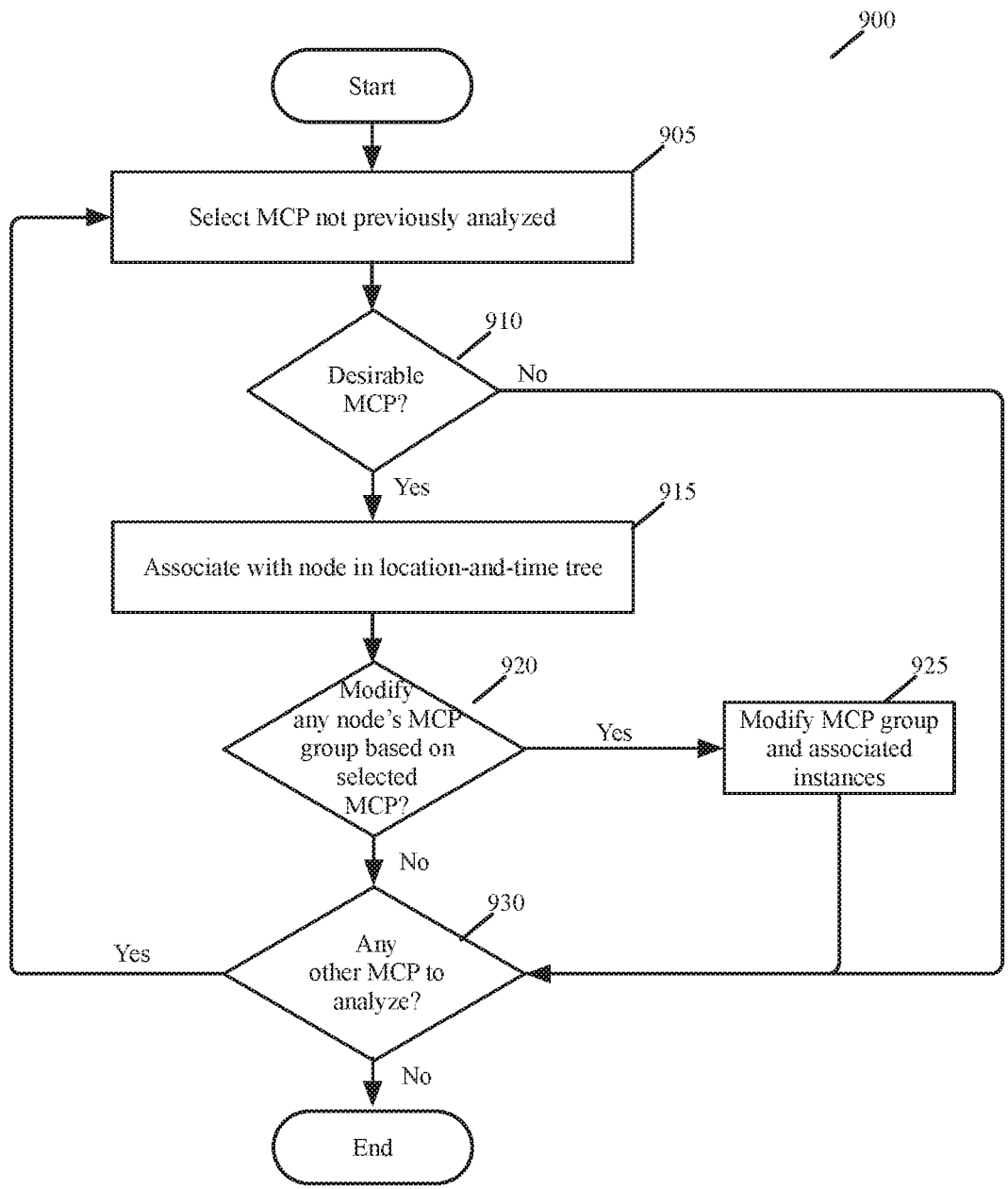
FIG. 9 illustrates a process that associates MCPs in a location-and-time tree into several clusters.

Such a clustering approach will now be described by reference to FIGS. 9-11. FIG. 9 illustrates a process 900 that associates MCPs in a location-and-time tree that organizes the MCPs into several clusters based on their location and time attributes. This process will be described by reference to FIG. 10, which illustrates an example of a location-and-time tree 1000. This tree has multiple nodes arranged in multiple levels that correspond to multiple geographic hierarchical levels. Each non-root and non-leaf node can have one parent node and one or more child nodes. The root node can have only child nodes. In this example, the child nodes of the root node are countries, but can be other child nodes, such as continents. Leaf nodes have a parent node, but no child nodes. As further described below, each node can be associated with one or more MCP clusters, and each MCP cluster 1010 can be associated with a range of time.

Figure 10:
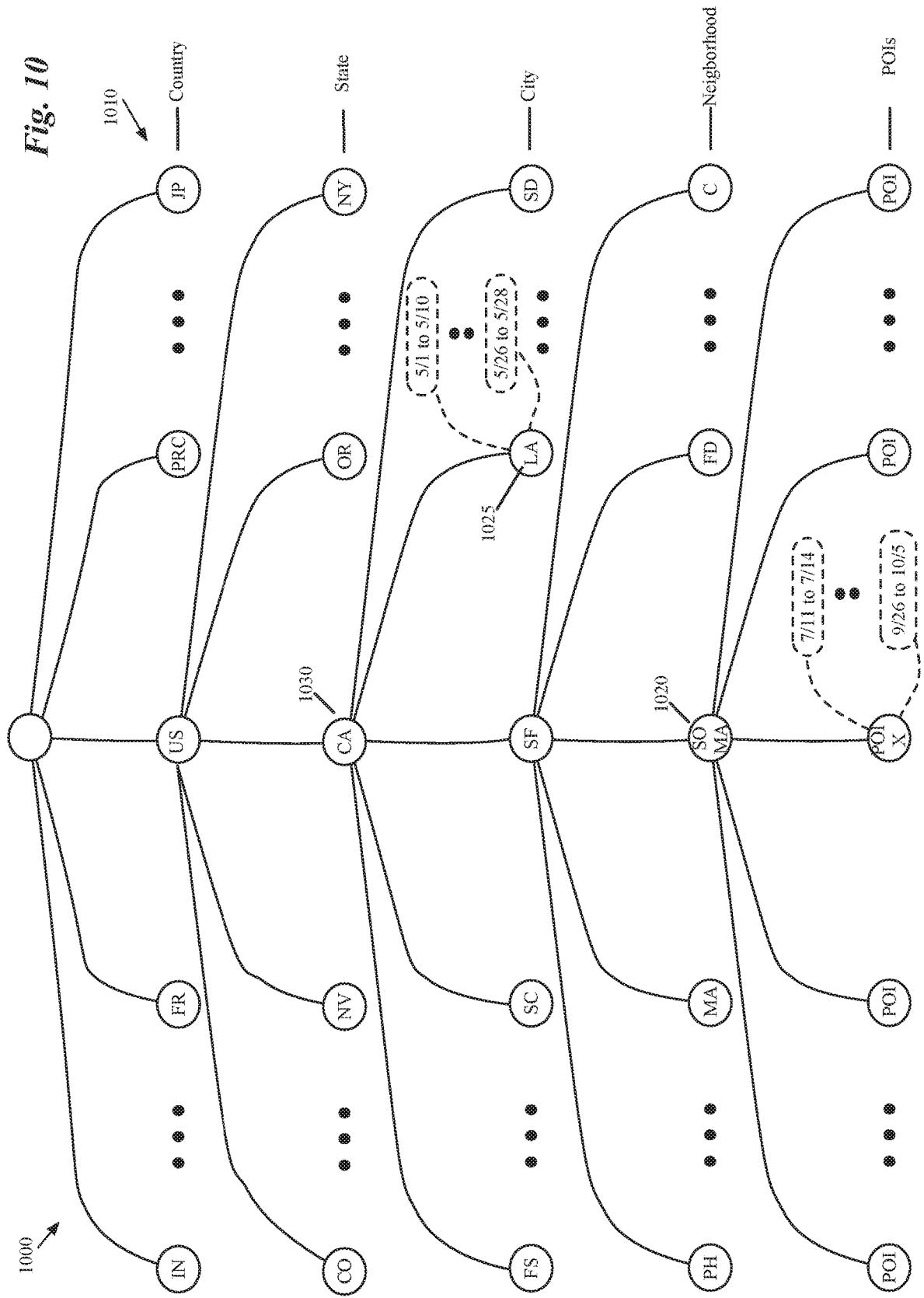
FIG. 10 illustrates an example of a location-and-time tree of some embodiments.

In the example illustrated in FIG. 10, the second level from the top defines countries, the third level defines states or regions within the country, the fourth level defines cities within the regions/states, the fifth level defines neighborhoods within the cities, and the sixth level defines points of interests (POIs) or regions of interests (ROIs) in the cities. In some embodiments, two or more of the POIs/ROIs might be associated with the home or work addresses of the user of the device that executes the compositing application. In some embodiments, the device and/or compositing application can identify the user's home and/or work addresses from the device's travel to these locations during certain hours, from a contact card associated with the user, and/or from the metadata of the MCPs captured by the user.

This example illustrates only the child state nodes for US, the city nodes for the California node, the neighborhood nodes for the San Francisco node, and the POI nodes for the South of Market (SOMA) child node. Other nodes have other child nodes, but displaying these nodes would not be possible on one sheet and would unnecessarily convolute the illustration of FIG. 10.

The process 900 of FIG. 9 places MCPs into MCP clusters that are associated with nodes in the location-and-time tree 1000. As shown, the process 900 initially selects (at 905) an MCP that it has not previously analyzed to associate with location-and-time tree 1000. The selected MCP in some embodiments is one that resides on a data storage (e.g., a database) that resides on the device that executes the collection generator. In some embodiments, the selected MCP can be an MCP that resides on a separate device (e.g., another computer, server, mobile device, etc.) that is accessible by the collection generator's device through a network.

Next, at 910, the process determines whether the selected MCP is a desirable. In some embodiments, the process 900 discards (at 910) images or videos of uninteresting content (e.g., a receipts, screenshots, etc.), and of poor quality content (e.g., blurry photos and videos). When the process determines that the MCP is not desirable, it transitions to 930, which will be described below.

On the other hand, when the process determines (at 910) that the MCP should not be rejected, the process associates the MCP with a node in the location-and-time tree. The process 900 associates the selected MCP with a node that relates to a location at which the MCP was captured. The closer this location is to the home of the user for which the composite presentation is generated, the lower in the tree is the node to which the MCP is associated.

For example, if the MCP is a photo captured at Candlestick Park, the MCP is associated with a leaf POI node that is a child of the SOMA node 1020 in the example illustrated in FIG. 10. On the other hand, if the MCP is a photo captured in Santa Monica, Calif., the photo is associated with the LA node 1025 that is a child node of the California node 1030. Different embodiments might associate the MCPs differently with different level nodes. For instance, some embodiments might not associate the MCPs with the city nodes unless the city is more than a 2000 miles from the user's home location. The rationale for associating MCPs with interior nodes instead of leaf nodes is that the farther the user is from his or her home or work address, the less the user is familiar with the POIs or ROIs associated with the leaf nodes. For example, a resident of San Francisco might be very familiar with all neighborhoods in San Francisco, but he or she might not be that familiar with neighborhoods in Thailand. Hence, all photos captured in Thailand should be associated with Thailand or a city in Thailand, while photos captures in San Francisco should be associated with the neighborhoods in San Francisco.

To associate an MCP with a node, the MCP's associated location metadata is compared with the location of the nodes in the tree 1000. In some embodiments, the MCPs are tagged by a framework service of the device with a hierarchical set of attributes that correspond to the hierarchical levels of the tree 1000. For example, in these embodiments, the MCPs are tagged with country, state, city, neighborhood, and POI tags. Based on the distance of the MCP's POI tag from the user's home, the MCP is then associated with a leaf or interior node of the tree.

To associate MCPs with nodes, the process 900 creates MCP clusters 1010 in some embodiments. These clusters in some embodiments are container data structures that refer to the MCPs that they contain. In some embodiments, each cluster is associated with a range of time that bounds the captured-time metadata of all the MCPs of the cluster. In some embodiments, the process 900 specifies a cluster list that arranges the clusters sequentially based on their respective ranges of time. This list makes it easier for process to search for clusters, and to determine whether a newly analyzed MCP should cause a previously cluster to be broken into two clusters. In some embodiments, the nodes of the location-and-time tree have one or more references (e.g., pointers) to one or more clusters in the cluster list.

When the collection generator 105 identifies an MCP for a first node that falls within the time range that was previously associated with an MCP cluster of a second node, the collection generator breaks the MCP cluster into two clusters, as further described below. In this manner, each MCP cluster is meant to represent one set of MCPs that were contiguously captured at one location over a duration of time. These MCP clusters will be subsequently analyzed to identify places, areas, trips, vacation, etc. for which template instances should be generated, as further described below by reference to FIG. 11.

Thus, at 915, the process not only identifies the node to which it should associate the selected MCP, but also associates this MCP with a previously defined MCP cluster that was previously associated with this node, or creates an MCP cluster which it can associate with this node and to which it can associate the selected MCP. In some embodiments, the criteria for adding the selected MCP to a new MCP cluster, or to a previously created MCP cluster, is whether the MCP falls within the time range of a previously created MCP cluster for the identified node, where this time range is not interrupted by the time range of any other MCP cluster.

At 920, the process determines whether it should modify any MCP clusters that it previously defined and associated with any node in the tree. The process would have to modify-another MCP cluster when the selected MCP's time-capture metadata falls within the time range of the other MCP cluster. When this happens, the process 900 modifies (at 925) the MCP cluster that is affected by breaking that MCP cluster into two clusters, which respectively end before the selected MCP's capture time, and start after the selected MCP's capture time. At 925, the process also flags as invalid any template instance that was previously defined by reference to the modified MCP cluster, or marks such an instance to be analyzed again so that it could be redefined. When the template instance is marked for re-analysis, another process periodically or on-demand will analyze the template instances in batch or individually to redefine them based on the MCP cluster modification.

From 925, the process transitions to 930. The process also transitions to 930, when it determines (at 920) that it should not modify any previously defined MCP clusters based on the insertion of the selected MCP into the location-and-time tree 1000. At 930, the process determines whether any other MCP remains to be analyzed. If so, it returns to 905 to select this MCP and repeat its operations for this MCP. Otherwise, the process ends.

Figure 11:
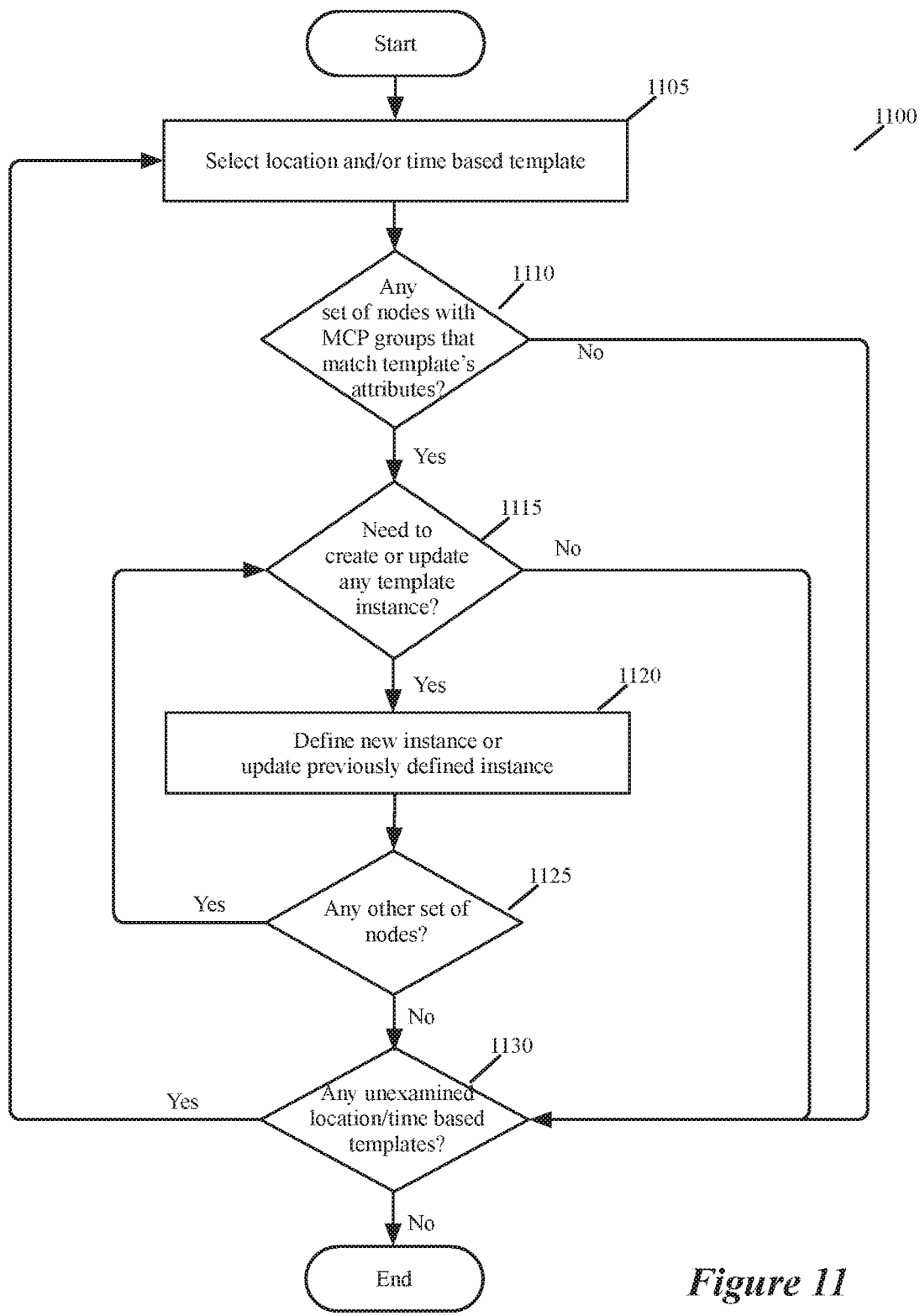
FIG. 11 illustrates a process for periodically generating template instances from MCP clusters associated with nodes of a location-and-time tree.

FIG. 11 illustrates a process 1100 that the collection generator 105 performs periodically to generate template instances from the MCP clusters associated with the nodes of the location-and-time tree. This process initially selects (at 1105) a location and/or time based template. Examples of such templates include Places, Areas, Trips, Vacations, This_ Day_In_History (TDIH), Holidays, Home, Work, etc. A template instance can be defined for a template based on the MCP cluster(s) associated with a set of one or more nodes. Also, multiple such template instances can be defined for any one of these templates in some embodiments.

For example, in some embodiments, a place-template instance can be defined by the MCP cluster of one node (e.g., a POI leaf node). In other embodiments, a place-template instance can be defined by the MCP clusters that are associated with a set of nodes are parent-child nodes, or are sibling nodes. Other embodiments call such template instances that aggregate MCPs of multiple nodes as area-template instances. Still other embodiments define an area-template instance as an aggregation of the MCP clusters of two nodes that do not have a parent and child, or a sibling, relationship, but rather have a geographical proximity to each other. For instances, two MCP clusters can be associated with two nodes, one representing Lake Tahoe, Nev. and one representing Lake Tahoe, Calif. These two nodes would be grandchild nodes of Nevada and California parent nodes, and hence are neither sibling nodes nor parent-child nodes. However, the location data associated with these two nodes indicates that they are geographically near each other. Hence, the process 1100 could aggregate their corresponding MCPs to create an area-MCP instance for Lake Tahoe.

In some embodiments, every MCP cluster can be viewed as a candidate trip instances. MCP clusters to work or home locations, however, are not viewed as trip instances in some embodiments, while being viewed as trip instances to frequently traveled locations in other embodiments. Some embodiments define a vacation instance for every set of two or more trip instances (1) that have their associated MCP clusters as temporally consecutive clusters in the location-and-time tree, and (2) that are not too a frequently traveled location (such as a home or work location). In some embodiments, each vacation instance is a series of trip instances that are bounded by two MCP clusters that were captured at a frequently traveled location (e.g., home or work location).

A TDIH instance includes all MCP clusters in the location-and-time tree that were captured on a particular day in any number of years. Such instances can be created for any day, e.g., the user's birthday or anniversary when there are always a lot of high quality MCPs captured or a lot of events. Holiday instances include all MCP clusters captured on particular day (e.g., Christmas, Thanksgiving, etc.), or in a particular range of days in some embodiments.

After selecting (at 1105) a template, the process 1100 determines (at 1110) whether one or more nodes in the location-and-time tree 1000 have one or more MCP clusters that match the selected template's attributes. For instance, in some embodiments, a place template specifies creating a place instance for one or more MCP clusters that are associated with one node and that include MCPs captured on three different days. An area template specifies in some embodiments creating an area instance for two or more MCP clusters that each qualifies as a place instance and that each is associated with a different node that has a location close to the location(s) of the other MCP cluster node(s).

In some embodiments, a vacation template specifies the creation of a vacation instance that contains several MCP clusters that are associated with several trip instances that are not to frequently traveled locations and that are temporally consecutive to each other. A holiday template specifies the creation of a holiday instance for all MCP clusters in the tree that are associated with the date of the holiday in any given number of years.

When the process 1100 determines (at 1110) that no set of nodes in the tree having matching MCP cluster(s), the process transitions to 1130, which will be described below. Otherwise, the process determines (at 1115) whether it needs to create a template instance or to update a previously created template instance based on new or modified MCP clusters. The process would not need to create or update a template instance when the MCP cluster or clusters that were previously used to define the template instance have not change.

When the process determines (at 1115) that it does not need to create or update a template instance, the process transitions to 1130. Otherwise, at 1120, the process creates a new template instance or updates a previously created template instance. The process then determines (at 1125) whether any other set of nodes in the location-and-time tree 1000 have one or more MCP clusters that match the selected template's attributes. If so, the process returns to 1115 to determine whether it needs to create a template instance or update a previously created template instance for this node.

When the process determines (at 1115) that no other set of nodes in the location-and-time tree 1000 have one or more MCP clusters that match the selected template's attributes, the process determines (at 1130) whether it has examined all location and/or time based templates. If so, the process ends. Otherwise, the process returns to 1105 to select another location and/or time based template, and to repeat its operation for this template.

Figure 12:
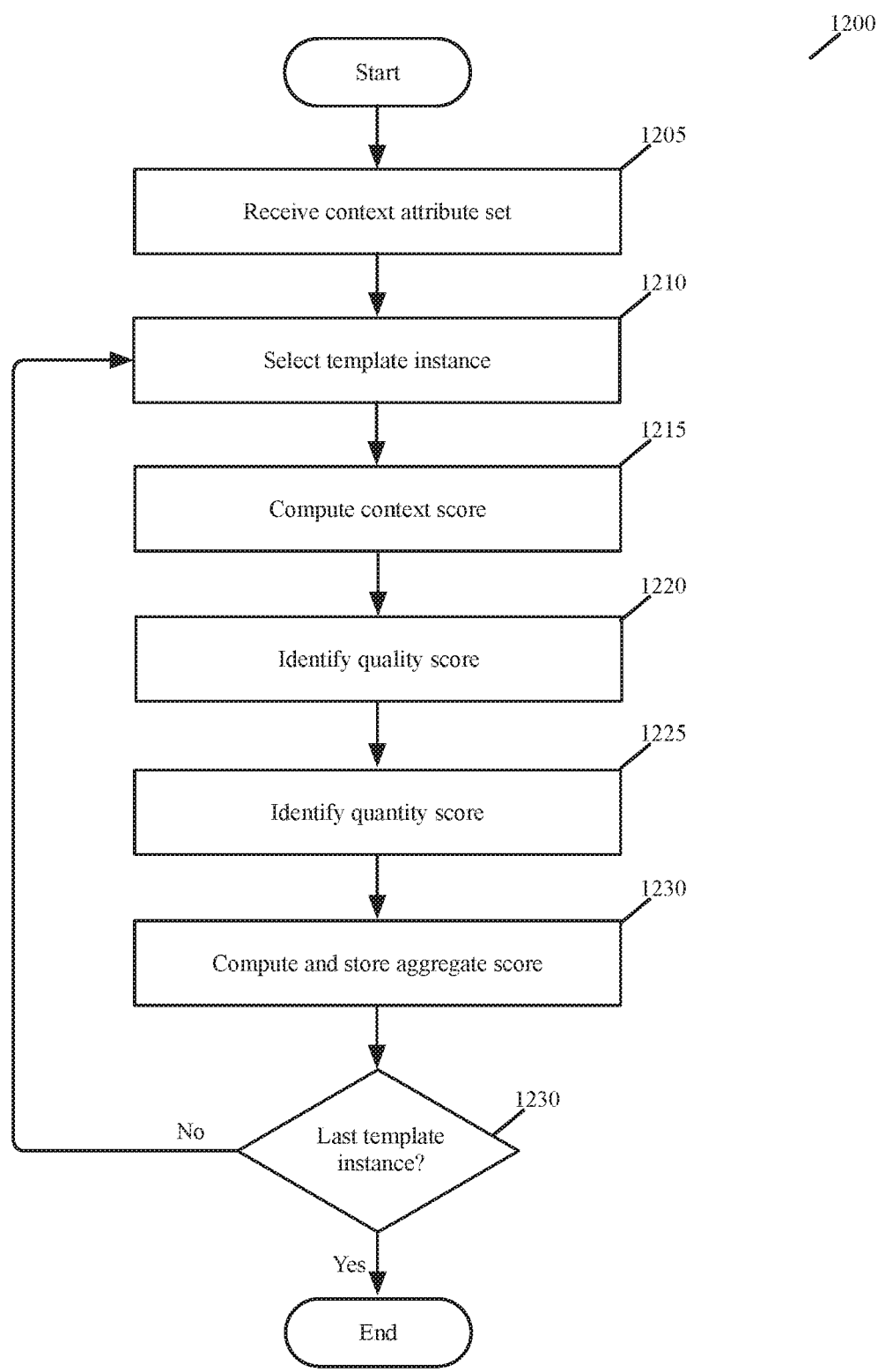
FIG. 12 illustrates a process for computing a score for a template instance.

FIG. 12 illustrates a process 1200 that the scoring engine 120 performs in some embodiments to compute a score for a template instance. In some embodiments, the scoring engine performs this process for the template instances that are stored in the collection storage 150 and that have been designated as a viable template instance for display. As shown, the process 1200 starts when the scoring engine receives (at 1205) from the layout generator a set of contextual attributes. As mentioned above, the layout generator 110 in some embodiments gets the contextual attribute set from the context identifier 115. In some embodiments, the contextual attribute set includes at least one location (e.g., expressed in terms of latitude and longitude coordinates) or one time value, which includes a date value.

The process 1200 uses the received contextual attribute set to compute a contextual score for each template instance that quantifies the contextual relevance of the template instance. In some embodiments, the contextual attribute set can include multiple contextual attribute subsets, with different subsets specifying different locations and/or time values. In some embodiments, each contextual attribute subset includes at least one location (e.g., expressed in terms of latitude and longitude coordinates) or one time value. The different contextual attribute subsets define different contexts for assessing the relevance of each template instance. Different contextual attributes can be used in different embodiments. Examples of contextual attributes include (1) current time, (2) future time, (3) current location of the device, (4) future predicted location of device (e.g., based on calendared or ticketed events stored on, or accessible by, the device) at future dates, etc.

At 1210, the process 1200 selects a template instance in the collection storage 150 that has been designated as a viable template instance for display. The process then uses (at 1215) uses the received contextual attribute set to compute a contextual score for the selected template instance that quantifies the contextual relevance of the template instance, in some embodiments, the process computes (at 1215) for the selected template instance a contextual score for each provided context attribute subset (with each subset specifying a time value and/or a location value), and then uses the highest computed contextual score for the template instance to express the contextual relevance of the template instance. To compute a contextual score for a template instance for one contextual attribute subset, the process 1200 in some embodiments computes a difference between each attribute value of the subset and the corresponding value of the template instance, and then uses the computed difference value(s) in a function to generate the context score. In some embodiments, the function is defined such that the contextual score that it computes is inversely proportional to the difference value (i.e., the smaller the difference value, the larger the value of the computed score).

After computing the contextual score for the template instance, the process identifies (at 1220) a quality score for the template instance, and identifies (at 1225) a quantity score for the template instance. Each time the template instance is updated, the scoring engine in some embodiments computes the quality and quantity scores, and stores these scores, as these scores depend on the intrinsic attributes of the template instance and do not need to be computed repeatedly in real time each time the context changes. In these embodiments, the process 1200 retrieves (at 1220 and 1225) the pre-computed quality and quantity scores for the template instance.

In some embodiments, the scoring engine 120 generates a score for a template instance that accounts for quantity of MCPs in the instance based on an assumption that a larger quantity signifies a higher level of interest in the template instance. For example, a template instance that has a lot of MCPs (e.g., photographs, video clips, etc.) captured in one location on one particular day would typically signify that at an interesting event took place at that location on that particular day and the user would hence be more interested in seeing the photos form that event. In some embodiments, each template instance's quality score accounts for the quality of the instance's MCPs based on an assumption that template instances with better content will result in better-generated composite presentations and thereby in composite presentations that are more interesting to the viewer.

After identifying the contextual score, the quality score and quantity score, the process 1200 computes (at 1230) an aggregate score. In some embodiments, this aggregate score is a weighted combination of the contextual, quality and quantity scores, with the selected weight values biasing the aggregated score towards the contextual score. For example, in some embodiments, the aggregate score is a weighted sum in the following format:

$$\text{Total Score} = W_C * \text{Context\_Score} + W_{QL} * \text{Quality\_Score} + W_{QN} * \text{Quantity\_Score},$$

with the context weight value ($W_C$) being larger than the quality and quantity weight values ($W_{QL}$, $W_{QN}$). After computing the aggregate score, the process 1200 determines (at 1230) whether it has computed scores for all viable template instances. If not, the process returns to 1210 to select another template instance and to repeat its operations 1215-1225 to compute the aggregate score for this template instance. When the process 1200 determines (at 1230) that it has computed scores for all viable template instances, it ends.

Figure 13:
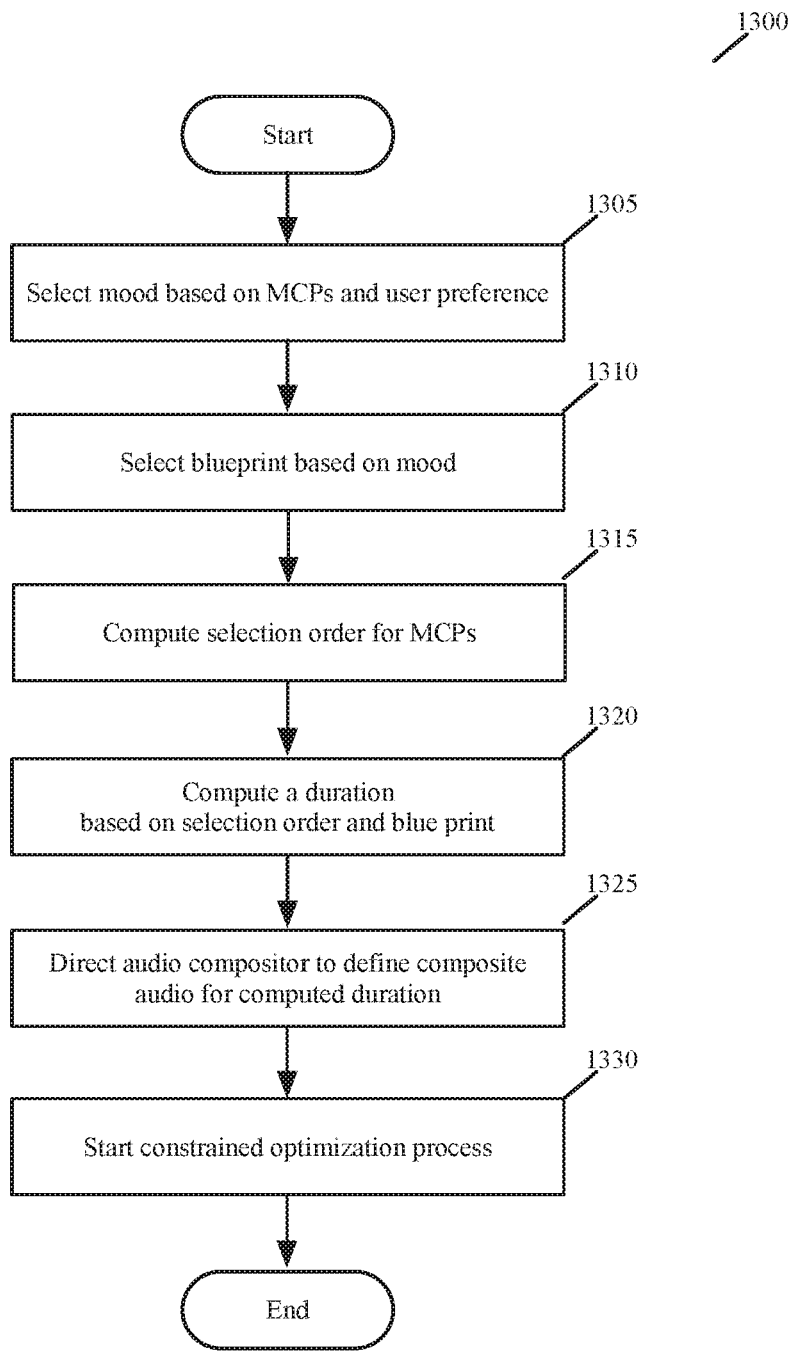
FIG. 13 illustrates a process for defining a composite presentation.

FIG. 13 illustrates a process 1300 that the media compositor 125 performs each time that it has to define a composite presentation (e.g., after a user select a template instance's summary pane and the layout generator 110 directs the media compositor 125 to generate a composite presentation definition for the template instance). As shown, the process 1300 initially selects (at 1305) the mood for the composite presentation based on the type and/or duration of media in the template instance, content analysis on this media (e.g., detection of high motion video), and/or detected user-mood preferences. This selection is automatic without receiving specific user input that specifies the mood to pick for this instance. However, in some embodiments, this automated selection is dependent by past modifications to presentation moods that the media compositor previously automatically selected for other presentations. The process accounts for these previous changes to the mood as these previous changes are informative of the type of moods that the user likes for composite presentations.

After picking the mood, the process selects (at 1310) a blueprint for the composite presentation based on the selected mood. As described above, the blueprint in some embodiments describes the desired transitions, effects, edit styles (including pace of the edits), the desired type of presentation, etc. Next, at 1315, the process defines the selection order for selecting the MCPs of the selected template instance. One manner for defining the selection order will be described by reference to FIGS. 14-17.

Next, at 1320, the process computes a desired duration for the composite presentation based on the selection order and the blue print. The computation of the duration was described above by reference to FIG. 4, and will be further described below by reference to FIG. 17. After computing (at 1320) the desired duration of the composite presentation, the process 1300 provides (at 1325) this duration to the song compositor 130 and directs this compositor to dynamically generate the definition of a song presentation that has this duration. Next, at 1330, the process 1300 starts a constrained optimization process to dynamically generate the definition of a media presentation that has the desired duration. The constrained optimization process will be further described below by reference FIG. 18. After 1330, the process 1300 ends.

Figure 14:
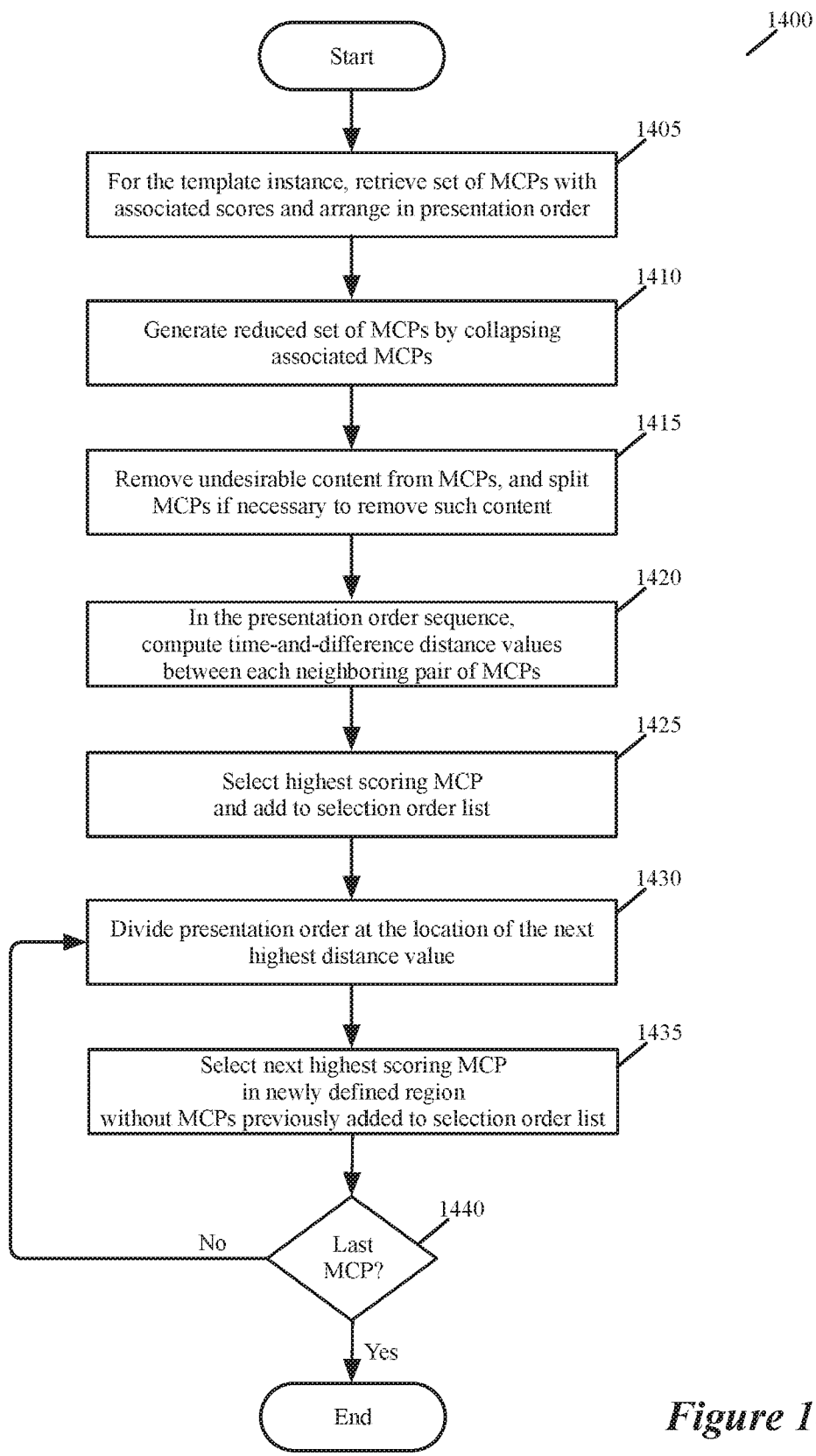
FIG. 14 illustrates a process for defining the selection order for MCPs of a template instance.
Figure 15:
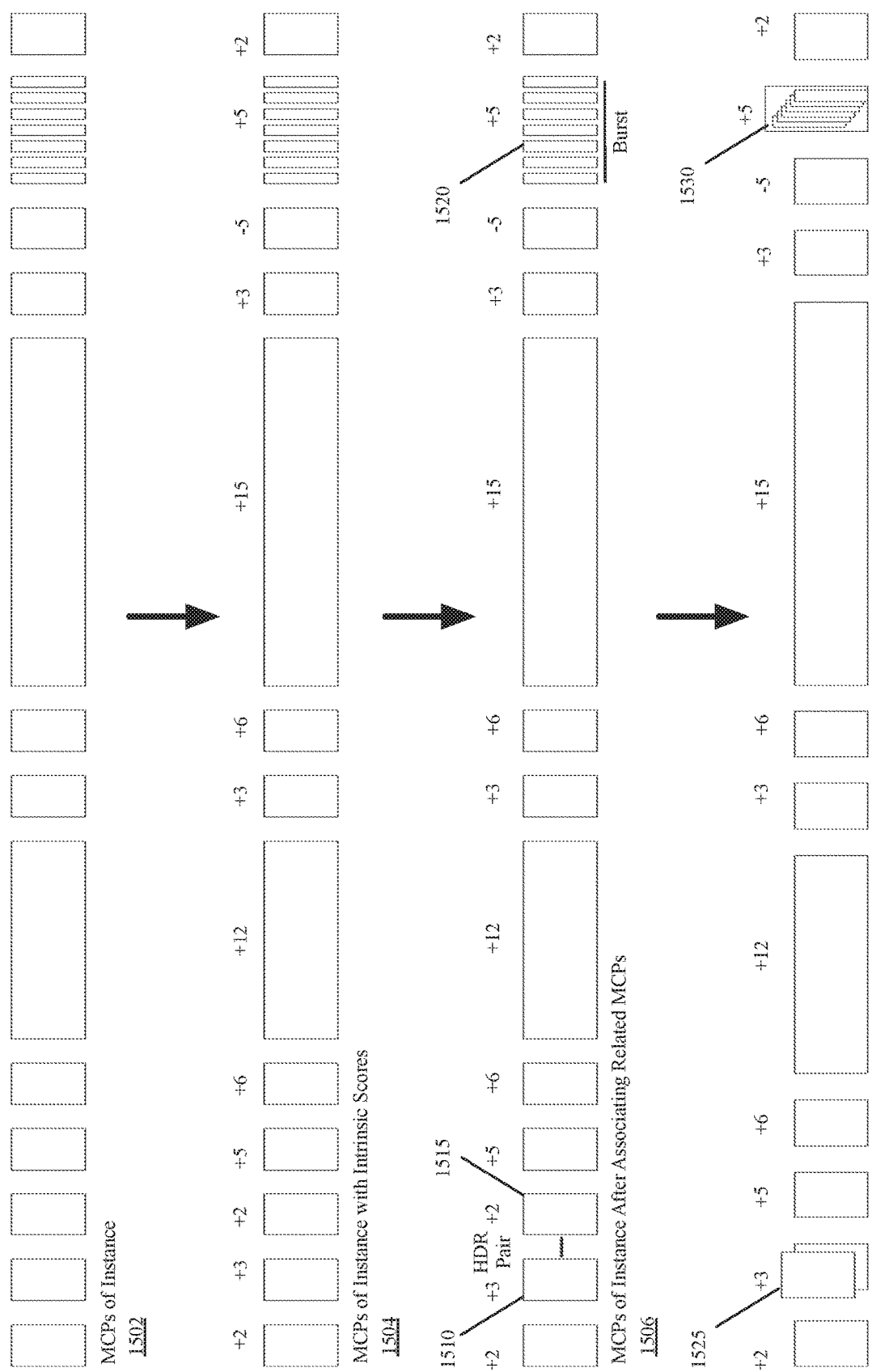
FIGS. 15-17 present several examples that explain the process of FIG. 14.
Figure 16:
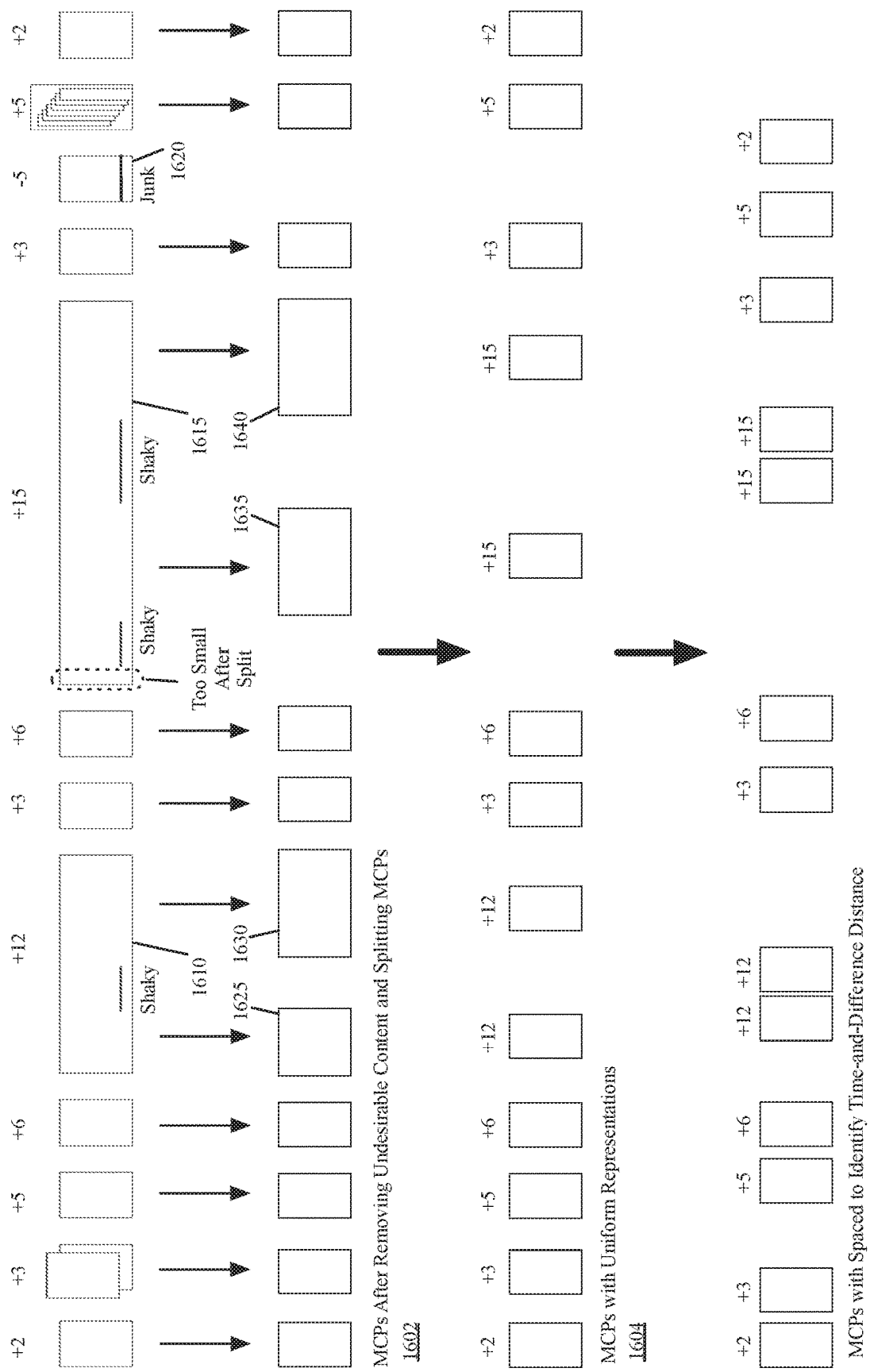
Figure 17:
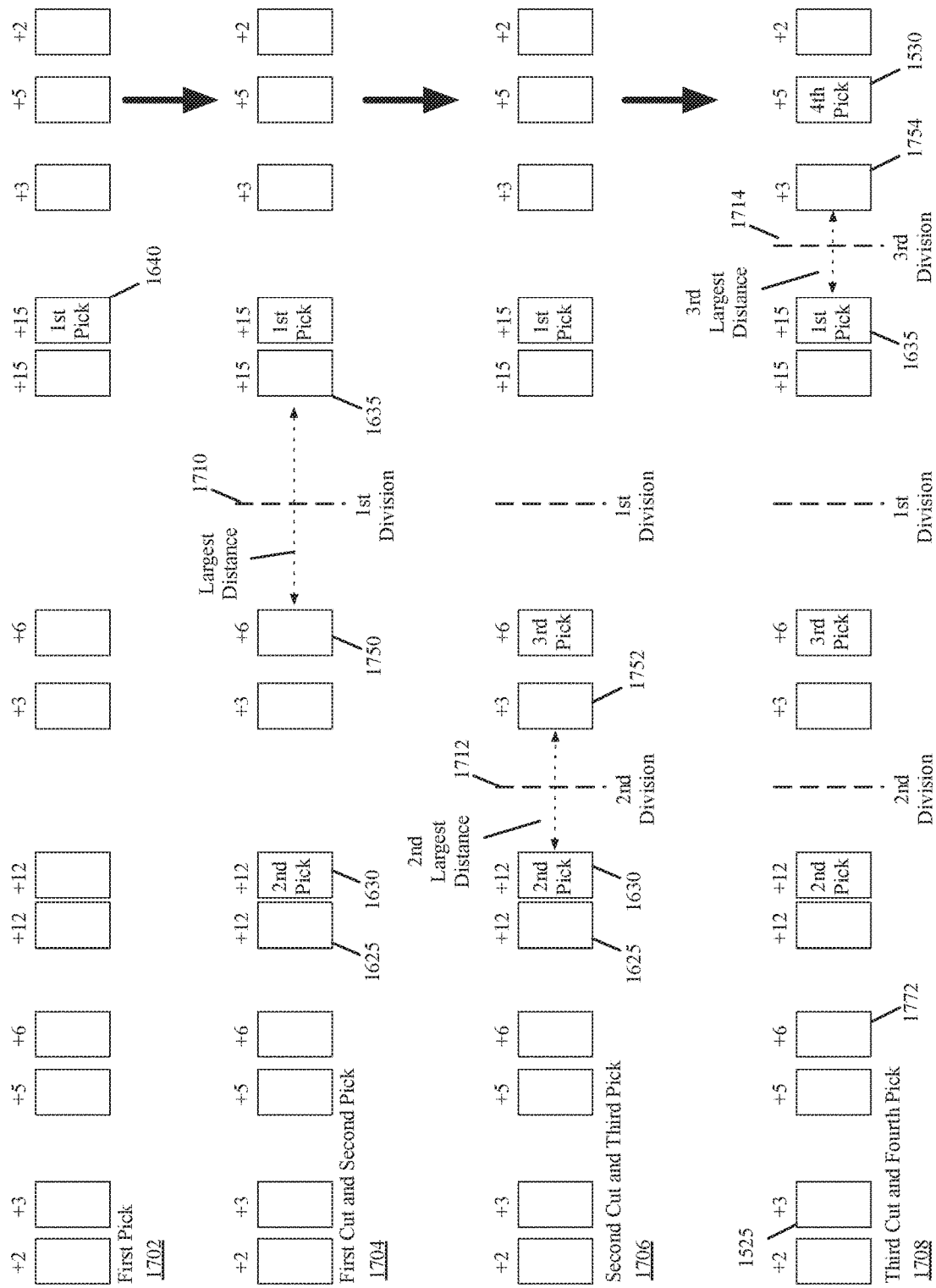

FIG. 14 illustrates a process 1400 for defining the selection order for the MCPs of a template instance. This process will be described by FIGS. 15-17, which illustrates the operations of the process 1400 being performed on the MCPs of one template instance 1500. Each of the FIGS. 15-17 shows multiple stages of processing of the template instance's MCPs.

The process 1400 initially retrieves (at 1405) the MCPs of the template instance, and their previously identified features and intrinsic scores. As described above, one or more framework services of the device analyze each MCP, define the MCPs features (e.g., junk range, face indicator, voice indicator, etc.) and compute a quality score for each MCP. The first two stages 1502 and 1504 of FIG. 15 illustrates the retrieved MCPs of the template instance and the retrieved scores for these MCPs. At 1405, the process arranges the retrieved MCPs based on a presentation order, which can be chronological (temporal), reverse chronological, clustered, etc. In the examples illustrated in FIGS. 15-17, the presentation order is assumed to be chronological. It should be noted that the process 1400 is performed because the selection order for picking the best MCPs in a template instance is often different than the presentation order, and the process 1400 needs to be performed to identify the best MCPs to select.

At 1410, the process 1400 then tries to identify a reduced MCP set by identifying associations between MCPs of the template instance, and reducing each associated set of MCPs to just one aggregate MCP. The third and fourth stages 1506 and 1508 of FIG. 15 illustrate (1) photos 1510 and 1515 being identified as an HDR pair, (2) photos 1520 being identified as being part of one burst sequence, (3) photos 1510 and 1515 being replaced by photo clip 1525 in the MCP set, and (4) burst photos 1520 being replaced by burst clip 1530 in the MCP set.

Next, at 1415, the process removes from the MCPs undesirable content (e.g., junk content, poor quality content, content captured with a lot of camera motion). In some embodiments, the process 1400 identifies the undesirable content by analyzing the metadata tag indicators of the MCPs, which it retrieved with the MCPs at 1405. When the removed undesirable content is in the middle of an MCP (e.g., in middle of a video clip), the process splits the MCP into two MCPs. When a section resulting from the split is too small, the process discards the small section.

The first stage 1602 of FIG. 16 illustrates examples of such operations. Specifically, this stage illustrates three MCPs 1610, 1615 and 1620 that have been tagged to include shaky content (i.e., content associated with too much camera motion) and junk content. The first stage 1602 further shows two MCPs 1610 and 1615 being split into two MCPs 1625/1630 and 1635/1640 each. The first stage 1602 also show the first part of the MCP being discarded after the split operation because it is too small after the split. This stage further shows MCP 1620 being completely discarded because it just includes junk content.

After removing undesirable content, the process 1400 then computes (at 1420) the time-and-difference distance between each pair of neighboring MCPs in the presentation order. In some embodiments, the time-and-difference distance is a weighted aggregation (e.g., sum) of a time distance and a difference distance between the two MCPs. The difference distance in some embodiments is the difference between two images of the two MCPs (e.g., two representative frames, e.g., first frames, of two video clip MCPs). The second and third stages 1604 and 1606 pictorially illustrate the computed distances between neighboring MCPs in the presentation order. The second stage 1604 changes all the MCP representations to be the same to simplify the rest of the illustrations for this example. The third stage 1606 then clusters the MCPs to reflect their respective distances from each other. These distances will be further described below by reference to FIG. 17.

At 1425, the process selects the highest scoring MCP as the first MCP in the selection order. When two MCPs have the highest score, the process in some embodiments selects the MCP either randomly or deterministically (e.g., selects the one with the longest duration). The first stage 1702 of FIG. 17 illustrates the selection of the clip 1640 as the first MCP in the selection order. In this example, the clips 1635 and 1640 have the same highest score (in this example because they were extracted from the same MCP 1615), but the MCP 1640 is selected as it has the larger duration.

The process then defines (at 1430) a sequence-order divider in the presentation order at the location of the highest computed time-and-difference distance. The second stage 1704 of FIG. 17 illustrates a sequence-order divider 1710 that is defined at the boundary between the MCP 1750 and the MCP 1635 because the time-and-difference distance between these two MCPs is the largest.

At 1435, the process selects the highest scoring unselected MCP on the side of the newly defined divider indicator that does not have the last, selected MCP (i.e., the MCP selected at 1425 or in the previous iteration of 1435). The second stage 1704 of FIG. 17 illustrates the selection of the MCP 1630, as this is the highest scoring MCP on the other side of the divider 1710 that does not have previously selected MCP 1640. In this example, the clips 1625 and 1630 have the same highest score (in this example because they were extracted from the same MCP 1610), but the MCP 1630 is selected as it has the larger duration and/or has more desirable content (e.g., contains face and voice content, while MCP 1620 contains only face content).

Next, at 1440, the process 1400 determines whether it has specified a location in the selection order for each MCP. If not, the process returns to 1430 to identify another sequence order divider and then to 1435 to pick another MCP based on this newly defined divider. The third stages 1706 of FIG. 17 illustrates that after the selection of the MCP 1630, the process defines a divider indicator 1712 that is defined at the boundary between the MCP 1630 and the MCP 1752 because the time-and-difference distance between these two MCPs is the next largest distance. This stage also shows the selection of the MCP 1750 as the third MCP in the selection order, because this MCP is the highest scoring MCP on the other side of the divider 1712 that does not contain the previously selected MCP 1630.

The fourth stages 1708 illustrates the after the selection of the MCP 1750, the process defines a divider indicator 1714 that is defined at the boundary between the MCP 1640 and the MCP 1754 because the time-and-difference distance between these two MCPs is the next largest distance. This stage also shows the selection of the MCP 1530 as the fourth MCP in the selection order, because this MCP is the highest scoring MCP on the other side of the divider 1714 that does not have the previously selected MCP 1750. In subsequent iterations, the process 1700 identifies MCPs 1772, 1754, and 1525 as respectively the fifth, sixth, and seventh picks.

The process 1400 continues with the operations for defining order dividers and selecting MCPs based on these dividers until the last divider divides the last two remaining MCPs. After selecting one of the two MCPs based on this divider, the process then adds (at 1440) the last remaining MCP to the end of the selection order and then ends.

After performing the process 1400, the media compositor has a selection order for preferentially picking MCPs for the composite presentation. The media compositor uses this selection order in some embodiments to bias the operation of the solver to pick the MCPs that are higher on the selection order than those that are lower on the selection order. In other embodiments, the solver just defines the composite media presentation by using a subset of the MCPs that are at the top of the defined selection order.

The media compositor in some embodiments also uses the selection order to automatically define the desired duration of the composite presentation without any user input. For instance, the video-compositor of some embodiments selects a subset of the MCPs of the template instance up to the position in the selection order where two successive MCPs are within a certain time-and-difference distance of each other (e.g., within 0.25 unit time-and-difference distance of each other). For instance, in the example illustrated in FIG. 17, the distance between the sixth and seventh picks is assumed to be less than 0.25 units, where the sixth pick the MCP 1754 and the seventh pick is MCP 1525.

In conjunction with the blueprint, which specifies the type of desired edits (e.g., fast transition edits, or slow transition edits), the selection of the subset of MCPs based on the selection order, allows the media compositor to automatically define the duration of the composite presentation without any user input. For instance, some embodiments compute the duration as the sum of the ideal duration of each MCP in the subset of selected MCPs. In some embodiments, each MCP has an MCP type, and the MCP's ideal duration is the ideal duration that is defined by its type. In some of these embodiments, the ideal duration for an MCP type is adjusted based on the blueprint that is selected. Other embodiments automatically define the duration of the composite presentation differently. For instance, in some embodiments, the media compositor does not account for the blueprint in computing the desired duration, and just computes the desired duration of the composite presentation based on the subset of MCPs that it picked by using the selection order.

Figure 18:
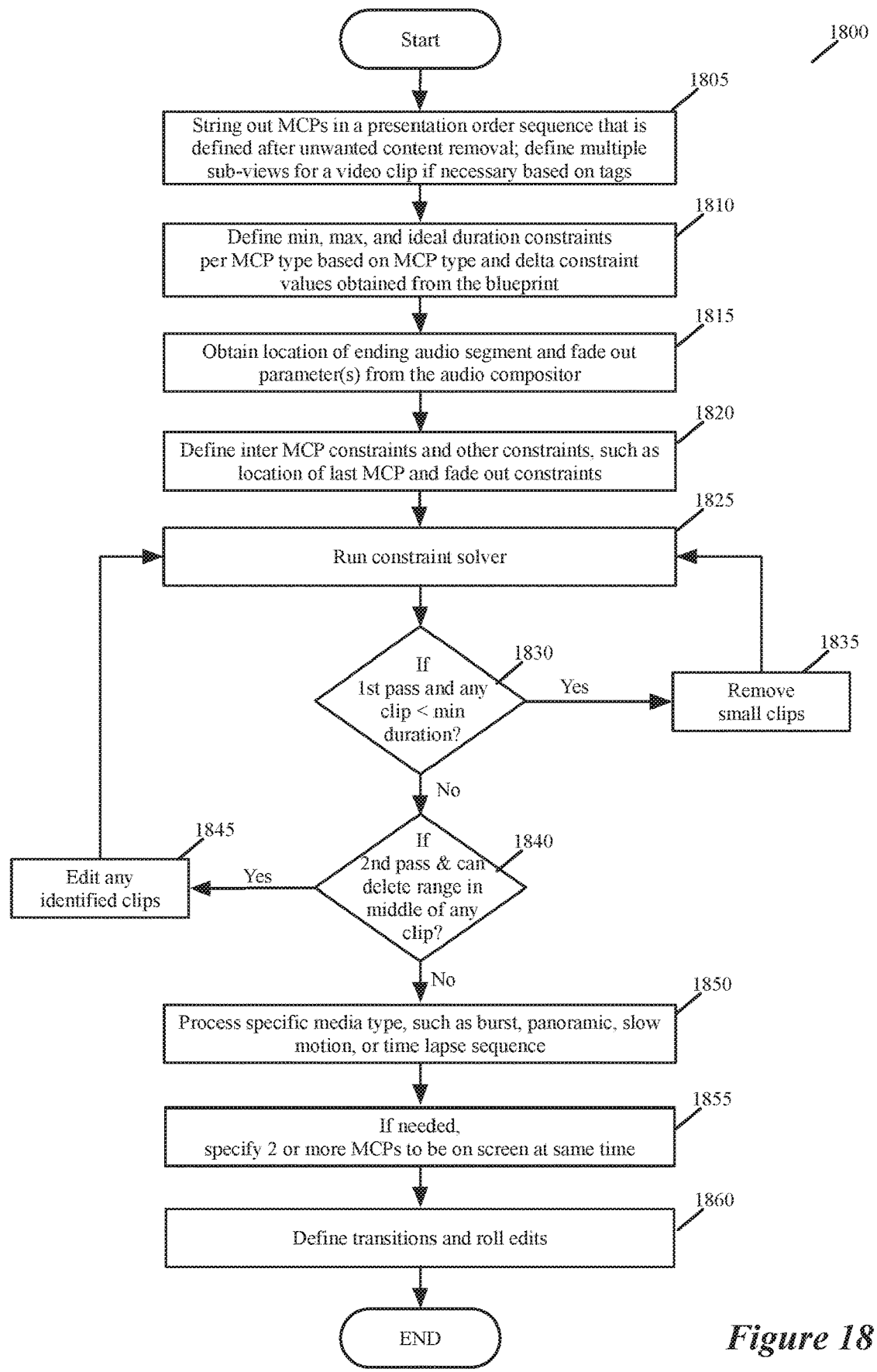
FIG. 18 illustrates a constrained optimization process of a media compositor of some embodiments.
Figure 19:
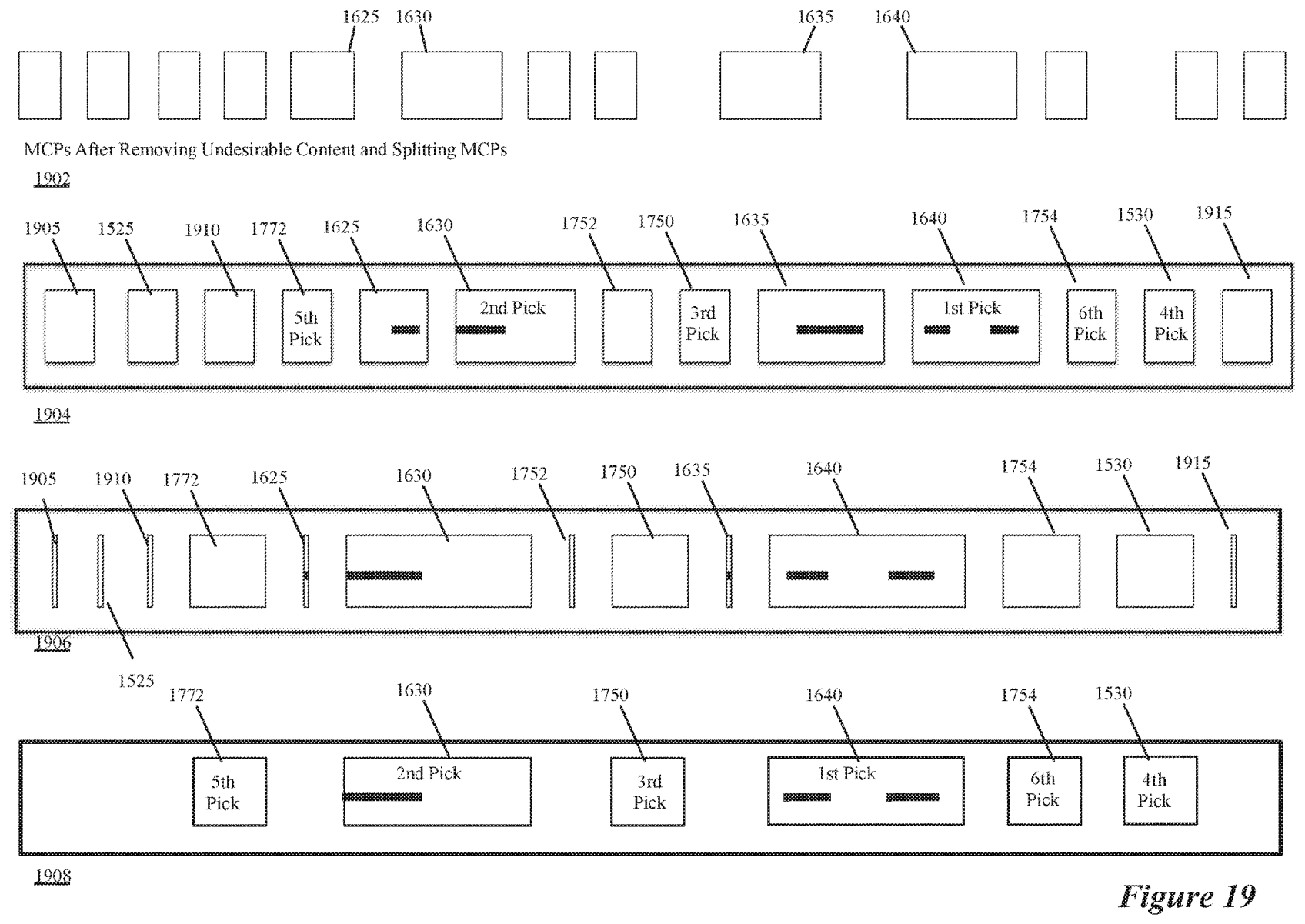
Figure 20:
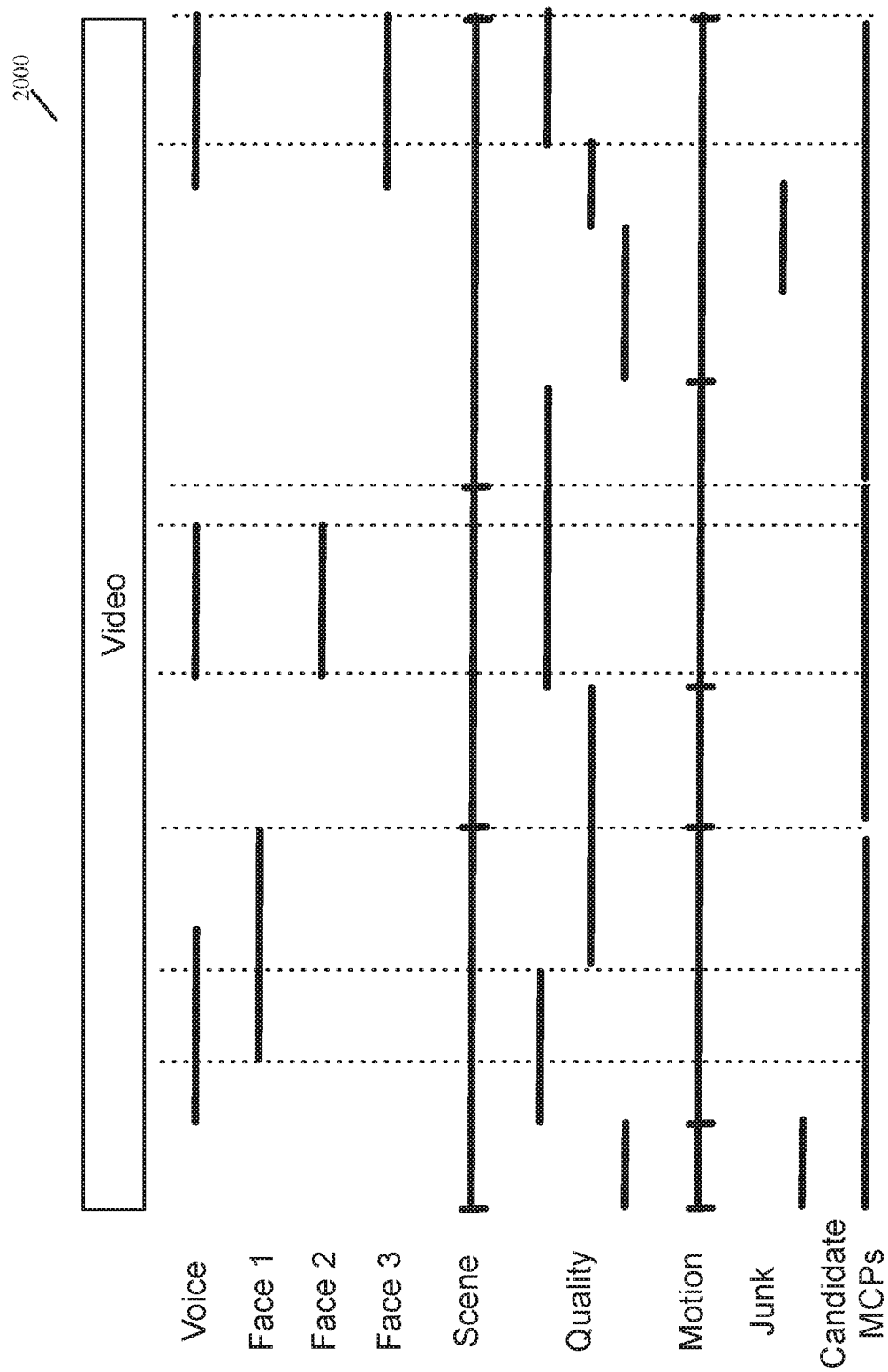
Figure 21:
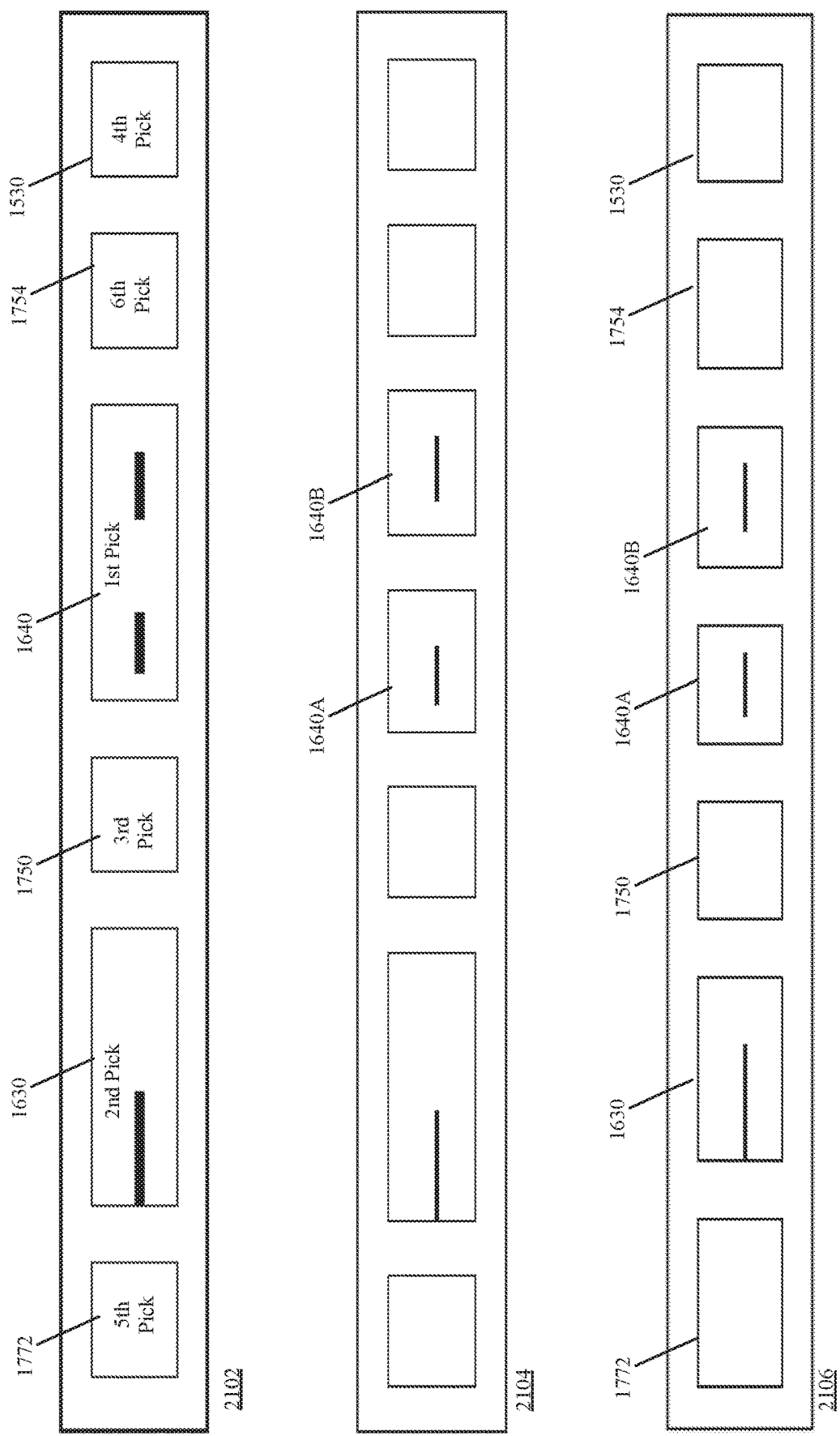

FIG. 18 illustrates the constrained optimization process 1800 of the media compositor of some embodiments. This process will be described by reference to examples illustrated in FIGS. 19-16. FIGS. 19 and 21 illustrate the MCPs of the template instance 1500 of FIGS. 15-12 at various stages of the constrained optimization process 1800. FIG. 20, on the other hand, illustrates dividing a video clip into multiple candidate MCPs based on metadata tag range indicators associated with the video clip.

The process 1800 starts when the process 1300 calls it at 1330. As shown, the process 1800 initially arranges (at 1805) the MCPs of the template instance in the presentation order sequence that is defined after the process 1400 removes undesirable content from the MCPs. Stage 1902 of FIG. 19 illustrates the MCPs of the template instance 1500 after the removable of undesirable content from the MCPs of this instance. The MCPs in this stage are identical to the MCPs at stage 1602 of FIG. 16.

From a video clip that has multiple metadata tagged regions, the process 1800 of some embodiments defines (at 1805) multiple candidate video clip MCPs that are defined by reference to one set of tag regions. FIG. 20 illustrates one example of such candidate video-clip MCPs. This figure illustrates a video clip 2000 that is tagged by voice range indicators, face range indicators for three different faces, one scene range indicator, a quality range indicator, a motion range indicator, and a junk range indicator.

This figure also illustrates a candidate MCP defined whenever the scene range indicators identify a change in the scene. It also illustrates multiple sections in each of these candidate MCP that scores the highest in their respective candidate MCP based on the desirable content attributes as indicated by the voice, face, quality and motion indicators. The use of these highest scoring sections for an alternative implementation of the solver will be described below. The process 1800 adds the three candidate MCPs that are defined based on the three scene changes in the example of FIG. 20, to the list of MCPs that the solver has to analyze in order to identify a desirable sequence of MCPs.

To simplify the discussion of FIG. 18, the examples illustrated in FIGS. 19 and 21 only discuss a few of the metadata tag ranges, and ignore breaking up a video clip into multiple video clips based on the scene changes. These scene-based video clips and the use of the highest scoring ranges within these clips will be further described below in a discussion of alternative video compositing solvers of some embodiments.

After 1805, the process defines minimum, maximum, and ideal duration constraints for each type of MCP of the template instance. For each MCP type, these three constrains specify the minimum acceptable duration, the maximum acceptable duration and the ideal duration for the MCPs of that type to play within the composite presentation. For each MCP type, the process also defines (at 1810) delta_min duration, delta max duration, and delta ideal duration from the blueprint for the composite presentation. These delta values specify how the constrained solver can adjust the specified minimum, maximum, and ideal duration constraints for each MCP type in order to customize the composite presentation for the blueprint's associated mood.

Next, at 1815, the process 1800 obtains from the song compositor (1) the location of the ending audio segment, (2) the location of the ending segment stinger, if any, and (2) one or more audio fade out parameters. The process obtains the location of the ending audio segment, or its stinger, so that it can align the start of the last MCP in the composite media presentation with this ending audio segment.

For example, the computed ideal duration for the composite presentation might be 2 minutes. The song compositor might then select an ending segment that is 4 seconds long. Hence, the song compositor provides to the media compositor, 1 minute 56 seconds as the starting location of the ending audio segment. The media compositor then has the presentation of the last MCP section defined to start at 1 minute 56 seconds. In this manner, the last MCP and the ending audio segment should start at the same time at the end of the composite presentation. When the ending segment has a stinger, the process 1800 aligns the start of the last MCP with the location of the stinger, instead of the starting location of the ending segment in some embodiments.

Similarly, the song compositor might specify an audio fade out effect that starts in the 1.5 second of the presentation. In such a case, the song compositor provides 1 minute and 58.5 seconds as the start of the audio fade out to the media compositor in some embodiments. The media compositor can then define its video fade out to occur at or near 1 minute and 58.5 seconds of the 2 minute presentation.

At 1820, the process 1800 uses the obtained location of the ending audio segment and the fade out parameters to define constraints for the constraint solver (e.g., constraints regarding where the last MCP clip should start, constraints re the video fade out parameters, etc.). At 1820, the process in some embodiments defines positional MCP constraints that specify the MCP types that cannot follow other MCPs types.

At 1825, the process then directs a constraint solver to find an optimal solution for an objective function in view of the constraints that the process has defined. In some embodiments, the objective function explores various combinations of MCPs to identify one MCP combination that produces an optimal objective function score and that satisfies the defined constraints. In some embodiments, the different MCP combinations explore different portions i.e., different segments) of the same MCP. In exploring the solution space, the constraint solver preferentially scores MCP combinations that more prominently feature (e.g., use more of) the MCPs that are ranked higher on the selection order, and the MCPs that are tagged with desirable content tags.

The second and third stages 1904 and 1906 of FIG. 19 pictorially illustrate the operation of the constraint solver. The second stage 1904 shows the MCPs of the template instance 1500 that are fed to the constraint solver in its first iteration. As shown, the MCPs are shown with desirable content range indicators for MCPs 1625, 1630, 1635 and 1640. These ranges can correspond to face and voice ranges, in some embodiments.

The third stage 1906 shows the MCPs of the template instance 1500 after the constraint solver has performed its first pass analysis. In the third stage 1906 (as well as the fourth stage of FIG. 19 and the stages of FIG. 21), the MCP sizes are drawn to represent the respective durations in the MCP solution identified by the solver. These sizes are not drawn on the same scale as the previous stages of FIG. 19, or the prior stages of FIG. 15-17.

As shown in the third sage 1906, the MCPs 1905, 1525, 1910, 1625, 1752, 1635 and 1915 have been shrunk to have very little contribution to the media presentation. The solver picked a solution that has very little of these MCPs because these MCPs were ranked low in the selection order, and/or had undesirable features, as specified by their associated metadata tags and/or range indicators. Specifically, as shown, the MCPs that did not shrink to negligible durations are that MCPs 1772, 1630, 1750, 1640, 1754 and 1530 that were designated as picks 1-6 on the selection order. In this example, these six MCPs were also the six MCPs that were used to define the desired ideal duration for the composite presentation. In other cases, however, this might not be the case.

After the run constraint solver identifies an optimal solution for the object function that satisfies the defined constraints, the process determines (at 1830) whether the constraint solver's first solution (i.e., the solution after the process calls the solver the first time at 1825) has any MCP that has a duration smaller than a threshold duration. If so, the process removes (at 1835) these MCPs from the previously identified solution, and then returns to 1825 to call the constraint solver again to optimize this modified solution without the filtered-out MCPs.

The fourth stage 1908 of FIG. 19 shows the MCP set without the short MCPs 1905, 1525, 1910, 1625, 1752, 1635 and 1915. This MCP set is fed to the constraint solver in its second iteration so that it can find another optimal solution based on this previously computed solution. The first stage 2102 of FIG. 21 shows the MCP solution set that the constrained solver outputs in its second pass after receiving the solution set illustrated in the fourth stage 1908 of FIG. 19.

When the process determines (at 1830) the constraint solver's first solution does not have MCPs with small durations, the process transitions to 1840. The process also transitions to 1840 after the second or third time that it calls the solver at 1825. At 1840, the process determines whether the constraint solver's second solution (i.e., the solution after the process calls the solver the second time at 1825) has any MCP with an interior segment (i.e., a segment that is not at either boundary of the MCP) that should be deleted for not having desirable content (e.g., having undesirable content associated with camera motion, having content that does not have desirable face and/or voice content, etc.).

If so, the process removes (at 1845) such interior segments from any MCP identified at 1840, and returns to 1825 to call the constraint solver a third time. The second stage 2104 of FIG. 21 illustrates the removal of an interior segment from MCP 1640 in the first solver, and the creation of two new MCPs 1640A and 1640B. The third stage 2106 then illustrates the MCP solution set that the constrained solver outputs in its third pass after receiving the solution set illustrated in the second stage 2104. As shown, this third pass allots additional time to some MCPs (e.g., MCP 1772), while reducing the allotted time to other MCPs (e.g., MCPs 1630 and 1640A).

When the process determines (at 1840) the constraint solver's second solution does not have MCPs with interior segments that should be filtered, the process transitions to 1850. The process also transitions to 1850 after the third time that it calls the solver at 1825. At 1850, the process 1800 identifies certain special MCP types in the final solution of the constraint solver, and defines special media treatments for these MCP types. Examples of such special MCP types in some embodiments include burst-mode sequences, panoramic photos, slow motion video, and time-lapse sequences. The constrained optimization process of some embodiments treats an MCP that is of one of these types as a placeholder clip for most of its operations. At 1850, the constrained optimization process defines edit operations for each of these specialty MCPs based on the time that the MCP is allotted in the presentation and based on the editing pace that is defined by the blueprint.

For example, in some embodiments, the process 1800 defines (at 1850) how a panoramic photo is displayed based on the allotted time and editing pace. For a faster pace, the process might break a single panning panorama into multiple shorter panning panoramas stitched together with transitions. On the other hand, for a slower pace, the process might allow for longer, slower panning panoramas. Also, in some embodiments, the process breaks wider panoramas more than narrower ones.

The constrained optimization process might also treat burst mode sequences differently under different circumstances depending on allotted time and editing pace. The treatment of the burst mode sequence might specify playing through the burst mode photos without any transitions, with flash transitions, or with transitions and a hold on the final photo that is augmented with a. Ken Burns effect on this final photo.

After defining the specialty media treatments, the process determines (at 1855) whether it has to provide multiple concurrent photo displays (called N-up displays) for any MCPs in the final solution. This is because some photos might be too narrow for a desired display resolution. In other words, such photos might only capture a portion of the screen.

Finally, at 1860, the process 1800 performs one or more post-processing operation. One post-processing operation tries to align edits (i.e., MCP boundary locations) in the composite media presentation with audibly discernable transition locations in the composite song presentation. To do this, the media compositor asks the song compositor for a list of such transition locations that are near each edit point in the composite media presentation, and a priority value for each of the location. These locations in some embodiments include location of heats, locations of onsets, locations of segment boundaries, and location of ending-segment stinger in the composite definition. The media compositor the tries to align each edit point with one of the transition locations, preferentially treating locations with higher priorities but penalizing adjustments that require greater movement of the edit point.

Another set of post-processing operations (at 1860) define additional audio and video transition effects for the composite media presentation. Examples of such transitions are J&L cuts, cross fading transitions between image or video segments, wipe transitions, slide transitions, etc. After 1860, the process ends.

The process 1800 illustrates just one manner for defining a composite media presentation in an automated manner. Other embodiments use other processes. For instance, the compositing process of some embodiments defines a composite media presentation from only the MCPs that it picks based on the selection order and that it uses to define the composite media presentation (e.g., picks 1-6 of the example described above by reference to FIG. 17). The process then arranges these selected MCPs in a sequence according to their presentation order.

The process then iteratively selects individual MCP in the sequence based on the MCP's place in the presentation order. The process then defines a video clip from the selected MCP. For a photo, the process can generate a video clip with the desired duration (which is defined by the blueprint for photo MCPs) by defining a Ken Burns effect. For specialty photos (e.g., burst, panorama, time-lapse, etc.), the process in some embodiments defines a container clip so that a subsequent process (like the one performed at 1850) can generate the video segment for the specialty photo. The duration of the container clip is the desired duration for this MCP's type as defined by the blueprint.

For each selected MCP, the process identifies the highest scoring range within the MCP in case the MCP is a video clip. The process identifies the highest scoring range based on the range indicators that indicate face ranges, voice ranges, camera motion, etc. For this highest scoring range, the process defines a candidate video clip to extract from the video MCP. When the highest scoring range is shorter than the desired duration for the video MCP (as defined by the blueprint), the process tries to expand the length of the extracted clip at both boundaries until the desired duration is obtained or the boundary starts to overlap range indicators that indicate undesirable content, e.g., high camera motion, etc.

By walking through the MCPs that were picked based on the selection order and trying to define a video clip segment based on each MCP's ideal duration, the process typically obtains a composite media presentation that has the desired overall duration. To the extent that it does not, the process performs a second pas through some or all of the picked MCPs to add or remove from the video clips that are defined for the picked MCPs.

As mentioned above, the media compositor in some embodiments provides the desired duration of the composite presentation to the song compositor, and the song compositor then dynamically defines a composite song presentation of this duration. This song compositor dynamically defines the song presentation to include several audio segments in a particular sequence, and a set of edits and transitions between the audio segments in the sequence. In some embodiments, the audio segments are part of one song, while in other embodiments, they can be part of two or more songs. These audio segments are referred to as body segments to signify that they are parts of another song. In some embodiments, the song compositor also selects an ending segment from several candidate ending segments for the composite song presentation. The song compositor in some of these embodiments can also select a starting segment from several starting segments for the composite song presentation.

Figure 22:
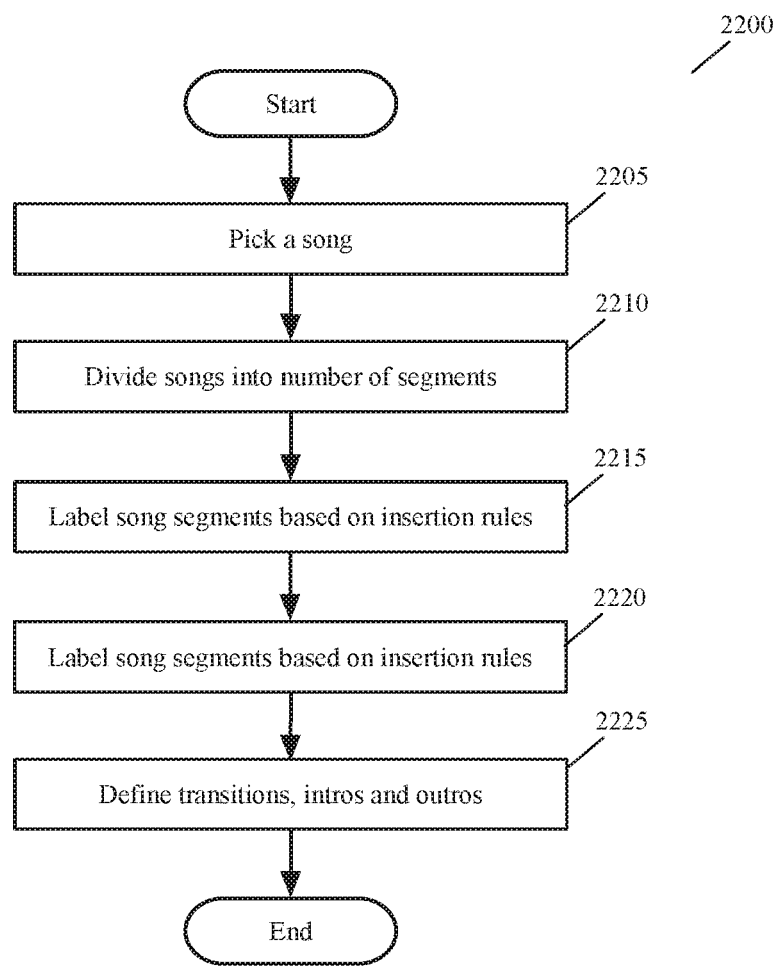
FIG. 22 illustrates an authoring process for dividing a song into multiple body segments, one or more starting segments, and one or more ending segments.
Figure 23:
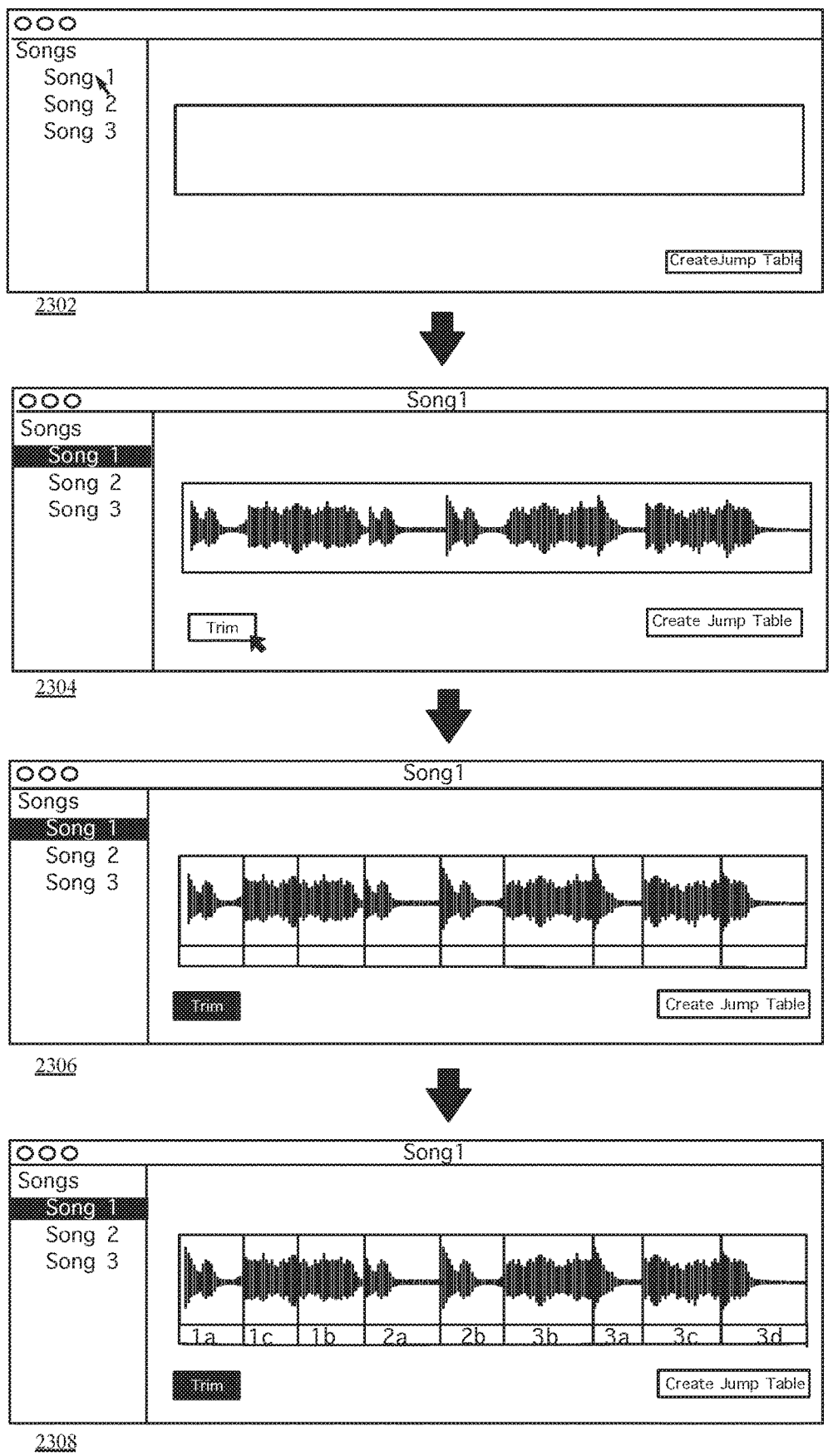
FIG. 23 illustrates multiple operational stages of a user interface of an authoring application of some embodiments.

FIG. 22 illustrates an authoring process 2200 for dividing a song into multiple body segments, one or more starting segments and one or more ending segments. In some embodiments, an editor performs this authoring process 2200 before the song compositor uses these segments to dynamically create a song presentation for a particular duration requested by the media compositor. The editor performs this process by using an authoring tool. FIG. 23 illustrates multiple operational stages of a user interface 2300 of an authoring application of some embodiments. The process 2200 will be described below by reference to this user interface.

As shown in FIG. 22, the process 2200 starts when the editor selects (at 2205) a song. The first stage 2302 of FIG. 23 illustrates the user selecting Song 1 from a list 2305 through a cursor click operation. In this example, the user interacts with the UI through a cursor and keyboard, but in other embodiments, the editor interacts with the authoring tool through touch input. The second stage 2304 of FIG. 23 illustrates the selected song in a timeline 2310. At 2210, the editor uses a trim tool of the authoring application to divide the selected song into a number of segments. The second stage 2304 shows the selection of a trim tool 2320, while the third stage 2306 illustrates multiple segments in the timeline after the trim tool has been used to divide the selected songs into these segments.

To ensure that the segments are properly arranged in the composite song presentation, two different sets of rules are used in some embodiments. These rules are insertion rules for inserting audio segments in the sequence, and sequence rules for ensuring that the inserted audio segments can neighbor other segments in the sequence. In some embodiments, these sequence rules are embedded in a jump table, which will be further described below. Some embodiments define the insertion rules by reference to the names that are assigned to the song segments. For instance, in some embodiments, each song segment has a number and a letter assigned to it. The number defines the segment's section number, while the letter is the segment identifier in the section. In these embodiments, the song compositor can place a first audio segment before a second audio segment only if the first audio segment has a section number that is the same or smaller than the second audio segment.

Given such insertion rules, the process 2200 names (at 2215) the song segments that it defines at 2210. The third stage 2306 shows that after the selected song is divided into several segments, a field 2330 opens up below each song segment. An editor can insert the segment's name in its associated field. The fourth stage 2308 shows the segment names (1a, 1b, 1c, 2a, 2b, 3a, 3b, 3c) filled in in their corresponding fields. As shown in this example by segments 1b, 1c, 3a and 3b, the segments do not need to be sequentially numbered based on their initial position in the selected song.

Next, at 2215, the editor inserts (at 2220) one or more markers in the defined sections to identify location of audibly discernable transitions (e.g., beats). After 2220, the process defines (at 2225) transition, starting and ending segments. As mentioned above, these segments are segments that the song compositor can optionally add to a composite presentation in some embodiments. In other embodiments, one or more transition, starting and/or ending segments are required. For instance, in some embodiments, a composite song segment has to include an ending segment, while it could optionally include a starting segment.

As further described below, the jump table in some embodiments allows the editor to specify whether a transition segment is required when one segment follows another. In some embodiments, transition, starting and ending segments are segments that the editor defines based on portions that the editor extracts from the selected song. In other embodiments, one or more of these segments transition segments) are defined by reference to special effects or pre-defined audio content of the authoring tool.

At 2220, the editor in some embodiments also specifies one or more markers in the defined starting and ending sections in order to identify locations of audibly discernable transitions. The media compositor can then align an edit point in the composite media presentation with one such identified location in a starting or ending section. One example of such a location is the location of a stinger in an ending segment. In some embodiments, the authoring tool allows the editor to specify a priority for each audibly discernable location that the editor associates with marker in a body, starting, or ending segment. The media compositor then uses the priority values of the transition locations to select one transition location to align with one of its edit points.

After 2220, the process 2200 ends.

Figure 24:
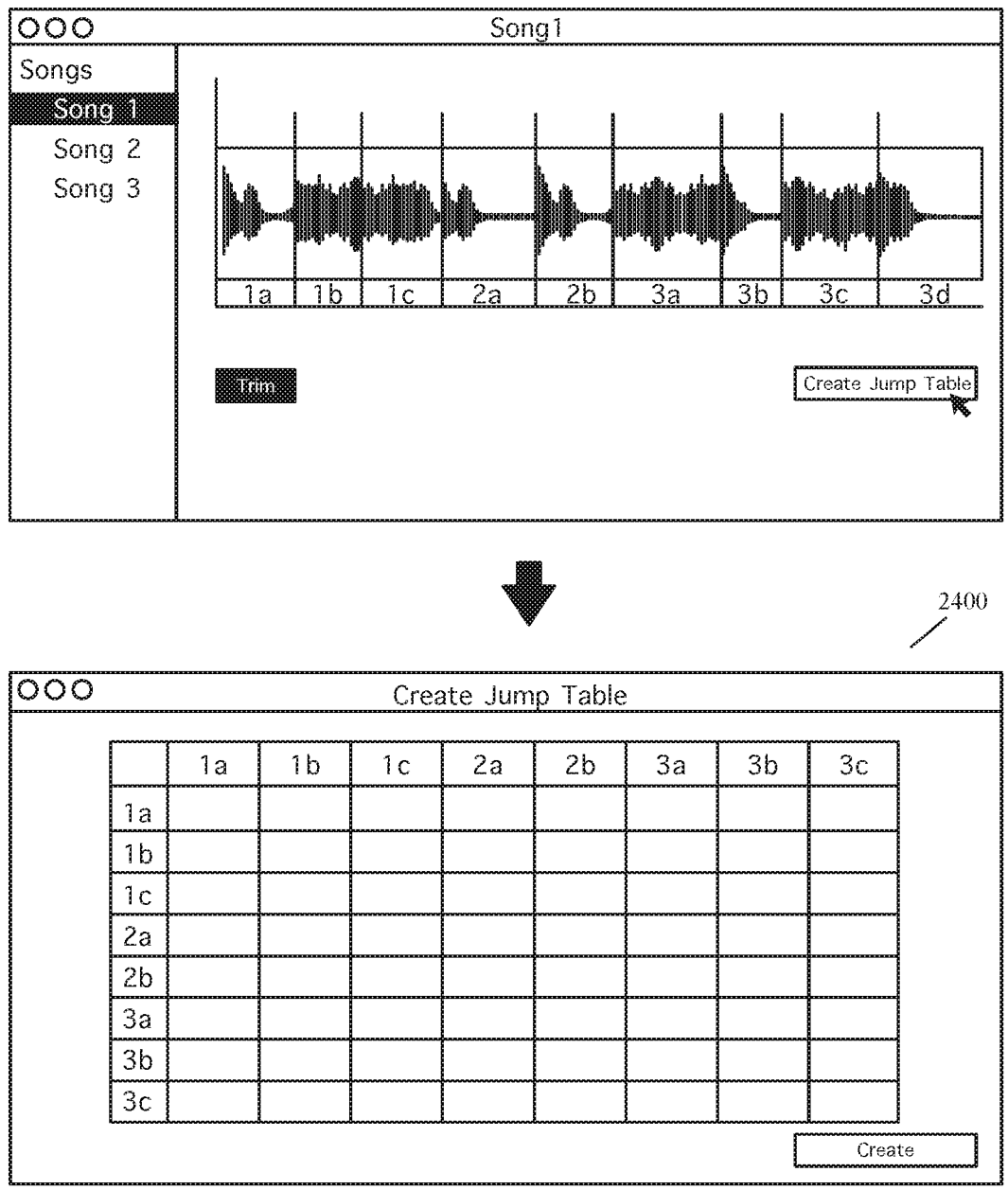
FIG. 24 illustrates directing the authoring application to generate and display a jump table of some embodiments.

As shown in FIG. 23, the UI 2300 of this application includes a control 2355 for creating a jump table for the audio segments that the editor defines. FIG. 24 illustrates that the selection of this control 2355 directs the authoring application to generate and display a jump table 2400 with multiple rows and columns. FIG. 25 illustrates this jump table 2400 with more detail. As shown, each audio segment is associated with one row and one column.

As shown in FIG. 25, each jump table cell has a Boolean identifier that specifies whether the two segments that are assigned to that cell's row and column are allowed to follow each other in an order specified by the row and column assignment. In some embodiments, the audio segments defined along the columns are the segments that follow the segments that are defined along the rows. The Boolean identifiers of the cells of the jump table collectively define the sequence rules that specify whether two audio segments can be neighboring segments in the composite song presentation that is defined by the song compositor. In some embodiments, each jump table cell can also have three other parameters, which are a transition parameter, a fade-in parameter, and a fade-out parameter. The transition parameter specifies an optional transition between the two segments of the cell, while the fade-out and fade-in parameters specify how the cell's row audio segment should fade-out and the cell's column audio segment should fade-in.

As further shown in FIG. 25, the jump table also specifies (1) a priority value for each body segment and (2) an identifier for indicating whether the body segment can be sliced during the song compositing. For each body segment, the jump table also specifies the number of bars in the segment. This number is used in some embodiments to predict locations of beats in the segment. In the jump table, the starting segment I is associated with one rows, while each ending segment is associated with a column. These associations of the starting and ending sections allow the jump table to correlate the body segments with one or more starting and ending segments to specify whether the starting segments can precede the body segments and the ending segments can follow the body segments.

Figure 26:
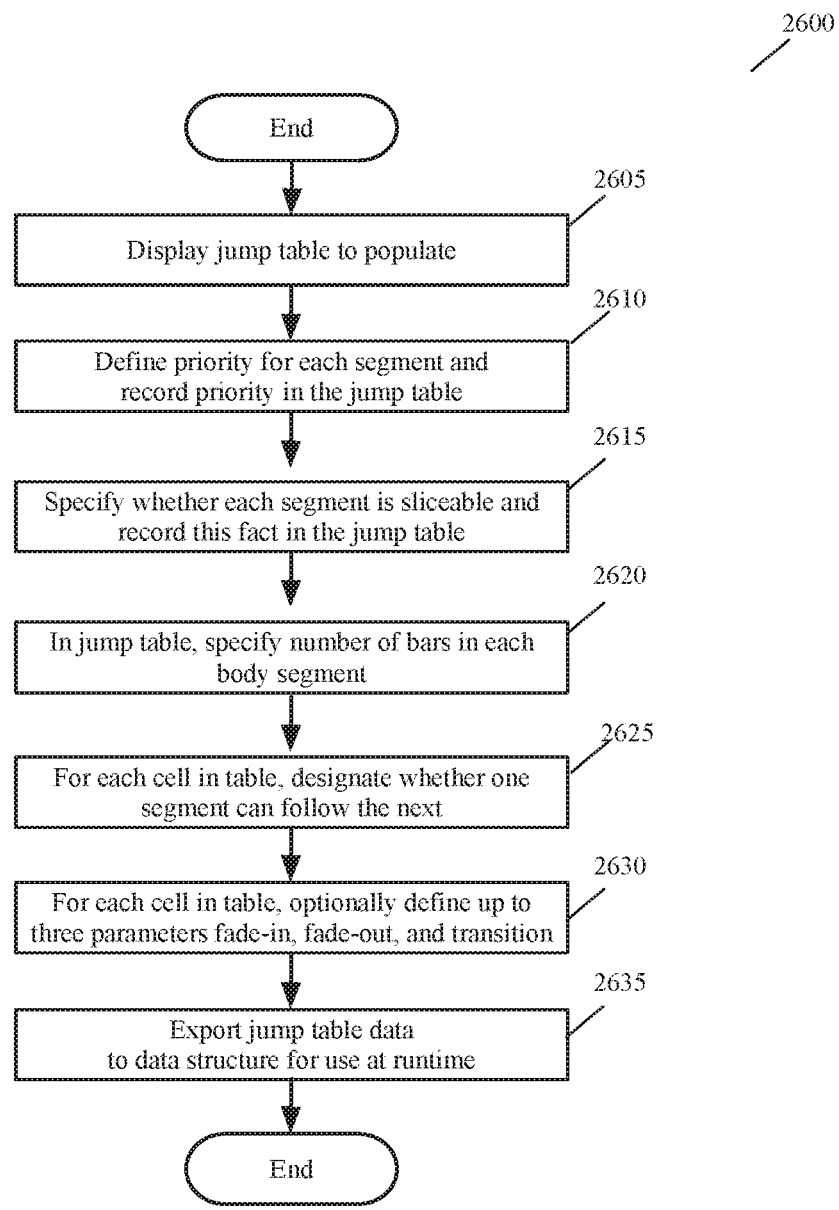
FIG. 26 illustrates a process that defines a jump table of the authoring application.

FIG. 26 conceptually illustrates a process 2600 that defines a jump table of the authoring application of FIG. 23. This process starts whenever the editor selects the jump-table creation control 2355 in some embodiments. As shown this process initially displays a jump table that associates each body segment with a row and a column, associates each starting segment with a row and associates each ending segment with a column.

The process then performs a series of operations that are conceptually illustrated as operations 2610-2635 in order to populate the jump table with the attributes and relationships of the body, starting and ending sections. One of ordinary will realize that the order of the operations in FIG. 26 is arbitrary, as the editor can perform these operations in any order until the jump table is populated. Also, in the example illustrated in this figure, each operation defines one attribute or one set of relationships completely. Again, one of ordinary skill will realize that the editor can jump around between these operations to define different instances of the attributes and relationships at different times.

At 2610, the editor defines the priority for each body segment in the segment column of the jump table. As further described below, the priority values of body segments are used in some embodiments to specify an order for the body segments that is used to step through the body segments to determine whether they are viable candidate for insertion into the audio sequence based on their duration. The priority values are also used to identify the body segment to remove when two body segments are inserted into the audio sequence in violation of a sequencing rule.

At 2615, the editor specifies in the jump table the divisible indicator that specifies whether each body segment is divisible (i.e., sliceable) into smaller sections. In some embodiments, the jump table also specifies whether an ending segment can be divided into smaller sections. When the song compositor cannot composite a song of a desired duration by using the full body segments, the song compositor in some embodiments tries to determines whether any of the body segments is divisible and if so, tries to add one or more of the parts of the body segments to the song in order to create a song of the desired duration. The song compositor uses the divisible indicator to determine whether it can slice the body segments into smaller pieces.

At 2620, the editor specifies the number of bars in each body segment. In some embodiments, the song compositor uses a body segment's number of bars to compute a predicted location of a beat in the body segment. As further described below, the song compositor uses the beat location when it needs to compile for the media compositor a list of audibly discernable transition locations that are near a given time.

At 2625 and 2630, the editor specifies the attributes of each jump table cell that is associated with a body segment and another body segment, a starting segment or an ending segment. As mentioned above, each such cell has four attributes, which are (1) a Boolean indicator specifying the propriety of whether the row-associated segment can precede the column-associated segment, (2) a transition indicator specifying whether a transition needs to be defined between these two segments, and (3) fade-in and fade-out parameters specifying how the column-associated segment should fade-in and how the row-associated segment should fade-out. In some embodiments, the transition indicator includes a transition identifier that identifies a particular transition from several pre-defined and/or editor-defined transitions.

At 2635, the process exports the data embedded in the jump table to a data structure that is used by the song compositor at runtime. In some embodiments, this data structure is a JSON (Javascript Object Notation) file. In some embodiments, the process associates the exported jump-table data structure (e.g., JSON file) with the song from which the song segments need to be extracted. In other embodiments, the process associates the jump-table data structure with the extracted song segments, e.g., places the JSON file and the song segments in another file. The song compositor imports the jump-table data structure (e.g., JSON file) whenever it wants to dynamically composite a song. One or more editors perform the processes 2200 and 2600 of FIGS. 22 and 26 multiple times to create multiple sets of song segments and multiple jump-table data structures (e.g., multiple JSON files) for multiple songs.

In some embodiments, the jump-table data structure or a parent structure (e.g., a file that contains the JSON file and its associated set of song segments) is associated with a mood, and the song compositor selects the data structure whenever it wants to dynamically composite a song for that mood. Different jump-table data structures can be associated with different moods. In some embodiments, one jump-table data structure can be associated with multiple moods. Alternatively, some embodiments associate one or more moods with a song, and associate the song with a jump-table data structure and the song segments extracted from the songs.

Figure 27:
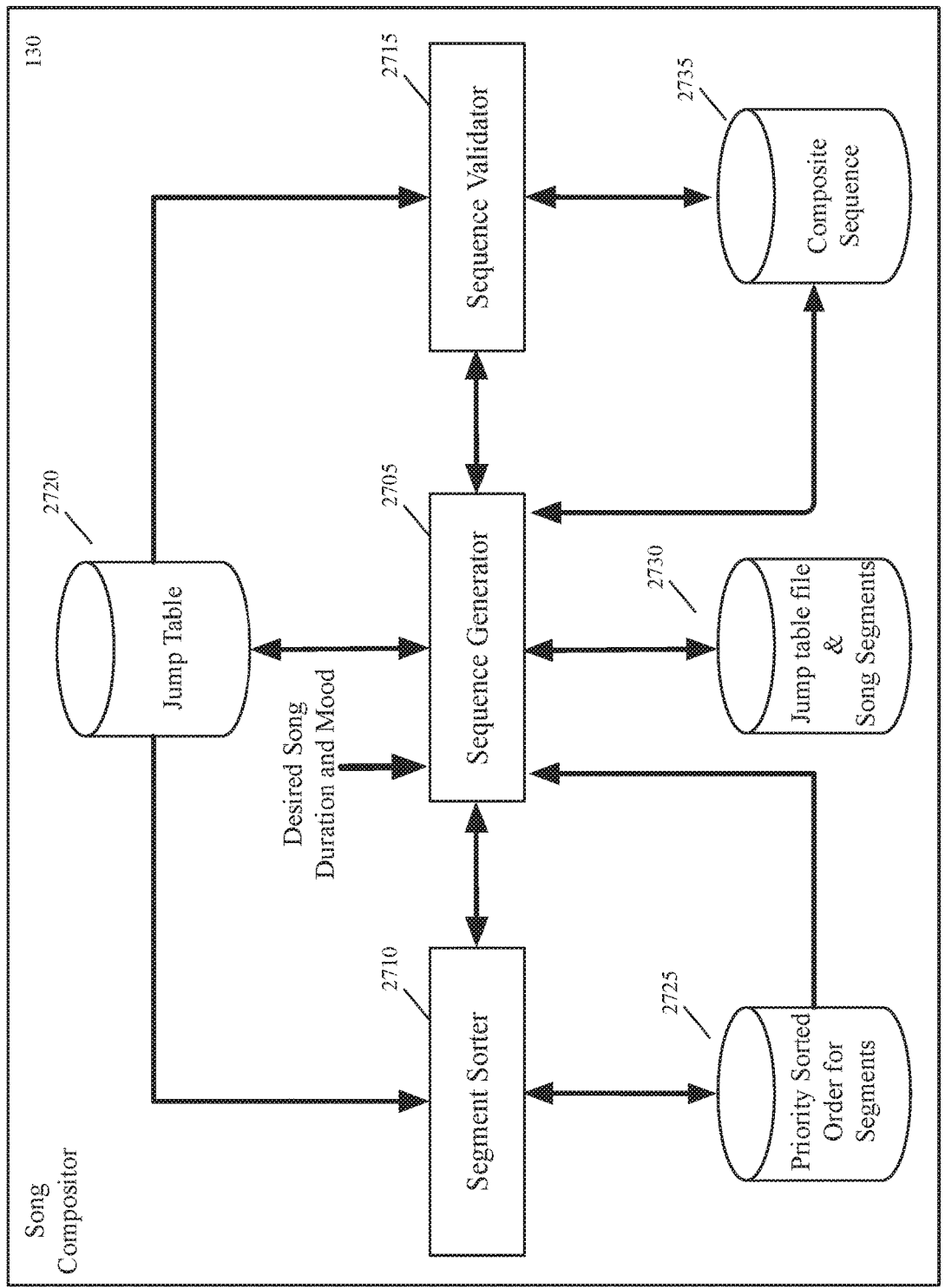
FIG. 27 illustrates architecture of a song compositor of some embodiments.

FIG. 27 illustrates the song compositor 130 of some embodiments. As shown, this song compositor includes a sequence generator 2705, a segment sorter 2710, and a sequence validator 2715. The sequence generator 2705 serves as the coordinating module of the song compositor in some embodiments. From the media compositor 125, the sequence generator 2705 receives the desired duration and mood for a song that the song compositor needs to dynamically generate without user input.

Based on the received mood, the sequence generator selects a jump-table file and its associated set audio segments that are associated with the received mood. Based on this file, the sequence creates a runtime version of the jump table 2720, which it, the segment sorter 2710 and sequence validator 2715 use. The sequence generator next directs the segment sorter to define a sorted order for the selected set of audio segments. In response, the segment sorter uses the segment priority values of the jump table 2720 to generate the segment order 2725. This order lists the audio segments from the highest priority segment to the lowest priority segment.

The sequence generator then defines an audio sequence based on the sorted order 2725 and the insertion rules. In some embodiments, this audio sequence is a sequence of just body segments. Also, in some embodiments, the sequence generator defines the duration of this audio sequence as the received desired duration minus the duration of the longest ending segment in the selected song segment set. The sequence generator iteratively inserts body segments into the audio sequence by stepping through the body segments based on their priority values (i.e., based on the sorted order 2725). As further described below by reference to FIGS. 28-30, the insertion rules that the sequence generator uses as it inserts the body segments in some embodiments, specify (1) that a body segment that belongs to a subsequent second section cannot be inserted before a body segment that belong to an earlier first section, and (2) that body segments that belong to the same section be placed next to each other based on their order in their respective section.

After creating a candidate audio sequence 2735, the sequence generator 2705 then directs the sequence validator 2715 to use the sequence rules of the jump table 2720 to validate the body segment arrangement in the audio sequence. This validation entails ensuring that the placement of no two neighboring segments in the audio sequence violates a sequence rule specified in the jump table. When the validator 2715 detect a neighboring segment pair that violates a sequence rule, the validator removes the segment with the lower priority to cure the violation.

When the validator removes one or more segments to cure one or more sequence-rule violations, the sequence generator 2705 again tries to insert body segments in the audio sequence. In such situations, the sequence generator resumes on the sorted order at the position where it left off in its previous iteration. When the sequence generator identifies an audio sequence that does not violate any sequence rule (based on the sequence validator's assessment), the sequence generator adds an ending segment from the segment set 2730. In some embodiments, the sequence generator adds the longest ending segment that is compatible with the last body segment in the defined audio sequence. If the audio sequence duration is less than the received desired duration at this stage and the segment set includes a starting segment that is compatible with the first song segment of the sequence, the sequence generator adds this starting segment at the start of the audio sequence. When multiple starting segments are viable, the sequence generator selects the starting segment with the longest duration that does not cause the audio sequence to exceed the desired duration.

Figure 28:
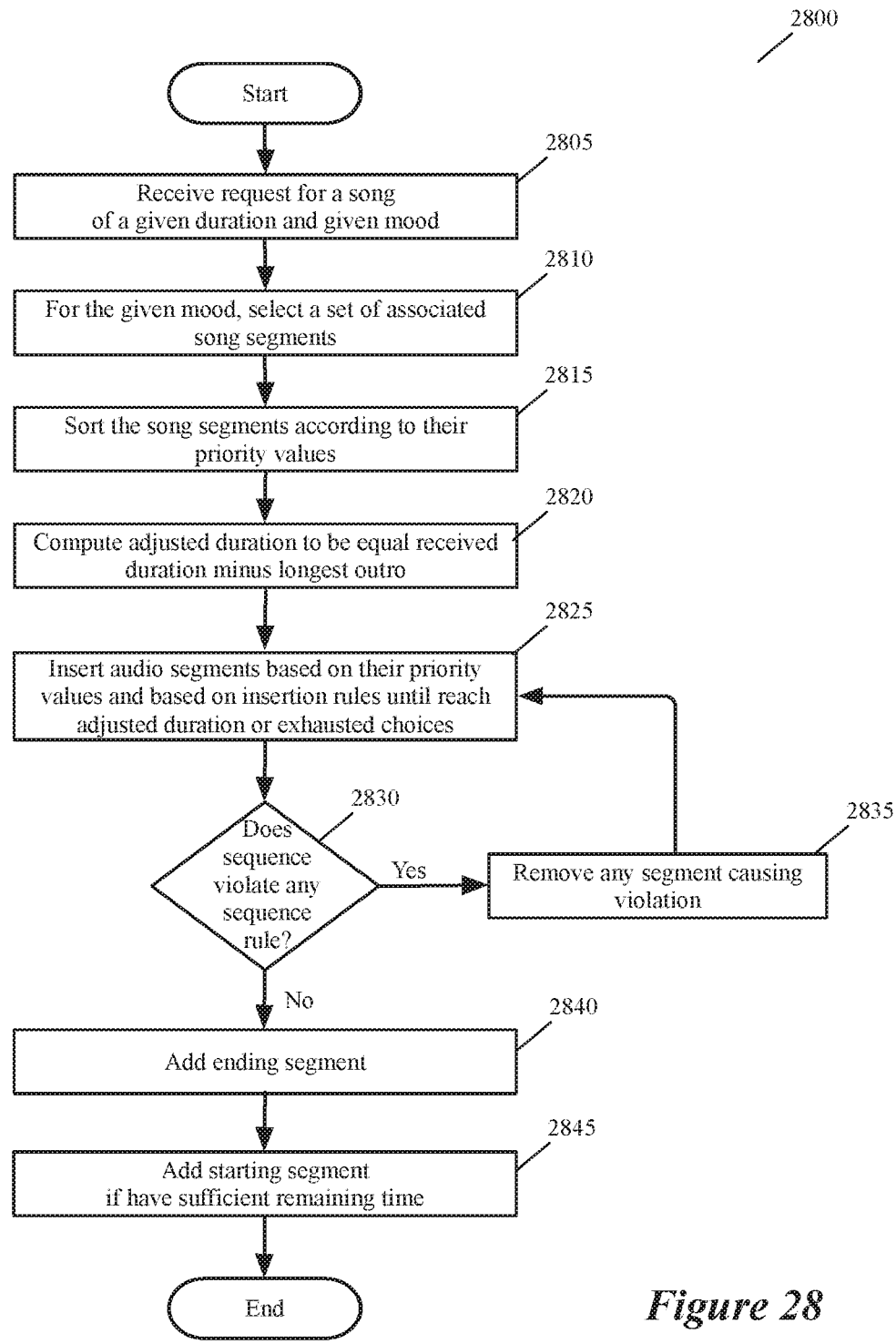
FIG. 28 illustrates a process that the song compositor of FIG. 27 performs in some embodiments to dynamically composite a song presentation.

FIG. 28 illustrates a process 2800 that the song compositor of FIG. 27 performs in some embodiments to dynamically composite a song presentation. This process starts each time the media compositor directs the song compositor to generate a song presentation of a particular duration. As shown, the process 2800 receives (at 2805) the desired duration and a mood for the desired song presentation, form the media compositor.

Based on the received mood, the process selects (at 2810) a song from which it should dynamically generate the song presentation. In some embodiments, at 2810, the process selects a jump-table file and its associated set segments that are associated with the received mood. The set of segments include body, starting and ending segments in some embodiments. Next, at 2815, the process sorts the song segments according to their priority values, which are specified in the jump-table file. In this sort, the song segments that have higher priority values are arranged before the song segments with lower priority values.

At 2820, the process computes an adjusted duration by subtracting the duration of the longest ending segment from the ideal duration received at 2805. The process uses the adjusted duration to compute a sequence of one or more body segments and any needed transitions between them. The process subtracts the duration of the longest ending segment in order to ensure that there is sufficient time to include an ending segment at the end of the composite song presentation. Other embodiments do not require the composite song presentation to have an ending segment, and in these embodiments, the process does not compute an adjusted duration, and instead uses the received duration to identify the composite song presentation.

Next, at 2825, the process iteratively inserts body segments into a presentation sequence based on the sorted order defined at 2815. In some of these embodiments, the process steps through the sorted order (and loops back when it reaches the end of the sorted order) to examine viability for inserting the body segments at successive locations in the defined audio sequence. In stepping through this order, the process examines the viability for insertion of a body segment based on the remaining duration of the presentation and the length of the body segment.

Also, when the process determines that a body segment can be inserted in the audio sequence, the process inserts the body segment in a location in the audio sequence that comports with the insertion rules. For instance, in some embodiments, the process inserts a body segment that belongs to a subsequent second section after a body segment that belong to an earlier first section. Also, when placing multiple body segments that belong to the same section, the process places the body segments based on their order in their respective section, e.g., when arranging segments 1A-1C, the process first places 1A, then 1B, and the 1C. However, when inserting one body segment several times in the audio sequence, the process will place the subsequent instances of the body segment after body segments are later in the segment order so that the segments can loop. For example, when inserting segment 1A after previously inserting segments 1A-1C, the process inserts 1A after 1C, so that the audio sequence is expressed as 1A, 1B, 1C, 1A.

In some embodiments, the process insert body segments into the audio sequence until the sequence has reached the adjusted duration, or until the process has exhausted choices. To explore all the choices, the process 2800 in some embodiments explores adding sliced portions of the sliceable body segments, when it cannot obtain an audio sequence with the adjusted duration by just adding body segments. The operation 2825 of the process 2800 will be further described below by reference to FIG. 29.

At 2830, the process determines whether any of the body segments in the defined audio sequence violate the sequence rules specified in the jump table. In some embodiments, the process 2800 generates a runtime jump table from the jump-table definition in the jump-table file. The process uses this jump table to determine whether any pair of neighboring body segments in the audio sequence violates a sequence prohibition as set out in the jump table. If so, the process removes (at 2835) the lower priority body segment of the pair. In some cases, multiple neighboring pairs might violate sequence prohibition(s). In such a case, the process tries to identify (at 2835) the lowest priority body segment that upon removal can rectify multiple violations. In other embodiments, the process does not try to identify such body segments, and instead simply solves the neighboring pair violations one pair at a time, by analyzing the violating pairs in a particular order (e.g., from start to end of the audio sequence).

After removing (at 2835) one or more body segments from the defined audio sequence, the process returns to 2825 to try to insert body segments again in the song presentation. When the process returns to 2825, the process resumes on the sorted order at the position where it left off in its previous iteration through 2825 before its last transition to 2830.

When the process 2800 determines (at 2830) that the defined audio sequence does not violate any sequence rule, the process adds (at 2840) one of the ending segments to the audio sequence. In some embodiments, the process 2800 selects the longest ending segment that is compatible with the last body segment in the defined audio sequence. Lastly, at 2845, the process determines whether the defined audio sequence is still shorter than the received ideal duration. If so, the process determines (at 2845) whether any of the starting segments can make the audio sequence reach the ideal duration or get as close as possible. To do this, the starting segment cannot conflict with the first body segment in the audio sequence. When multiple starting segments are viable, the process selects the starting segment with the longest duration that does not cause the audio sequence to exceed the desired duration. After 2845, the process ends.

Figure 29:
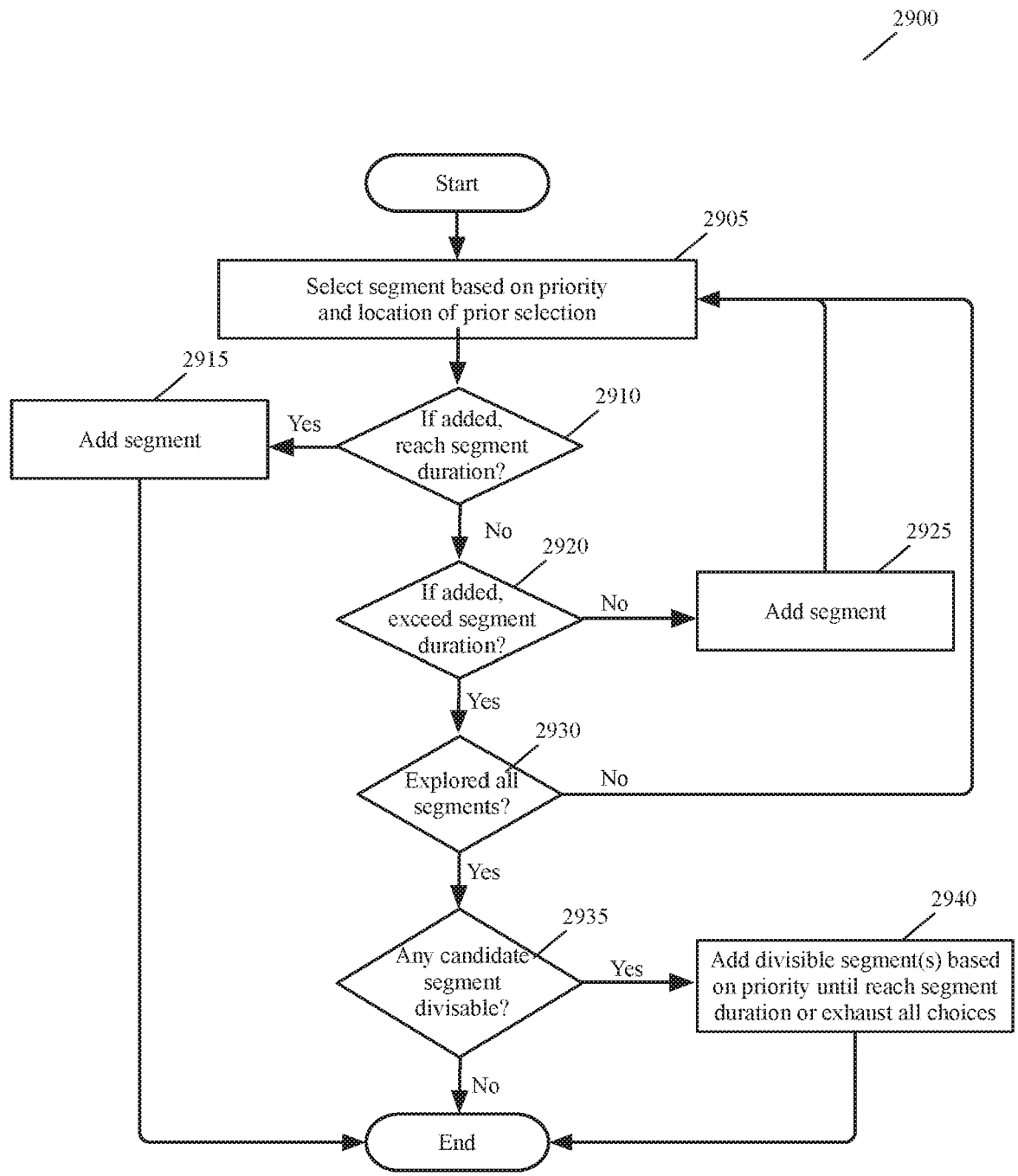
FIG. 29 illustrates a process for iteratively inserting body segments into a presentation sequence.

FIG. 29 illustrates a process 2900 that the process 2800 performs at 2825. As shown, the process selects (at 2905) a segment based on the segment priority values. The first time through 2905, the process 2900 selects the body segment that is first on the priority-sorted order defined at 2815. Each subsequent time through 2905, the process selects the body segment in the sorted order that is after the last body segment that the process selected from the sorted order in its last iteration through 2905.

After selecting a body segment (at 2905), the process determines (at 2910) whether the addition of the selected body segment to the audio sequence would make the sequence's duration match the adjusted duration computed at 2820. In some embodiments, the process accounts for duration of any transition that would have to be defined by placing the selected body segment next to the prior segment, whenever it assesses what the duration of the sequence would be upon the addition of a potential candidate segment at 2910 or 2920. Whether such a transition is needed is defined in the jump table. In some embodiments, some or all of the transitions are not added to the audio sequence in a way that would increase the sequence's overall duration, as such a transition would be applied to the end of the previous segment and/or the start of the next segment.

When the process determines (at 2910) that the addition of the selected body segment to the audio sequence would make the sequence's duration match the adjusted duration, the process adds (at 2915) the selected body segment to the audio sequence in a location in the audio sequence that comports with the insertion rules. For instance, in some embodiments, the process inserts a body segment that belongs to a subsequent second section after a body segment that belongs to an earlier first section. Also, when placing multiple body segments that belong to the same section, the process places the body segments based on their order in their respective section. For example, when arranging segments 1A-1C, the process first places 1A, then 1B, and the 1C. However, when inserting one body segment several times in the audio sequence, the process will place the subsequent instances of the body segment after body segments are later in the segment order so that the segments can loop. For example, when inserting segment 1A after previously inserting segments 1A-1C, the process inserts 1A after 1C, so that the audio sequence is expressed as 1A, 1B, 1C, 1A. After 2915, the process ends.

When the process determines (at 2910) that the addition of the selected body segment to the audio sequence would not make the sequence's duration match the adjusted duration, the process determines (at 2915) whether the addition of the selected body segment to the defined audio sequence would cause the audio sequence to exceed the adjusted duration. When no body segment has been added to the audio sequence, the process determines whether the duration of the selected body segment exceeds the adjusted duration. When one or more body segments have been previously added to the audio sequence, the process determines (at 2910) whether the length of the selected body segment exceeds the adjusted duration minus the duration of body segments currently assigned to the audio sequence.

When the process determines (at 2920) that the addition of the selected body segment to the defined audio sequence would not cause the audio sequence to exceed the adjusted duration, the process adds (at 2925) the selected body segment to the audio sequence in a location in the audio sequence that comports with the insertion rules, as described above. After 2925, the process returns to 2905 to select another body segment.

When the process determines (at 2920) that the addition of the selected body segment to the defined audio sequence would cause the audio sequence to exceed the adjusted duration, the process determines (at 2930) whether it has completed one loop through the sorted order in this iteration through operation 2825. If not, the process returns to 2905 to select the next body segment based on the sorted order.

When the process determines (at 2930) that it has explored all body segments in this iteration through 2825, the process determines (at 2935) whether any body segments are designated as sliceable. If not, the process ends. Otherwise, the process explores (at 2940) adding portions of the divisible body segments to the audio sequence. In some embodiment, the process identifies portions of the body segment based on how an editor has marked up the divisible sections of the body segment and/or based on the bar data associated with the body segment.

In some embodiments, the operations for adding the body segment portions are similar to the operations 2905-2930 for adding the body segments to the audio sequence. Thus, the process explores the body segment portions based on the priority values of their associated body segments. While inserting, a body segment portion in the audio sequence, the process follows the above-described insertion rules in some embodiments. The process tries to add body segment portions until the addition of one body segment portion causes the audio sequence to reach the adjusted duration, or until all body segment portions have been explored. After 2940, the process ends.

Figure 30:
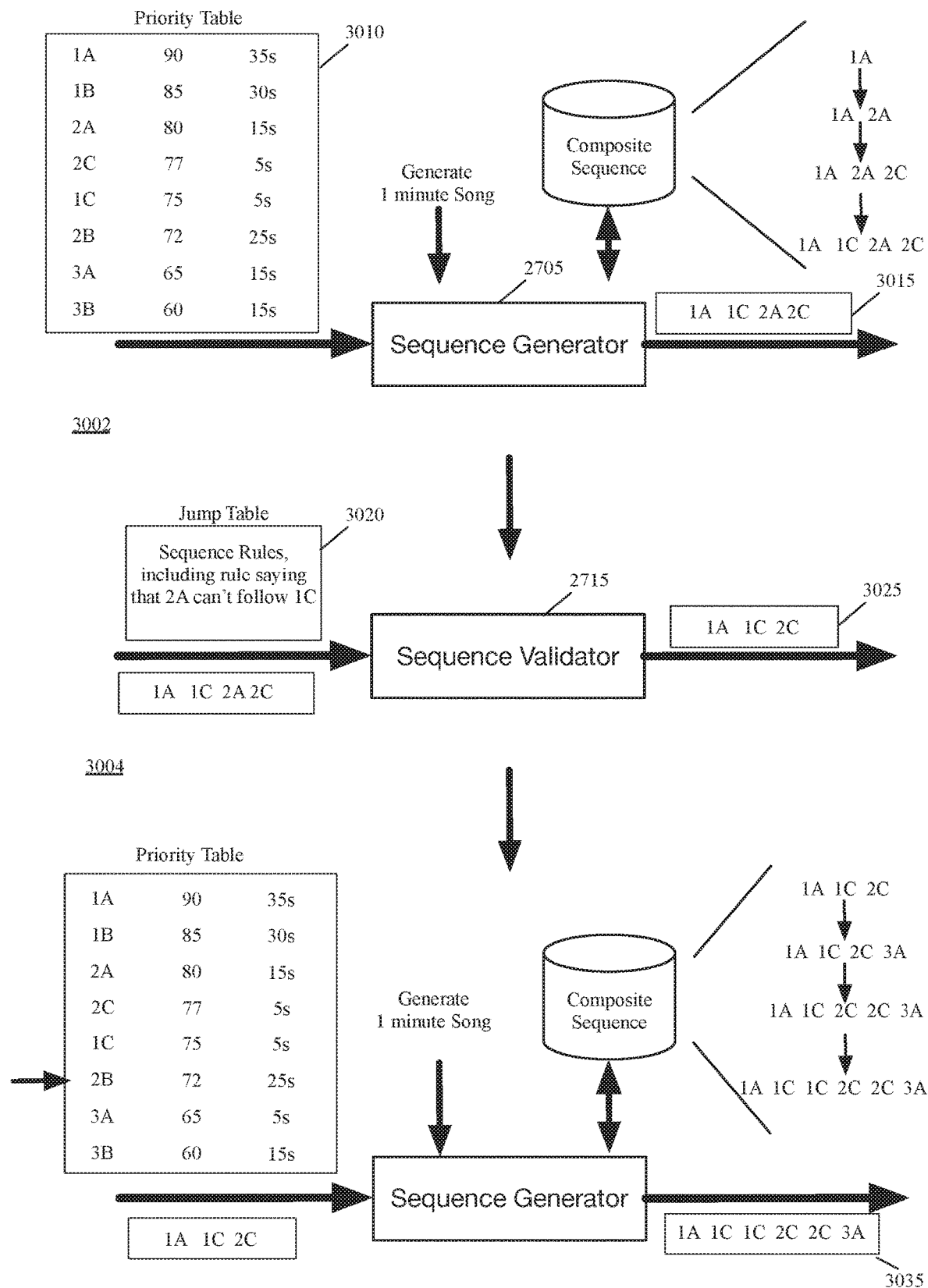
FIG. 30 illustrates an example of operation of the sequence generator and sequence validator of FIG. 27.

FIG. 30 illustrates an example of the operation of the sequence generator 2705 and the sequence validator 2715. This example is illustrated in three operational stages 3002-3006, with the first and third stages 3002 and 3006 relating to the operation of the sequence generator 2705 and the second stage 3004 relating to the operation of the sequence validator 2715. In this example, the song segment set includes eight segments 1A, 1B, 1C, 2A, 2B, 2C, 3A and 3B. The duration and priority of these song segments are shown in the priority sorted table 3010 that the segment sorter 2710 produces.

The first stage 3002 shows the sequence generator 2705 receiving the desired duration of the song. In this example, it is assumed that the desired duration is 1 minute 10 seconds, and the length of the longest ending segment is 10 seconds. Accordingly, the sequence generator 2705 steps through the body segments according to the order specified by the priority sorted table 3010 in order to identify a body-segment sequence that is has a maximum duration of 60 seconds.

As shown by the exploded view of the composite sequence 2735, the sequence generator steps through the priority sorted order to first insert body segment 1A, then body segment 1C, followed by body segment 2A, and then finally by body segment 2C. Each time the sequence generator selects a body segment, it determines whether the length of this body segment exceeds the remaining duration of the body-segment sequence that it is generating. If so, the sequence generator does not insert the selected body segment and moves to the next body segment. For instance, after inserting body segment 1A, the sequence generator selects body segment 1B since after segment 1A, segment 1B has the highest priority. But the sequence generator does not insert segment 1B because the length of the body segment sequence would then be 65 seconds, which would exceed the maximum 60-second duration for this sequence.

Thus, the sequence generator inserts a selected body segment in the sequence only when this insertion would not cause the body-segment sequence to exceed its maximum duration. When the sequence generator inserts a selected body segment in the sequence, it inserts this segment based on the body segment's section number and segment letter. Because of the insertion rule, the sequence generator inserts body segment 1C after body segment 1A, then inserts body segment 2A after body segment 1C, and then inserts body segment 2C after body segment 2A.

After inserting body segment 2C, the total duration of the defined audio sequence 3015 is 1 minute, which is the maximum body-segment sequence duration. As shown in the second stage 3004, the sequence generator 2705 then has the sequence validator 2715 examine the defined audio sequence 3015 to determine whether any two neighboring segments violates a sequence rule that is defined in the jump table.

The second stage 3004 also shows the sequence validator 2715 receives the jump table 3020, which includes a rule that prohibits body segment 2A following body segment 1C. Thus, the sequence validator 2715 removes the body segment 2A from the body-segment sequence 3015 to produce the modified audio sequence 3025. Since the duration of this modified audio sequence is now 40 seconds, which is 20 seconds less than the 60 second desired duration, the sequence generator tries to insert body segments in this sequence to reach the desired duration.

As shown in the third stage 3006, the sequence generator 2705 starts selecting body segments to examine for insertion in the body-segment sequence where it left off in its previous attempt. In this example, the sequence generator 2705 left off at segment 2B. The sequence generator, however, cannot add this segment because adding this segment would cause the body-segment sequence to exceed 60 seconds. Hence, the sequence generator 2705 skips this segment, and then selects segment 3A. The sequence generator adds this segment 3A to the sequence as after its addition, the sequence has a 45 second duration that is less than the maximum 60 second duration.

As shown by the exploded view of the composite sequence 2735 in the third stage 3006, the sequence generator steps and loops through the priority sorted order to then add segments 1C and 2C again to the sequence, after skipping over segments 3B, 1A, 1B, and 2A. These segments are skipped over because the addition of each of these segments would cause the body-segment sequence to exceed its maximum duration. When segments 1C and 2C are inserted again in the body-segment sequence, they are inserted in the sequence at positions specified by their section number and segment letter. As such, the resulting body-segment sequence 3035 is as follows: 1A, 1C, 1C, 2C, 2C, 3A.

Since this body-segment sequence is 60 seconds long (i.e., has the desired maximum duration), the sequence generator has the sequence validator check it for sequence rule violations. If the sequence validator does not identify any sequence rule violations, the sequence generator then selects the longest ending segment that can follow body segment 3A, and inserts this ending segment in the audio sequence after body segment 3A. When the inserted ending segment is less than 10 seconds long, the audio sequence is less than 70 seconds (i.e., less than the desired duration of the song presentation). In this situation, the sequence generator tries to identify a starting segment that can precede segment 1A, and that has a duration that would not cause the audio sequence to exceed its maximum duration after this starting segment has been inserted in the audio sequence. If it identifies any such starting segment, the sequence generator inserts this segment before all the body segments (i.e., before segment IA in this example). When multiple starting segments exist that can precede segment 1A and that have a duration that is equal to or less than the available duration of the audio sequence, the sequence generator selects the longest starting segment.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROM's), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 31:
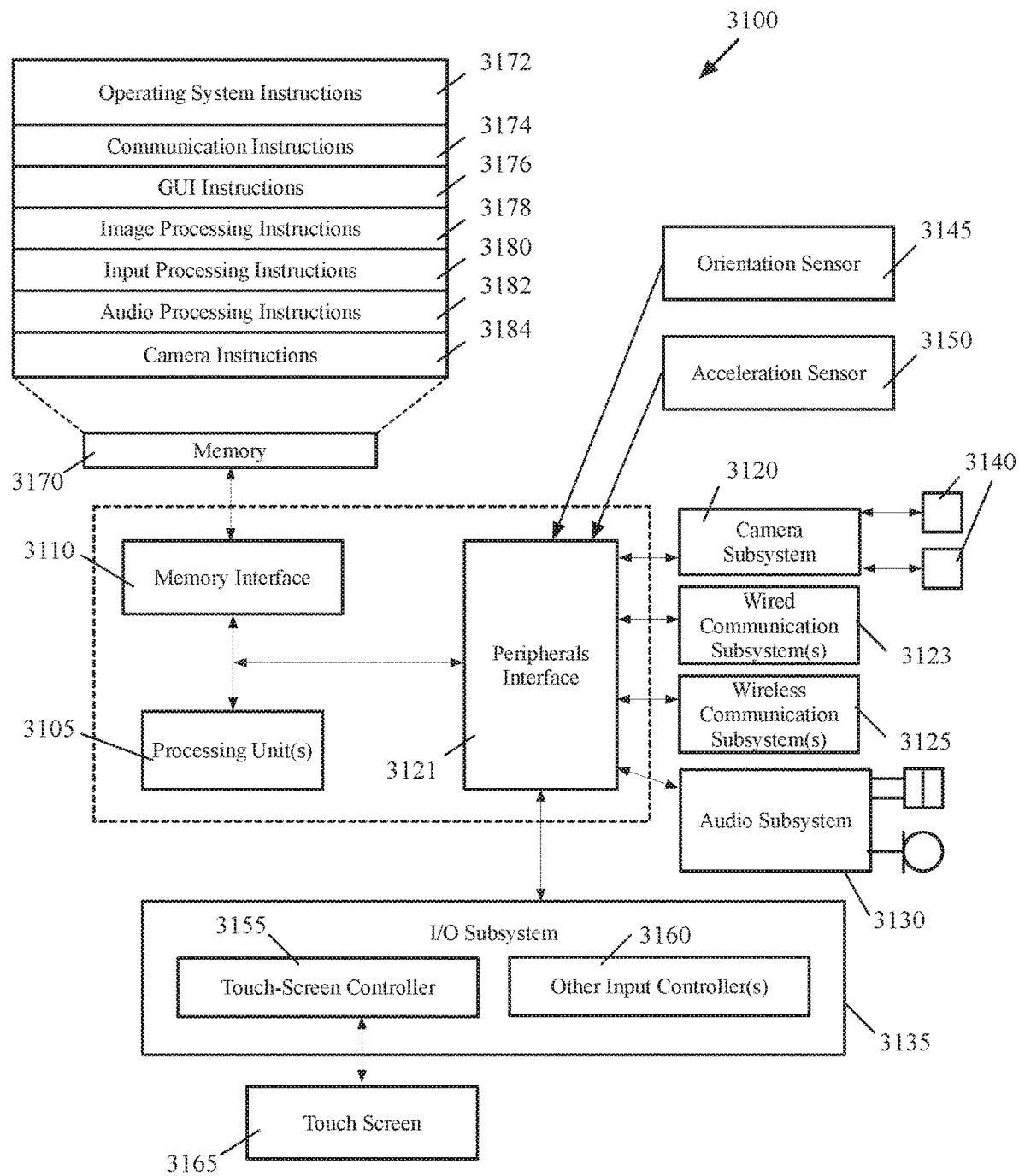
FIG. 31 is an example of an architecture of such a mobile computing device.

The applications of some embodiments operate on mobile devices, such as smart phones (e.g., iPhones®) and tablets (e.g., iPads®). FIG. 31 is an example of an architecture 3100 of such a mobile computing device. Examples of mobile computing devices include smartphones, tablets, laptops, etc. As shown, the mobile computing device 3100 includes one or more processing units 3105, a memory interface 3110 and a peripherals interface 3115.

The peripherals interface 3115 is coupled to various sensors and subsystems, including a camera subsystem 3120, a wireless communication subsystem(s) 3125, an audio subsystem 3130, an I/O subsystem 3135, etc. The peripherals interface 3115 enables communication between the processing units 3105 and various peripherals. For example, an orientation sensor 3145 (e.g., a gyroscope) and an acceleration sensor 3150 (e.g., an accelerometer) is coupled to the peripherals interface 3115 to facilitate orientation and acceleration functions.

The camera subsystem 3120 is coupled to one or more optical sensors 3140 (e.g., a charged coupled device (CCD) optical sensor, a complementary metal-oxide-semiconductor (CMOS) optical sensor, etc.). The camera subsystem 3120 coupled with the optical sensors 3140 facilitates camera functions, such as image anchor video data capturing. The wireless communication subsystem 3125 serves to facilitate communication functions. In some embodiments, the wireless communication subsystem 3125 includes radio frequency receivers and transmitters, and optical receivers and transmitters (not shown in FIG. 31). These receivers and transmitters of some embodiments are implemented to operate over one or more communication networks such as a GSM network, a Wi-Fi network, a Bluetooth network, etc. The audio subsystem 3130 is coupled to a speaker to output audio (e.g., to output voice navigation instructions). Additionally, the audio subsystem 3130 is coupled to a microphone to facilitate voice-enabled functions, such as voice recognition (e.g., for searching), digital recording, etc.

The I/O subsystem 3135 involves the transfer between input/output peripheral devices, such as a display, a touch screen, etc., and the data bus of the processing units 3105 through the peripherals interface 3115. The I/O subsystem 3135 includes a touch-screen controller 3155 and other input controllers 3160 to facilitate the transfer between input/output peripheral devices and the data bus of the processing units 3105. As shown, the touch-screen controller 3155 is coupled to a touch screen 3165. The touch-screen controller 3155 detects contact and movement on the touch screen 3165 using any of multiple touch sensitivity technologies. The other input controllers 3160 are coupled to other input/control devices, such as one or more buttons. Some embodiments include a near-touch sensitive screen and a corresponding controller that can detect near-touch interactions instead of or in addition to touch interactions. Also, the input controller of some embodiments allows input through a stylus.

The memory interface 3110 is coupled to memory 3170. In some embodiments, the memory 3170 includes volatile memory (e.g., high-speed random access memory), non-volatile memory (e.g., flash memory), a combination of volatile and non-volatile memory, and/or any other type of memory. As illustrated in FIG. 31, the memory 3170 stores an operating system (OS) 3172. The OS 3172 includes instructions for handling basic system services and for performing hardware dependent tasks.

The memory 3170 also includes communication instructions 3174 to facilitate communicating with one or more additional devices; graphical user interface instructions 3176 to facilitate graphic user interface processing; image processing instructions 3178 to facilitate image-related processing and functions; input processing instructions 3180 to facilitate input-related (e.g., touch input) processes and functions; audio processing instructions 3182 to facilitate audio-related processes and functions, and camera instructions 3184 to facilitate camera-related processes and functions. The instructions described above are merely exemplary and the memory 3170 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 31 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 31 may be split into two or more integrated circuits.

Figure 32:
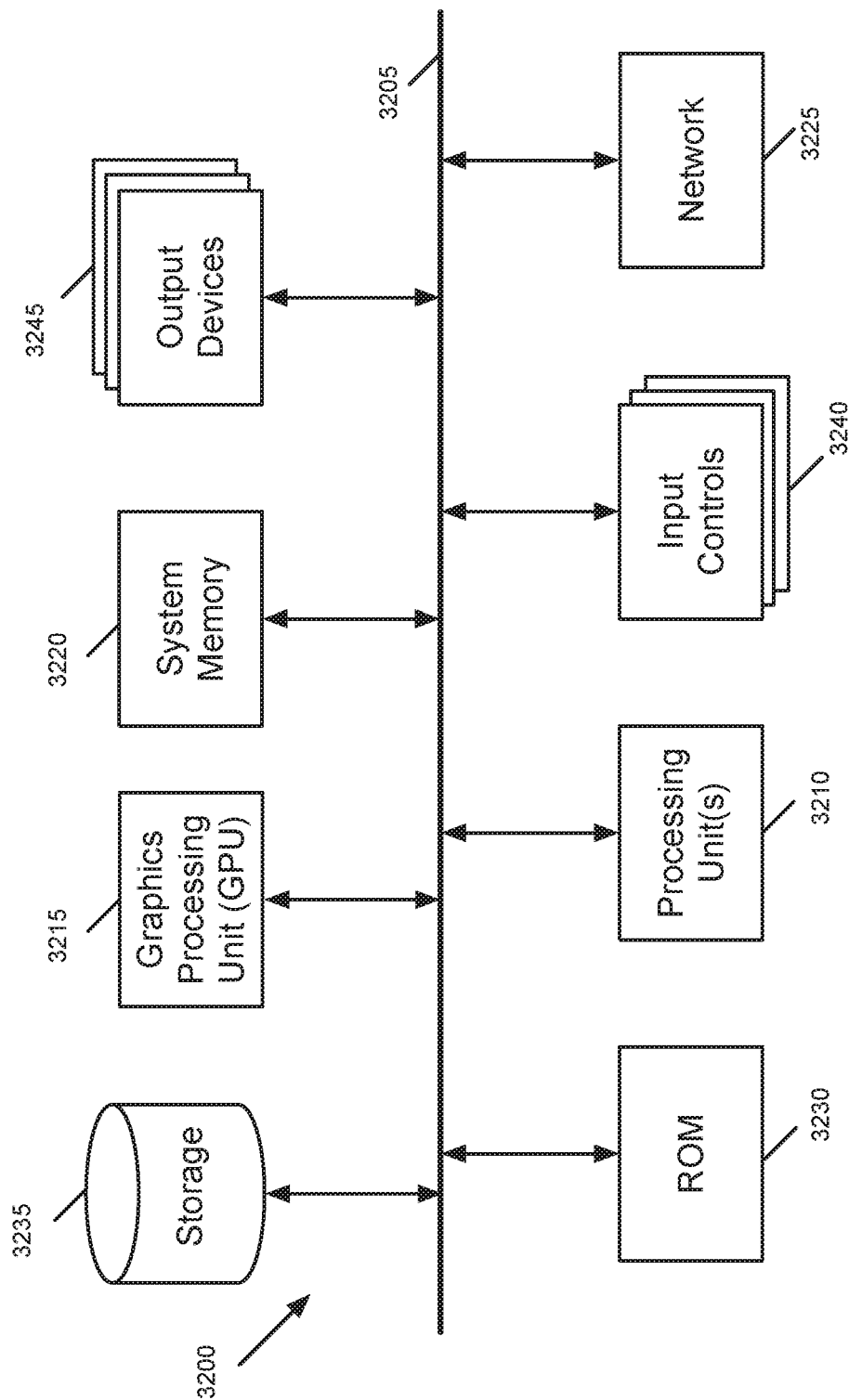
FIG. 32 conceptually illustrates another example of an electronic system with which some embodiments of the invention are implemented.

FIG. 32 conceptually illustrates another example of an electronic system 3200 with which some embodiments of the invention are implemented. The electronic system 3200 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 3200 includes a bus 3205, processing unit(s) 3210, a graphics processing unit (GPU) 3215, a system memory 3220, a network 3225, a read-only memory 3230, a permanent storage device 3235, input devices 3240, and output devices 3245.

The bus 3205 collectively represents all system, peripheral, and chipset buses that communicatively connect the numerous internal devices of the electronic system 3200. For instance, the bus 3205 communicatively connects the processing unit(s) 3210 with the read-only memory 3230, the GPU 3215, the system memory 3220, and the permanent storage device 3235.

From these various memory units, the processing unit(s) 3210 retrieves instructions to execute and data to process in order to execute the processes of the invention. The processing unit(s) may be a single processor or a multi-core processor in different embodiments. Some instructions are passed to and executed by the GPU 3215. The GPU 3215 can offload various computations or complement the image processing provided by the processing unit(s) 3210.

The read-only-memory (ROM) 3230 stores static data and instructions that are needed by the processing unit(s) 3210 and other modules of the electronic system. The permanent storage device 3235, on the other hand, is a read-and-write memory device. This device is a non-volatile memory unit that stores instructions and data even when the electronic system 3200 is off. Some embodiments of the invention use a mass-storage device (such as a magnetic or optical disk and its corresponding disk drive, integrated flash memory) as the permanent storage device 3235.

Other embodiments use a removable storage device (such as a floppy disk, flash memory device, etc., and its corresponding drive) as the permanent storage device. Like the permanent storage device 3235, the system memory 3220 is a read-and-write memory device. However, unlike storage device 3235, the system memory 3220 is a volatile read-and-write memory, such a random access memory. The system memory 3220 stores some of the instructions and data that the processor needs at runtime. In some embodiments, the invention's processes are stored in the system memory 3220, the permanent storage device 3235, and/or the read-only memory 3230. For example, the various memory units include instructions for processing multimedia clips in accordance with some embodiments. From these various memory units, the processing unit(s) 3210 retrieves instructions to execute and data to process in order to execute the processes of some embodiments.

The bus 3205 also connects to the input and output devices 3240 and 3245. The input devices 3240 enable the user to communicate information and select commands to the electronic system. The input devices 3240 include alpha-numeric keyboards and pointing devices (also called cursor control devices (e.g., mice)), cameras (e.g., webcams), microphones or similar devices for receiving voice commands, etc. The output devices 3245 display images generated by the electronic system or otherwise output data. The output devices 3245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 32, bus 3205 also couples electronic system 3200 to a network 3225 through a network adapter (not shown). In this manner, the computer can be a part of a network of computers (such as a local area network ("LAN"), a wide area network ("WAN"), or an Intranet), or a network of networks, such as the Internet. Any or all components of electronic system 3200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs), in some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical Objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. A non-transitory computer readable medium including one or more sequences of instructions that, when executed by one or more processors, cause the processors to perform operations comprising:
   generating, based on a collection of media clips stored on a device, an audio component for an audio/video (A/V) presentation;
   determining a plurality of transition locations within the audio component;
   obtaining a priority value for each of the plurality of transition locations within the audio component;
   generating a video component for the A/V presentation comprising a plurality of edit points indicating transitions between image segments based on the collection of media clips, the audio component, the plurality of transition locations, and the priority value for each of the plurality of transition locations within the audio component, wherein the video component comprises at least one image segment based on a video clip, and wherein the at least one image segment is generated by determining a highest scoring range of the video clip to include in the at least one image segment,
   wherein the video component comprises each of the plurality of edit points aligned with a subset of the plurality of transition locations based on priority values for the plurality of transition locations; and
   generating the A/V presentation comprising the audio component and the video component.

2. The non-transitory computer readable medium of claim 1, wherein the subset of the plurality of transition locations is selected from the plurality of transition locations based on a temporal distance which corresponding edit points have to be moved in the video component to reach a corresponding one of the plurality of transition locations in the audio component.

3. The non-transitory computer readable medium of claim 1,
   wherein a particular transition location is associated with an ending audio segment within the audio component, and wherein a last image segment of the video component is displayed during the ending audio segment.

4. The non-transitory computer readable medium of claim 1, said operations further comprising:
applying an audio fade out effect to the audio component, applying a video fade out effect to the video component; and
synchronizing the audio fade out effect and the video fade out effect by aligning the video fade out effect to a particular transition location within the audio component,
wherein the particular transition location is associated with the audio fade out effect within the audio component.

5. The non-transitory computer readable medium of claim 1, said operations further comprising determining a desired duration, wherein the audio component and video component are generated to have the desired duration, wherein obtaining the priority value for each of the plurality of transition locations comprises receiving the priority value for each of the plurality of transition locations from a user.

6. The non-transitory computer readable medium of claim 1, wherein generating the video component comprises:
determining, for each video clip included in the collection of media clips, a temporal range within the video clip that scores highest based on: inclusion of at least one face, inclusion of voice audio, and a lack of image blur due to camera motion.

7. A mobile device comprising:
one or more processors; and
one or more sequences of instructions that, when executed by the one or more processors, cause the processors to perform operations comprising:
identifying a collection of media clips stored on a device;
generating, via an audio compositing process and based on the collection of media clips, an audio component of an audio/video (A/V) presentation;
determining a plurality of audibly discernible locations within the audio component;
obtaining a priority value for each of the plurality of audibly discernible locations within the audio component;
providing, by the audio compositing process to a video compositing process, the plurality of audibly discernable locations and the priority value for each of the plurality of audibly discernible locations;
generating, via the video compositing process, a video component of the A/V presentation comprising a plurality of edit points indicating transitions between image segments based on the collection of media clips, the audio component, the plurality of audibly discernible locations, and the priority value for each of the plurality of audibly discernable locations, wherein the video component comprises at least one image segment based on a video clip, and wherein the at least one image segment is generated by determining a highest scoring range of the video clip to include in the at least one image segment, and wherein the video component comprises each of the plurality of edit points aligned with a subset of the plurality of audibly discernible locations based on priority values for the plurality of audibly discernible locations; and
generating the A/V presentation based on the audio component and the video component.

8. The mobile device of claim 7,
wherein a particular audibly discernable location comprises a location of an ending audio segment within the audio component, and
wherein a last image segment of the video component is displayed during the ending audio segment.

9. The mobile device of claim 8, wherein the location of the ending audio segment is a location of a music piece in the ending audio segment.

10. The mobile device of claim 8, wherein the last image segment is a last video segment.

11. The mobile device of claim 7, said operations further comprising:
applying, via the audio compositing process, an audio fade out effect to the audio component;
applying, via the video compositing process, a video fade out effect to the video component; and
synchronizing the audio fade out effect and the video fade out effect.

12. The mobile device of claim 11, said synchronizing comprising:
aligning, via the video compositing process, the video fade out effect to a particular audibly discernable location,
wherein the particular audibly discernable location comprises a location of the audio fade out effect within the audio component.

13. The mobile device of claim 7, wherein the video compositing process and the audio compositing process use a constraints solver to generate the A/V presentation based at least on alignment constraints derived from the plurality of audibly discernable locations.

14. A method comprising:
identifying a collection of media clips stored on a device;
generating, via an audio compositing process and based on the collection of media clips, an audio component of an audio/video (A/V) presentation;
determining a plurality of audibly discernible locations within the audio component;
obtaining a priority value for each of the plurality of audibly discernible locations within the audio component;
providing, by the audio compositing process to a video compositing process, the plurality of audibly discernable locations and the priority value for each of the plurality of audibly discernible locations;
generating, via the video compositing process, a video component of the A/V presentation comprising a plurality of edit points indicating transitions between image segments based on the collection of media clips, the audio component, the plurality of audibly discernible locations, and the priority value for each of the plurality of audibly discernable locations, wherein the video component comprises at least one image segment based on a video clip, and wherein the at least one image segment is generated by determining a highest scoring range of the video clip to include in the at least one image segment, and wherein the video component comprises each of the plurality of edit points aligned with a subset of the plurality of audibly discernible locations based on priority values for the subset of the plurality of audibly discernible locations; and
generating the A/V presentation based on the audio component and the video component.

15. The method of claim 14,
wherein a particular audibly discernable location comprises a location of an ending audio segment within the audio component, and
wherein a last image segment of the video component is displayed during the ending audio segment.

16. The method of claim 15, wherein the location of the ending audio segment is a location of a music piece in the ending audio segment.

17. The method of claim 15, wherein the last image segment is a last video segment.

18. The method of claim 14, said operations further comprising:
applying, via the audio compositing process, an audio fade out effect to the audio component;
applying, via the video compositing process, a video fade out effect to the video component;
aligning, via the video compositing process, the video fade out effect to a particular audibly discernable location,
wherein the particular audibly discernable location comprises a location of the audio fade out effect within the audio component.

19. The method of claim 14, wherein the video compositing process and the audio compositing process use a constraints solver to generate the A/V presentation based at least on alignment constraints derived from the plurality of audibly discernable locations.

20. The method of claim 14, said operations further comprising determining a desired duration, wherein the audio component and video component are generated to have the desired duration, wherein obtaining the priority value for each of the plurality of audibly discernible locations comprises receiving the priority value for each of the plurality of audibly discernible locations from a user.

* * * * *